(12) United States Patent
Tateishi et al.

(10) Patent No.: US 8,222,410 B2
(45) Date of Patent: Jul. 17, 2012

(54) AZO PIGMENTS, AND PIGMENT DISPERSION, COLORING COMPOSITION AND INK FOR INKJET RECORDING CONTAINING THE AZO PIGMENT

(75) Inventors: Keiichi Tateishi, Fujinomiya (JP);
Shinya Hayashi, Fujinomiya (JP);
Masaru Takasaki, Kanagawa (JP);
Nobuo Seto, Fujinomiya (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 12/921,213

(22) PCT Filed: Mar. 5, 2009

(86) PCT No.: PCT/JP2009/054709
§ 371 (c)(1),
(2), (4) Date: Sep. 7, 2010

(87) PCT Pub. No.: WO2009/110643
PCT Pub. Date: Sep. 11, 2009

(65) Prior Publication Data
US 2011/0021763 A1 Jan. 27, 2011

(30) Foreign Application Priority Data

Mar. 7, 2008 (JP) .................................. 2008-058711
Jun. 27, 2008 (JP) .................................. 2008-169182
Jan. 8, 2009 (JP) .................................. 2009-002450

(51) Int. Cl.
*C07D 403/14* (2006.01)
(52) U.S. Cl. ...................................... 544/220; 548/365.1
(58) Field of Classification Search .......................... None
See application file for complete search history.

(56) References Cited

U.S. PATENT DOCUMENTS

| | | | |
|---|---|---|---|
| 2,936,306 A | 5/1960 | Schmid et al. | |
| 4,685,934 A | 8/1987 | Benguerel et al. | |
| 4,870,164 A | 9/1989 | Kuhne et al. | |
| 4,935,502 A | 6/1990 | Kuhne et al. | |
| 7,125,446 B2 | 10/2006 | Potenza et al. | |
| 2007/0202282 A1 | 8/2007 | Fujie et al. | |

FOREIGN PATENT DOCUMENTS

| | | |
|---|---|---|
| EP | 1 847 570 A1 | 10/2007 |
| GB | 1599550 A | 10/1981 |
| JP | 56-38354 A | 4/1981 |
| JP | 61-36362 A | 2/1986 |
| JP | 11-100519 A | 4/1999 |
| JP | 2003-277662 A | 10/2003 |
| JP | 2007 217681 A | 8/2007 |
| JP | 4073453 B2 | 4/2008 |
| WO | 02 083662 A2 | 10/2002 |
| WO | 2006 055466 A1 | 5/2006 |

OTHER PUBLICATIONS

Extended European Search Report dated Jun. 8, 2011 in European Application No. 09717912.1.
Mohareb et al. "Thiophenylhydrazonoacetates in heterocyclic synthesis." Heteroatom Chemistry. vol. 15, No. 1, pp. 15-20. http://www3.interscience.wiley.com/cgi-bin/fulltext/107061169/PDFSTART [retrieved on Jan. 1, 2004].
Ghousse et al. "Triazines and Related Products. Part 24. Synthesis of Pyrazol-4-ylidenehydrazinoimidazoles by Hydrazinolysis of Imidazo[5,1-c] [1,2,4]-triazines + and 2-Arylazoimidazoles by Diazonium Coupling Reactions." Journal of the Chemical Society, Perkins Transactions 1, Chemical Society, Letchworth, GB. Jan. 1, 1982, pp. 1811-1819.
International Search Report for PCT/JP2009/054709 dated May 19, 2009 [PCT/ISA/210].
Written Opinion for PCT/JP2009/054709 [PCT/ISA/237].

*Primary Examiner* — Kamal Saeed
*Assistant Examiner* — Michael Barker
(74) *Attorney, Agent, or Firm* — Sughrue Mion, PLLC

(57) ABSTRACT

Provided is an azo pigment represented by the following general formula (1), a tautomer of the azo pigment, and a salt or a hydrate thereof:

General formula (1)

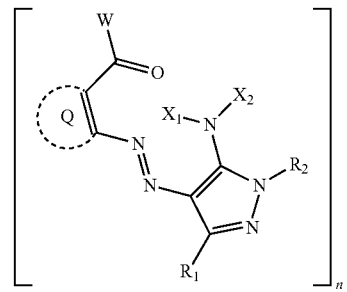

wherein Q represents the non-metallic atoms necessary to complete a 5- to 7-membered heterocyclic group, W represents an alkoxy group, an amino group, an alkyl group, or an aryl group, $X_1$ and $X_2$ each independently represents a hydrogen, an alkyl group, an acyl group, an alkylsulfonyl group, or an arylsulfonyl group, $R_1$ represents a hydrogen or a substituent, $R_2$ represents a heterocyclic group, n represents an integer of from 1 to 4 and the general formula (1) represents a dimer formed through Q, W, $X_1$, $X_2$, $R_1$, or $R_2$ when n=2, a trimer formed through Q, W, $X_1$, $X_2$, $R_1$, or $R_2$ when n=3, and a tetramer formed through Q, W, $X_1$, $X_2$, $R_1$, or $R_2$ when n=4.

12 Claims, 8 Drawing Sheets

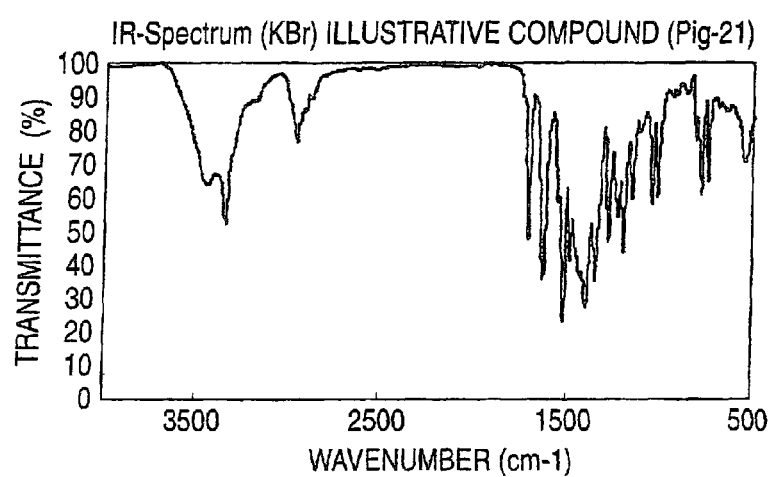
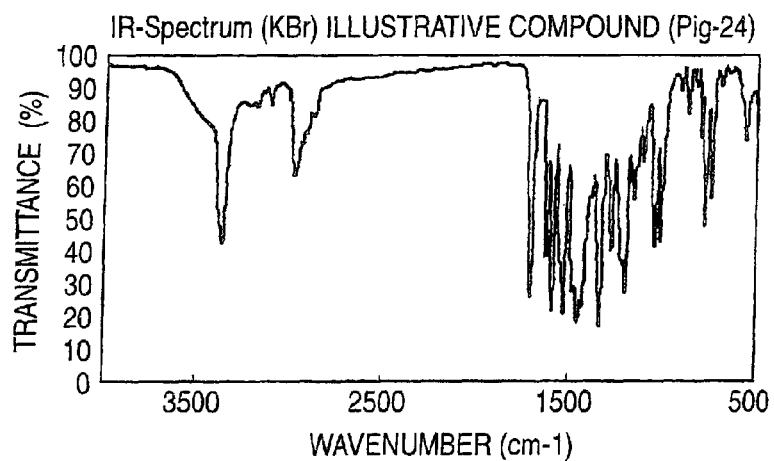
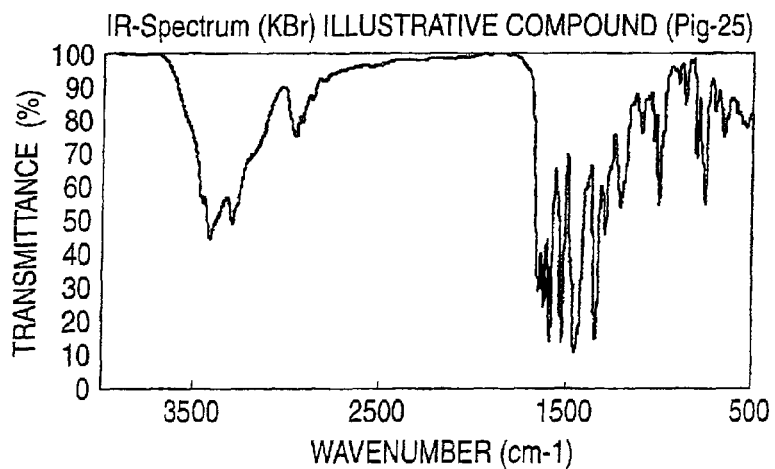

ND INK FOR INKJET RECORDING
AZO PIGMENTS, AND PIGMENT DISPERSION, COLORING COMPOSITION AND INK FOR INKJET RECORDING CONTAINING THE AZO PIGMENT

TECHNICAL FIELD

The present invention relates to novel azo pigments, and a pigment dispersion, coloring composition and ink for inkjet recording containing the azo pigment.

BACKGROUND ART

In recent years, as image-recording materials, materials for forming color images have been predominant and, specifically, recording materials for an ink jet system, recording materials for a thermal transfer system, recording materials for an electrophotographic system, transfer type silver halide light-sensitive materials, printing inks, and recording pens have found widespread use. Also, in photographing devices such as CCDs for photographing equipment, and in LCDs and PDPs for display, color filters are used for recording or reproducing a color image. In these color image recording materials and color filters, colorants (dyes or pigments) of three primary colors of a so-called additive color mixing process or subtractive color mixing process have been used in order to display or record full-color images. In actuality, however, there is no fast colorant having the absorption characteristics capable of realizing a preferred color reproduction region and resisting various use conditions and environmental conditions. Thus, the improvement thereof has strongly been desired.

In particular, use of recording materials has extended from domestic use to industrial use and, as a result, they are required to have performance at a higher level (regarding hue, tinctorial strength, and image fastness to light, gas, heat, moisture, and chemicals).

With respect to coloring materials to be used (for example, an ink composition for inkjet recording), dye ink compositions are required to be changed from water-soluble ink compositions to oil-soluble ink compositions and, in the case where a much higher level of performance is required (from indoor use to outdoor use), the ink compositions are required to be changed from dye ink compositions to pigment ink compositions.

Difference between dyes and pigments in using manner is that, while dyes are used in a state of being dissolved (a state of molecular dispersion) in a medium such as fibers or solvents, pigments are used in a state of solid particles (molecular aggregate) finely dispersed in a medium without being dissolved.

The dyes or pigments to be used for the above-mentioned uses are required to have in common the following properties. That is, they are required to have absorption characteristics favorable in view of color reproduction and have good fastness under the conditions of the environment wherein they are used, for example, fastness against light, heat, and an oxidative gas such as ozone. In addition, in the case where the colorant is a pigment, the pigment is further required to be substantially insoluble in water or in an organic solvent, to have a good fastness to chemicals, and not to lose the preferred absorption characteristics it shows in a molecularly dispersed state even when used as particles. Although the required properties described above can be controlled by adjusting the intensity of intermolecular mutual action, both of them are in a trade-off relation with each other, thus being difficult to allow them to be compatible with each other.

Besides, in the case of using a pigment as the colorant, the pigment is additionally required to have a particle size and a particle shape necessary for realizing desired transparency, to have good fastness under the conditions of the environment wherein they are used, for example, fastness against light, heat, and an oxidative gas such as ozone, to have good fastness to an organic solvent and chemicals such as a sulfurous acid gas, and to be capable of being dispersed in a used medium to a level of fine particles, with the dispersed state being stable. In particular, there is a strong demand for a pigment which has a good yellow hue and a high tinctorial strength and is fast to light, moist heat, and active gases in the environment.

That is, in comparison with a dye which is required to have properties as colorant molecules, the pigment is required to have more properties, i.e., it is required to satisfy all of the above-mentioned requirements as a solid of an aggregate of a colorant (dispersion of fine particles) as well as the properties as molecules of a colorant molecule. As a result, a group of compounds which can be used as pigments are extremely limited in comparison with dyes. Even when high-performance dyes are converted to pigments, few of them can satisfy requirement for the properties as a dispersion of fine particles. Thus, such pigments are difficult to develop. This can be confirmed from the fact that the number of pigments registered in Color Index is no more than $1/10$ of the number of dyes.

Azo pigments are excellent in hue and tinctorial strength which are characteristics of coloring, and hence they have widely been used in printing inks, ink compositions for an ink jet system, and electrophotographic materials. Of the pigments, diarylide pigments are the most typically used yellow azo pigments. Examples of such diarylide pigments include C.I. pigment yellow 12, C.I. pigment yellow 13, and C.I. pigment yellow 17. However, the diarylide pigments are inferior in fastness, particularly light fastness, and hence they are decomposed when prints printed by them are exposed to light, thus being inappropriate for prints which are to be stored for a long time.

In order to remove such defects, there have been disclosed azo pigments having a fastness improved by increasing molecular weight or by introducing a group having a strong intermolecular mutual action (see, for example, JP-A-56-38354, U.S. Pat. No. 2,936,306 and JP-A-11-100519). However, even the improved pigments, for example, the pigments described in JP-A-56-38354 have the defect that they have still insufficient light fastness though improved to some extent, and pigments described in, for example, U.S. Pat. No. 2,936,306 and JP-A-11-100519 have a greenish hue and a low tinctorial strength, thus being inferior in coloring characteristics.

Also, JP-A-2003-277662 discloses colorants which have absorption characteristics of excellent color reproducibility and has a sufficient fastness. However, all of the specific compounds described in JP-A-2003-277662 are soluble in water or in an organic solvent, thus being insufficient in resistance to chemicals.

Incidentally, U.S. Pat. No. 7,125,446 describes an example of using a dye as a colorant and dissolving it in a water medium to use as a water-soluble ink composition for inkjet recording. Also, JP-A-61-36362 describes an anion-type monoazo compound characterized by light fastness. However, the level of image fastness of these is not satisfying at a high level, and they fail to provide a using manner as a pigment.

In the case of expressing a full-color image based on the subtractive color mixing process using three colors of yellow, magenta, and cyan or using four colors further including black, use of a pigment having an inferior fastness as a yellow pigment would change gray balance of the prints with the lapse of time, and use of a pigment having inferior coloring characteristics would reduce color reproducibility upon printing. Thus, in order to obtain prints which can maintain high color reproducibility for a long time, there have been desired a yellow pigment and a pigment dispersion which have both good coloring characteristics and good fastness.

Also, Japanese Patent No. 4,073,453 discloses colorants, as dyes, having absorption characteristics excellent in color reproducibility with an extremely high-level fastness.

DISCLOSURE OF THE INVENTION

However, specific compounds described in Japanese Patent No. 4,073,453 all have such a high solubility in water or an organic solvent that, when trying to use them as pigments, there cannot be obtained intended dispersions of fine pigment particles, resulting in formation of solutions or emulsions wherein the colorants are dissolved. As a result, it has been difficult to use them in coloring materials containing a pigment dispersion for the purpose of providing various required performances at high levels.

An object of the invention is to provide azo pigments having excellent coloring characteristics such as hue and having high tinctorial strength and excellent light fastness, and a dispersion of the azo pigment, a coloring composition and an ink composition for inkjet recording having excellent coloring characteristics, light fastness, and a dispersion stability.

As a result of intensive investigations in consideration of the above-mentioned circumstances, the inventors have found that azo pigments wherein the carbon atom adjacent to an azo group is substituted by a carbonyl group capable of forming an intramolecular hydrogen bond have excellent coloring properties, form dispersed particles of a small particle diameter, and have both tinctorial strength and light fastness, thus having achieved the present invention.

That is, the invention is as follows.

[1] An azo pigment represented by the following general formula (1), a tautomer of the azo pigment, and a salt or a hydrate thereof:

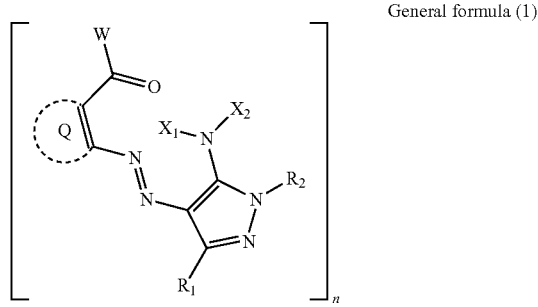

General formula (1)

wherein

Q represents the non-metallic atoms necessary to complete a 5- to 7-membered heterocyclic group, W represents an alkoxy group, an amino group, an alkyl group, or an aryl group, $X_1$ and $X_2$ each independently represents a hydrogen, an alkyl group, an acyl group, an alkylsulfonyl group, or an arylsulfonyl group, $R_1$ represents a hydrogen or a substituent, $R_2$ represents a heterocyclic group, n represents an integer of from 1 to 4 and, when n=2, the general formula (1) represents a dimer formed through Q, W, $X_1$, $X_2$, $R_1$, or $R_2$, when n=3, the general formula (1) represents a trimer formed through Q, W, $X_1$, $X_2$, $R_1$, or $R_2$, and when n=4, the general formula (1) represents a tetramer formed through Q, W, $X_1$, $X_2$, $R_1$, or $R_2$.

[2] The azo pigment, the tautomer of the azo pigment, and the salt or hydrate thereof according to [1], wherein the azo pigment is represented by the following general formula (2):

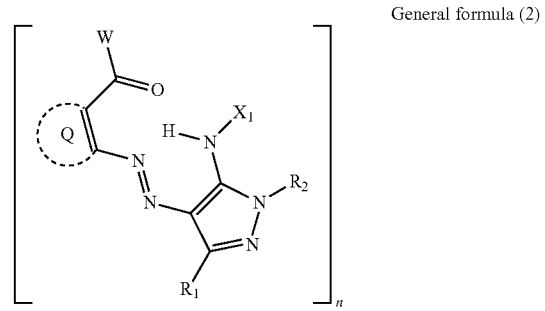

General formula (2)

wherein

Q, W, $X_1$, $X_2$, $R_1$, $R_2$, and n are the same as defined for Q, W, $X_1$, $X_2$, $R_1$, $R_2$, and n in the general formula (1).

[3] The azo pigment, the tautomer of the azo pigment, and the salt or hydrate thereof according to [1] or [2], wherein Q forms a 5-membered nitrogen-containing heterocyclic ring together with carbon atoms.

[4] The azo pigment, the tautomer of the azo pigment, and the salt or hydrate thereof according to any one of [1] to [3], wherein n represents 2.

[5] The azo pigment, the tautomer of the azo pigment, and the salt or hydrate thereof according to any one of [2] to [4], wherein $X_1$ represents a hydrogen.

[6] The azo pigment, the tautomer of the azo pigment, and the salt or hydrate thereof according to any one of [1] to [5], wherein the azo pigment is represented by the following general formula (3):

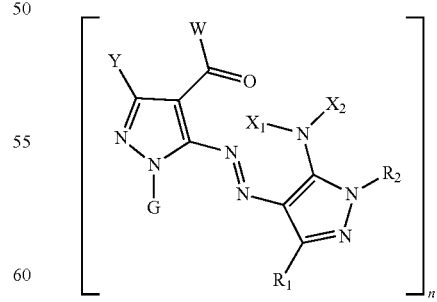

General formula (3)

wherein

Y represents a hydrogen or a substituent,

G represents a hydrogen, an alkyl group, a cycloalkyl group, an aralkyl group, an alkenyl group, an alkynyl group, an aryl group, or a heterocyclic group, and W, $X_1$, $X_2$, $R_1$, $R_2$, and n are the same as defined for W, $X_1$, $X_2$, $R_1$, $R_2$, and n in the general formula (1).

[7] The azo pigment, the tautomer of the azo pigment, and the salt or hydrate thereof according to [6], wherein the azo pigment is represented by the following general formula (4):

General formula (4)

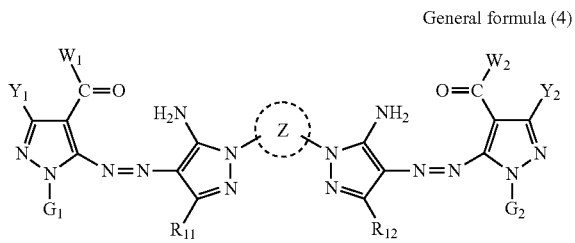

wherein

Z represents atoms necessary to complete a 5- to 8-membered nitrogen-containing heterocyclic ring, $Y_1$, $Y_2$, $R_{11}$, and $R_{12}$ each independently represents a hydrogen or a substituent, $G_1$ and $G_2$ each independently represents a hydrogen, an alkyl group, an aralkyl group, an alkenyl group, an alkynyl group, an aryl group, or a heterocyclic group, and $W_1$ and $W_2$ each independently represents an alkoxy group, an amino group, an alkyl group, or an aryl group.

[8] The azo pigment, the tautomer of the azo pigment, and the salt or hydrate thereof according to any one of [1] to [7], wherein W, $W_1$, and $W_2$ each independently represents an alkoxy group containing a total of 3 or less carbon atoms, an amino group, or an alkylamino group containing a total of 3 or less carbon atoms.

[9] The azo pigment, the tautomer of the azo pigment, and the salt or hydrate thereof according to any one of [6] to [8], wherein G, $G_1$, and $G_2$ each independently represents an alkyl group containing a total of 3 or less carbon atoms.

[10] The azo pigment, the tautomer of the azo pigment, and the salt or hydrate thereof according to [7], wherein Z represents a 6-membered nitrogen-containing heterocyclic ring.

[11] A pigment dispersion having:

at least one of the azo pigment, the tautomer of the azo pigment, and the salt or hydrate thereof described in any one of [1] to [10].

[12] A coloring composition having:

at least one of the azo pigment, the tautomer of the azo pigment, and the salt or hydrate thereof described in any one of [1] to [10].

[13] An ink composition for inkjet recording having the pigment dispersion described in [11].

BRIEF DESCRIPTION OF THE DRAWING

FIG. 10 is an infrared absorption spectrum of an illustrative compound (Pig.-21) of the azo pigment of the present invention.

FIG. 11 is an infrared absorption spectrum of an illustrative compound (Pig.-24) of the azo pigment of the present invention.

FIG. 12 is an infrared absorption spectrum of an illustrative compound (Pig.-25) of the azo pigment of the present invention.

BEST MODE FOR CARRYING OUT THE INVENTION

Figure 1:
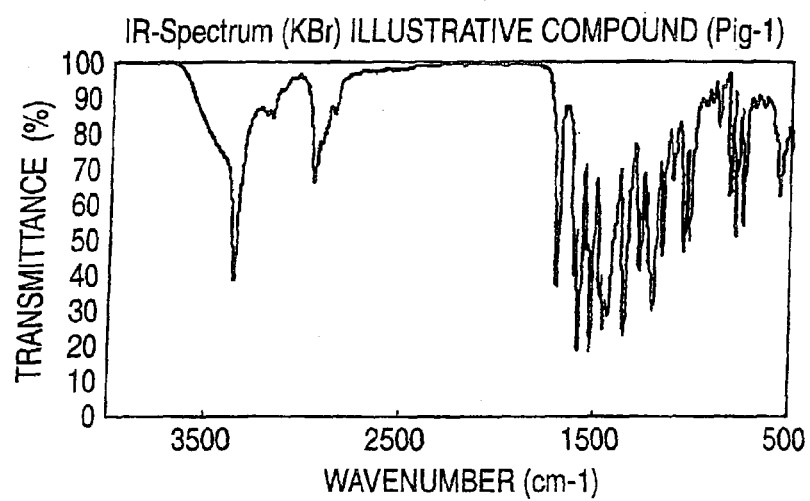
FIG. 1 is an infrared absorption spectrum of an illustrative compound (Pig.-1) of the azo pigment of the present invention.

The present invention will be described in detail below.

[Azo Pigments]

The azo pigments of the invention are represented by the foregoing general formula (1). First, azo pigments represented by the following general formula (1) will be described below.

The compounds represented by the general formula (1) are liable to produce intermolecular mutual action between the colorant molecules due to the unique structure thereof, and have a low solubility for organic solvents or the like, thus being capable of acting as an azo pigment.

As is different from dyes which are used by dissolving in water or an organic solvent in a molecular dispersion state, pigments are used by dispersing in a solvent as solid particles such as molecular aggregates.

General formula (1):

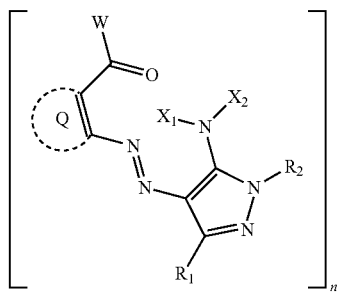

(In the general formula (1), Q represents the non-metallic atoms necessary to complete a 5- to 7-membered heterocyclic group, W represents an alkoxy group, an amino group, an alkyl group, or an aryl group, $X_1$ and $X_2$ each independently represents a hydrogen, an alkyl group, an acyl group, an alkylsulfonyl group, or an arylsulfonyl group, $R_1$ represents a hydrogen or a substituent, $R_2$ represents a heterocyclic group, and n represents an integer of from 1 to 4. When n=2, the general formula (1) represents a dimer formed through Q, W, $X_1$, $X_2$, $R_1$, or $R_2$. When n=3, the general formula (1) represents a trimer formed through Q, W, $X_1$, $X_2$, $R_1$, or $R_2$. When n=4, the general formula (1) represents a tetramer formed through Q, W, $X_1$, $X_2$, $R_1$, or $R_2$.

When n represents 1, Q, W, $X_1$, $X_2$, $R_1$, and $R_2$ each represents a monovalent group, thus the general formula (1) representing a mono-azo pigment shown between the parentheses.

When n represents 2, Q, W, $X_1$, $X_2$, $R_1$, and $R_2$ each represents a monovalent or divalent group, provided that at least one of them represents a divalent group, thus the general formula (1) representing a bis-azo pigment of a colorant shown between the parentheses.

When n represents 3, Q, W, $X_1$, $X_2$, $R_1$, and $R_2$ each represents a monovalent, divalent, or trivalent group, provided that at least two of them represents a divalent group or that at least one of them represents a trivalent group, thus the general formula (1) representing a tris-azo pigment of a colorant shown between the parentheses.

When n represents 4, Q, W, $X_1$, $X_2$, $R_1$, and $R_2$ each represents a monovalent, divalent, or trivalent group, provided that at least two of them represents a divalent group or that at least one of them represents a trivalent group or a tetravalent group, thus the general formula (1) representing a tetra-azo pigment of a colorant shown between the parentheses.

n represents an integer of preferably from 1 to 3, more preferably 1 or 2, most preferably 2. When n represents 2, solubility of the pigment for water or an organic solvent is lowered (substantially becomes scarcely soluble), and resistance to water and fastness to chemicals are improved, thus n being preferably 2.

In the general formula (1), $X_1$ and $X_2$ each independently represents a hydrogen, an alkyl group, an acyl group, an alkylsulfonyl group, or an arylsulfonyl group.

Examples of the alkyl group which $X_1$ and $X_2$ each independently represents include straight, branched, or cyclic, substituted or unsubstituted alkyl groups, with a cycloalkyl group, a bicycloalkyl group and, further, a tricyclic structure having more than two cyclic structures being also included. An alkyl group in the substituents to be described hereinafter (for example, an alkyl group in an alkoxy group or an alkylthio group) also represents the alkyl group of the above-described concept.

More specifically, the alkyl group is preferably an alkyl group containing from 1 to 30 carbon atoms, and examples thereof include a methyl group, an ethyl group, a n-propyl group, an isopropyl group, a t-butyl group, a n-octyl group, an eicosyl group, a 2-chloroethyl group, a 2-cyanoethyl group, and a 2-ethylhexyl group. The cycloalkyl group is preferably a substituted or unsubstituted cycloalkyl group containing from 3 to 30 carbon atoms, and examples thereof include a cyclohexyl group, a cyclopentyl group, and a 4-n-dodecylcyclohexyl group. The bicycloalkyl group is preferably a substituted or unsubstituted bicycloalkyl group containing from 5 to 30 carbon atoms, i.e., a monovalent group formed by removing one hydrogen atom from a bicycloalkane containing from 5 to 30 carbon atoms, and examples thereof include a bicyclo[1,2,2]heptan-2-yl group and a bicyclo[2,2,2]octan-3-yl group.

Examples of a preferred acyl group which $X_1$ and $X_2$ each independently represents include a formyl group, a substituted or unsubstituted alkylcarbonyl group containing from 2 to 30 carbon atoms, a substituted or unsubstituted arylcarbonyl group containing from 7 to 30 carbon atoms, and a substituted or unsubstituted heterocyclic carbonyl group containing from 2 to 30 carbon atoms wherein the heterocyclic ring is connected to the carbonyl group via a carbon atom. Specific examples thereof include an acetyl group, a pivaloyl group, a 2-chloroacetyl group, a stearoyl group, a benzoyl group, a p-n-octyloxyphenylcarbonyl group, a 2-pyridylcarbonyl group, and a 2-furylcarbonyl group.

Examples of a preferred alkylsulfonyl or arylsulfonyl group which $X_1$ and $X_2$ each independently represents include a substituted or unsubstituted alkylsulfonyl group containing from 1 to 30 carbon atoms and a substituted or unsubstituted arylsulfonyl group containing from 6 to 30 carbon atoms. Specific examples thereof include a methylsulfonyl group, an ethylsulfonyl group, a phenylsulfonyl group, and a p-methylphenylsulfonyl group.

Of these, $X_1$ and $X_2$ each independently represents preferably a hydrogen, an acyl group, or an alkylsulfonyl group, with a hydrogen being particularly preferred. In particular, it is most preferred that both $X_1$ and $X_2$ represent a hydrogen.

When at least one of $X_1$ and $X_2$ represents a hydrogen, there can be formed an intramolecular crosslinking hydrogen bonds between the oxygen atom of the carbonyl group, the nitrogen atom of the azo group, and the hydrogen atom of $X_1$ or $X_2$, which is preferred in that improve hue and image fastness can be obtained.

In the general formula (1), W represents an alkoxy group, an amino group, an alkyl group, or an aryl group.

The alkoxy group represented by W is preferably a substituted or unsubstituted alkoxy group containing from 1 to 30 carbon atoms, and examples thereof include a methoxy group, an ethoxy group, an isopropoxy group, a t-butoxy group, a n-octyloxy group, and a 2-methoxyethoxy group.

The amino group represented by W includes an alkylamino group, an arylamino group, and a heterocyclic amino group, and is preferably an amino group, a substituted or unsubstituted alkylamino group containing from 1 to 30 carbon atoms, or a substituted or unsubstituted anilino group containing from 6 to 30 carbon atoms. Examples thereof include a methylamino group, a dimethylamino group, an anilino group, an N-methyl-anilino group, and a diphenylamino group.

The alkyl group represented by W includes straight, branched, or cyclic, substituted or unsubstituted alkyl groups, with a cycloalkyl group, a bicycloalkyl group and, further, a tricycle group having many cyclic structures being also included. An alkyl group in the substituents to be described hereinafter (for example, an alkyl group in an alkoxy group or an alkylthio group) also represents the alkyl group of the above-described concept. More specifically, the alkyl group is preferably an alkyl group containing from 1 to 30 carbon atoms, and examples thereof include a methyl group, an ethyl group, a n-propyl group, an isopropyl group, a t-butyl group, a n-octyl group, an eicosyl group, a 2-chloroethyl group, a 2-cyanoethyl group, and a 2-ethylhexyl group. The cycloalkyl group is preferably a substituted or unsubstituted cycloalkyl group containing from 3 to 30 carbon atoms, and examples thereof include a cyclohexyl group, a cyclopentyl group, and a 4-n-dodecylcyclohexyl group. The bicycloalkyl group is preferably a substituted or unsubstituted bicycloalkyl group containing from 5 to 30 carbon atoms, i.e., a monovalent group formed by removing one hydrogen atom from a bicycloalkane containing from 5 to 30 carbon atoms, and examples thereof include a bicyclo[1,2,2]heptan-2-yl group and a bicyclo[2,2,2]octan-3-yl group.

The aryl group represented by W is preferably a substituted or unsubstituted aryl group containing from 6 to 30 carbon atoms, and examples thereof include a phenyl group, a p-tolyl group, a naphthyl group, a m-chlorophenyl group, and an o-hexadecanoylaminophenyl group.

Of these, W preferably represents an alkoxy group, an amino group, or an alkyl group, more preferably represents an alkoxy group or an amino group, still more preferably represents an alkoxy group containing a total of 5 or less carbon atoms, an amino group ($-NH_2$ group), or an alkylamino group containing a total of 5 or less carbon atoms, particularly preferably represents an alkoxy group containing a total of 3 or less carbon atoms or an alkylamino group containing a total of 3 or less carbon atoms, with a methoxy group being most preferred. In the case where W represents an alkoxy group containing a total of 5 or less carbon atoms, an amino group, or an alkylamino group containing a total of 5 or less carbon atoms, the colorant molecules are liable to produce strong intramolecular and intermolecular mutual action, and hence they can easily constitute a pigment having a more stable molecular alignment, thus being preferred in the points of good hue and high fastness (to light, gas, heat, water, and chemicals).

In the general formula (1), $R_1$ represents a hydrogen or a substituent. Examples of the substituent represented by $R_1$ include a straight or branched alkyl group containing from 1 to 12 carbon atoms, a straight or branched aralkyl group containing from 7 to 18 carbon atoms, a straight or branched alkenyl group containing from 2 to 12 carbon atoms, a straight or branched alkynyl group containing from 2 to 12 carbon atoms, a straight or branched cycloalkyl group containing from 3 to 12 carbon atoms, a straight or branched cycloalkenyl group containing from 3 to 12 carbon atoms (for example, methyl, ethyl, n-propyl, i-propyl, n-butyl, i-butyl, sec-butyl, t-butyl, 2-ethylhexyl, 2-methylsulfonylethyl, 3-phenoxypropyl, trifluoromethyl or cyclopentyl), a halogen atom (for example, a chlorine atom or a bromine atom), an aryl group (for example, phenyl, 4-t-butylphenyl or 2,4-di-t-amylphenyl), a heterocyclic group (for example, imidazolyl, pyrazolyl, triazolyl, 2-furyl, 2-thienyl, 2-pyrimidinyl or 2-benzothiazolyl), a cyano group, a hydroxyl group, a nitro group, a carboxy group, an amino group, an alkyloxy group (for example, methoxy, ethoxy, 2-methoxyethoxy or 2-methylsulfonylethoxy), an aryloxy group (for example, phenoxy, 2-methylphenoxy, 4-t-butylphenoxy, 3-nitrophenoxy, 3-t-butyloxycarbonylphenoxy or 3-methoxycarbonylphenyloxy), an acylamino group (for example, acetamido, benzamido or 4-(3-t-butyl-4-hydroxyphenoxy)butanamido), an alkylamino group (for example, methylamino, butylamino, diethylamino or methylbutylamino), an arylamino group (for example, phenylamino or 2-chloroanilino), an ureido group (for example, phenylureido, methylureido or N,N-dibutylureido), a sulfamoylamino group (for example, N,N-dipropylsulfamoylamino), an alkylthio group (for example, methylthio, octylthio or 2-phenoxyethylthio), an arylthio group (for example, phenylthio, 2-butoxy-5-t-octylphenylthio or 2-carboxyphenylthio), an alkyloxycarbonylamino group (for example, methoxycarbonylamino), an alkylsulfonylamino group and an arylsulfonylamino group (for example, methylsulfonylamino, phenylsulfonylamino or p-toluenesulfonylamino), a carbamoyl group (for example, N-ethylcarbamoyl or N,N-dibutylcarbamoyl), a sulfamoyl group (for example, N-ethylsulfamoyl, N,N-dipropylsulfamoyl or N-phenylsulfamoyl), a sulfonyl group (for example, methylsulfonyl, octylsulfonyl, phenylsulfonyl or p-toluenesulfonyl), an alkyloxycarbonyl group (for example, methoxycarbonyl or butyloxycarbonyl), a heterocyclic oxy group (for example, 1-phenyltetrazol-5-oxy or 2-tetrahydropyranyloxy), an azo group (for example, phenylazo, 4-methoxyphenylazo, 4-pivaloylaminophenylazo or 2-hydroxy-4-propanoylphenylazo), an acyloxy group (for example, acetoxy), a carbamoyloxy group (for example, N-methylcarbamoyloxy or N-phenylcarbamoyloxy), a silyloxy group (for example, trimethylsilyloxy or dibutylmethylsilyloxy), an aryloxycarbonylamino group (for example, phenoxycarbonylamino), an imido group (for example, N-succinimido or N-phthalimido), a heterocyclic thio group (for example, 2-benzothiazolylthio, 2,4-di-phenoxy-1,3,5-triazol-6-thio or 2-pyridylthio), a sulfinyl group (for example, 3-phenoxypropylsulfinyl), a phosphonyl group (for example, phenoxyphosphonyl, octyloxyphosphonyl or phenylsulfonyl), an aryloxycarbonyl group (for example, phenoxycarbonyl), an acyl group (for example, acetyl, 3-phenylpropanoyl or benzoyl), and an ionic hydrophilic group (for example, a carboxyl group, a sulfo group, a phosphono group or a quaternary ammonium group).

In the general formula (1), $R_1$ preferably represents a substituted or unsubstituted acylamino group containing a total of from 1 to 8 carbon atoms, a substituted or unsubstituted alkyl group containing a total of from 1 to 12 carbon atoms, a substituted or unsubstituted aryl group containing a total of from 6 to 18 carbon atoms, or a substituted or unsubstituted heterocyclic group containing a total of from 4 to 12 carbon atoms, more preferably represents a straight or branched alkyl group containing a total of from 1 to 8 carbon atoms, still more preferably represents a methyl group, an i-propyl group, or a t-butyl group, particularly preferably represents an i-propyl group or a t-butyl group, with a t-butyl group being most preferred.

When $R_1$ represents a straight or branched alkyl group containing a total of a small number (from 1 to 4) of carbon atoms, the steric alignment of the colorant molecules can be controlled with ease (aligned with a definite distance and a definite angle). As a result, pigment particles having a stable intramolecular and intermolecular mutual action are easily formed, which is preferred in view of improving hue, tinctorial strength, and image fastness.

In the general formula (1), $R_2$ represents a heterocyclic group which may further be condensed with other ring(s). $R_2$ preferably represents a 5- to 8-membered heterocyclic ring, more preferably represents a substituted or unsubstituted 5- or 6-membered heterocyclic group, particularly preferably represents a 6-membered, nitrogen-containing heterocyclic group containing from 3 to 10 carbon atoms.

To illustrate the heterocyclic group represented by $R_2$ without restricting the substitution position, there can be illustrated pyridyl, pyrazinyl, pyridazinyl, pyrimidinyl, triazinyl, quinolinyl, isoquinolinyl, quinazolinyl, cinnolinyl, phthalazinyl, quinoxalinyl, pyrrolyl, indolyl, furyl, benzofuryl, thienyl, benzothienyl, pyrazolyl, imidazolyl, benzimidazolyl, triazolyl, oxazolyl, benzoxazolyl, thiazolyl, benzothiazolyl, isothiazolyl, benzisothiazolyl, thiadiazolyl, isoxazolyl, benzisoxazolyl, pyrrolidinyl, piperidinyl, piperazinyl, imidazolidinyl, thiazolinyl, and sulfolanyl.

Preferred examples of the heterocyclic group include pyridyl, pyrimidinyl, S-triazinyl, pyridazinyl, pyrazinyl, 1,2,4-thiadiazolyl, 1,3,4-thiadiazolyl, and imidazolyl, and more preferred examples thereof include pyridyl, pyrimidinyl, S-triazinyl, pyridazinyl, and pyrazinyl. In view of hue, tinctorial strength, and image fastness, pyrimidinyl and S-triazinyl are particularly preferred. In view of hue and image fastness, pyrimidinyl having substituents at 4- and 6-positions and s-triazinyl having an alkoxy group containing from 1 to 4 carbon atoms at 2-position are still more preferred. Of them, pyrimidinyl having substituents at 4- and 6-positions is most preferred in the point of good hue and improved light fastness.

In the general formula (1), Q represents the non-metallic atoms necessary to complete a 5- to 7-membered heterocyclic group, with the heterocyclic group optionally being condensed with an aromatic ring or other heterocyclic ring. Examples of the 5- to 7-membered heterocyclic ring which Q completes together with the carbon atoms include a thienyl group, a furyl group, a pyrrolyl group, an indolyl group, an imidazolyl group, a pyrazolyl group, a thiazolyl group, an isothiazolyl group, an oxazolyl group, an isoxazolyl group, a triazinyl group, a pyridyl group, a pyrazinyl group, and a pyridazinyl group. Each of the heterocyclic groups may further have a substituent.

The 5- to 7-membered heterocyclic ring which Q completes together with the carbon atoms is preferably a 5-membered nitrogen-containing heterocyclic ring, most preferably a heterocyclic ring represented by the following general formulae (a) to (i). Still more preferred are (a), (b), (c), (e), and (i), with (a), (c), and (i) being particularly preferred. Of these, (a) is most preferred in view of hue, tinctorial strength, and image fastness.

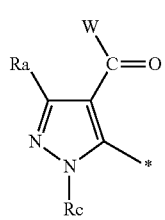
(a)

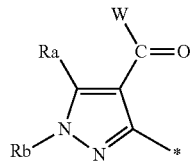
(b)

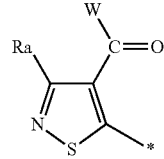
(c)

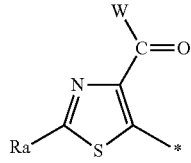
(d)

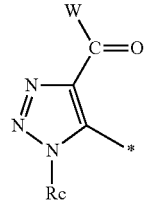
(e)

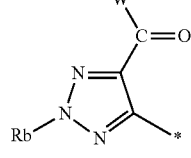
(f)

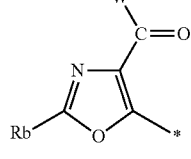
(g)

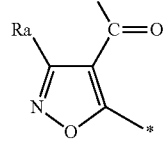
(h)

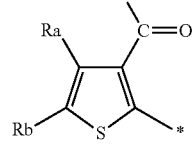
(i)

In the general formulae (a) to (i), Ra represents a hydrogen or a substituent, Rb and Rc each independently represents a hydrogen, an alkyl group, a cycloalkyl group, an aralkyl group, an alkenyl group, an alkynyl group, an aryl group, or a heterocyclic group. W is the same as W in the general formula (1), and preferred examples are also the same as described there. * shows the point of the attachment to the azo linkage in the general formula (1).

W represents an alkoxy group, an amino group, or an alkyl group, more preferably represents an alkoxy group or an amino group, still more preferably represents an alkoxy group containing a total of 5 or less carbon atoms, an amino group (—$NH_2$ group), or an alkylamino group containing a total of 5 or less carbon atoms, particularly preferably represents an alkoxy group containing a total of 3 or less carbon atoms or an alkylamino group containing a total of 3 or less carbon atoms, with a methoxy group being most preferred.

In the case where W represents an alkoxy group containing a total of 5 or less carbon atoms, an amino group, or an alkylamino group containing a total of 5 or less carbon atoms, the colorant molecules are liable to produce strong intramolecular and intermolecular mutual action, and hence they can easily constitute a pigment having a more stable molecular alignment, thus being preferred in the points of good hue and high fastness (to light, gas, heat, water, and chemicals). Further, a methoxy group, an ethoxy group, and an amino group are preferred in view of hue, light fastness, and resistance to solvents, with a methoxy group being most preferred in view of good hue and improved light fastness.

Ra preferably represents a hydrogen, a substituted or unsubstituted alkyl group containing a total of from 1 to 12 carbon atoms, a substituted or unsubstituted aryl group containing a total of from 6 to 18 carbon atoms, or a substituted or unsubstituted heterocyclic group containing a total of from 4 to 12 carbon atoms, more preferably represents a hydrogen or a straight or branched alkyl group containing a total of from 1 to 8 carbon atoms, still more preferably represents a hydrogen or a straight alkyl group containing a total of from 1 to 4 carbon atoms, particularly preferably represents a hydrogen or a methyl group, with a hydrogen being most preferred in view of good hue and improved light fastness.

Rb and Rc each preferably represents a hydrogen, a substituted or unsubstituted alkyl group, a substituted or unsubstituted cycloalkyl group, a substituted or unsubstituted alkenyl group, a substituted or unsubstituted alkynyl group, a substituted or unsubstituted aralkyl group, a substituted or unsubstituted aryl group, a substituted or unsubstituted heterocyclic group, more preferably represents a substituted or unsubstituted alkyl group, a substituted or unsubstituted aryl group, or a substituted or unsubstituted heterocyclic group. In particular, an alkyl group containing a total of 3 or less carbon atoms is preferred in view of hue and image fastness, with a methyl group being most preferred in view of good hue and improved light fastness.

As substituents in the case where Q, W, $X_1$, $X_2$, $R_1$, and $R_2$ further have a substituent, there can be illustrated the following substituents (hereinafter also referred to "substituent J" in some cases).

Examples of the substituents include a halogen atom, an alkyl group, an aralkyl group, an alkenyl group, an alkynyl group, an aryl group, a heterocyclic group, a cyano group, a hydroxyl group, a nitro group, an alkoxy group, an aryloxy group, a silyloxy group, a heterocyclic oxy group, an acyloxy group, a carbamoyloxy group, an alkoxycarbonyloxy group, an aryloxycarbonyloxy group, an amino group, an acylamino group, an aminocarbonylamino group, an alkoxycarbonylamino group, an aryloxycarbonylamino group, a sulfamoylamino group, an alkyl- or aryl-sulfonylamino group, a mercapto group, an alkylthio group, an arylthio group, a heterocyclic thio group, a sulfamoyl group, an alkyl- or aryl-sulfinyl group, an alkyl- or aryl-sulfonyl group, an acyl group, an aryloxycarbonyl group, an alkoxycarbonyl group, a carbamoyl group, an aryl- or heterocyclic azo group, an imido group, a phosphino group, a phosphinyl group, a phosphinyloxy group, a phosphinylamino group, and a silyl group.

More specifically, examples of the halogen atom include a fluorine atom, a chlorine atom, a bromine atom, and an iodine atom.

Examples of the alkyl group include straight, branched, or cyclic, substituted or unsubstituted alkyl groups, with a cycloalkyl group, a bicycloalkyl group and, further, a tricyclic structure having more cyclic structures being also included. An alkyl group in the substituents to be described hereinafter (for example, an alkyl group in an alkoxy group or an alkylthio group) also represents the alkyl group of the above-described concept. More specifically, the alkyl group is preferably an alkyl group containing from 1 to 30 carbon atoms, and examples thereof include a methyl group, an ethyl group, a n-propyl group, an isopropyl group, a t-butyl group, a n-octyl group, an eicosyl group, a 2-chloroethyl group, a 2-cyanoethyl group, and a 2-ethylhexyl group. The cycloalkyl group is preferably a substituted or unsubstituted cycloalkyl group containing from 3 to 30 carbon atoms, and examples thereof include a cyclohexyl group, a cyclopentyl group, and a 4-n-dodecylcyclohexyl group. The bicycloalkyl group is preferably a substituted or unsubstituted bicycloalkyl group containing from 5 to 30 carbon atoms, i.e., a monovalent group formed by removing one hydrogen atom from a bicycloalkane containing from 5 to 30 carbon atoms, and examples thereof include a bicyclo[1,2,2]heptan-2-yl group and a bicyclo[2,2,2]octan-3-yl group.

Examples of the aralkyl group include substituted or unsubstituted aralkyl groups. Preferred examples of the substituted or unsubstituted aralkyl groups include aralkyl groups containing from 7 to 30 carbon atoms, such as a benzyl group and a 2-phenethyl group.

Examples of the alkenyl group include straight, branched, or cyclic, substituted or unsubstituted alkenyl groups, with a cycloalkenyl group and a bicycloalkenyl group being also included. More specifically, the alkenyl group is preferably an alkenyl group containing from 2 to 30 carbon atoms, and examples thereof include a vinyl group, an allyl group, a prenyl group, a geranyl group, or an oleyl group. The cycloalkenyl group is preferably a substituted or unsubstituted cycloalkyl group containing from 3 to 30 carbon atoms, i.e., a monovalent group formed by removing one hydrogen atom from a cycloalkene containing from 3 to 30 carbon atoms, and examples thereof include a 2-cyclopentenn-1-yl group and a 2-cyclohexen-1-yl group. The bicycloalenkyl group is a substituted or unsubstituted bicycloalkenyl group, preferably a substituted or unsubstituted bicycloalkenyl group containing from 5 to 30 carbon atoms, i.e., a monovalent group formed by removing one hydrogen atom from a bicycloalkene containing one double bond, and examples thereof include a bicyclo[2,2,1]hept-2-en-1-yl group and a bicyclo[2,2,2]oct-2-en-4-yl group.

The alkynyl group is preferably a substituted or unsubstituted alkynyl group containing from 2 to 30 carbon atoms, such as an ethynyl group, a propargyl group, or a trimethylsilylethynyl group.

The aryl group is preferably a substituted or unsubstituted aryl group containing from 6 to 30 carbon atoms, such as a phenyl group, a p-tolyl group, a naphthyl group, a m-chlorophenyl group, or an o-hexadecanoylaminophenyl group.

The heterocyclic group is preferably a monovalent group formed by removing one hydrogen atom from a 5- or 6-membered, substituted or unsubstituted, aromatic or non-aromatic, heterocyclic compound, more preferably a 5- or 6-membered aromatic heterocyclic group containing from 3 to 30 carbon atoms, such as a 2-furyl group, a 2-thienyl group, a 2-pyrimidinyl group, or a 2-benzothiazolyl group.

The alkoxy group is preferably a substituted or unsubstituted alkoxy group containing from 1 to 30 carbon atoms, and examples thereof include a methoxy group, an ethoxy group, an isopropoxy group, a t-butoxy group, a n-octyloxy group, and a 2-methoxyethoxy group.

The aryloxy group is preferably a substituted or unsubstituted aryloxy group containing from 6 to 30 carbon atoms, and examples thereof include a phenoxy group, a 2-methylphenoxy group, a 4-t-butylphenoxy group, a 3-nitrophenoxy group, and a 2-tetradecanoylaminophenoxy group.

The silyloxy group is preferably a substituted or unsubstituted silyloxy group containing from 0 to 20 carbon atoms, and examples thereof include a trimethylsilyloxy group and a diphenylmethylsilyloxy group.

The heterocyclic oxy group is preferably a substituted or unsubstituted heterocyclic oxy group containing from 2 to 30 carbon atoms, and examples thereof include a 1-phenyltetrazol-5-oxy group and a 2-tetrahydropyranyloxy group.

The acyloxy group is preferably a formyloxy group, a substituted or unsubstituted alkylcarbonyloxy group containing from 2 to 30 carbon atoms, a substituted or unsubstituted arylcarbonyloxy group containing from 6 to 30 carbon atoms, and examples thereof include an acetyloxy group, a pivaloyloxy group, a stearoyloxy group, a benzoyloxy group, and a p-methoxyphenylcarbonyloxy group.

The carbamoyloxy group is preferably a substituted or unsubstituted carbamoyloxy group containing from 1 to 30 carbon atoms, and the examples thereof include an N,N-dimethylcarbamoyloxy group, an N,N-diethylcarbamoyloxy group, a morpholinocarbonyloxy group, an N,N-di-n-octylaminocarbonyloxy group, and an N-n-octylcarbamoyloxy group.

The alkoxycarbonyloxy group is preferably a substituted or unsubstituted alkoxycarbonyloxy group containing from 2 to 30 carbon atoms, and the examples thereof include a methoxycarbonyloxy group, an ethoxycarbonyloxy group, a t-butoxycarbonyloxy group, and a n-octylcarbonyloxy group.

The aryloxycarbonyloxy group is preferably a substituted or unsubstituted aryloxycarbonyloxy group containing from 7 to 30 carbon atoms, and the examples thereof include a phenoxycarbonyloxy group, a p-methoxyphenoxycarbonyloxy group, and a p-n-hexadecyloxyphenoxycarbonyloxy group.

The amino group includes an alkylamino group, an arylamino group, and a heterocyclic amino group, and is preferably an amino group, a substituted or unsubstituted alkylamino group containing from 1 to 30 carbon atoms, or a substituted or unsubstituted anilino group containing from 6 to 30 carbon atoms. Examples thereof include a methylamino group, a dimethylamino group, an anilino group, an N-methyl-anilino group, and a diphenylamino group.

The acylamino group is preferably a formylamino group, a substituted or unsubstituted alkylcarbonylamino group containing from 1 to 30 carbon atoms, or a substituted or unsubstituted arylcarbonylamino group containing from 6 to 30 carbon atoms. Examples thereof include an acetylamino group, a pivaloylamino group, a lauroylamino group, a benzoylamino group, and a 3,4,5-tri-n-octyloxyphenylcarbonylamino group.

The aminocarbonylamino group is preferably a substituted or unsubstituted aminocarbonylamino group containing from 1 to 30 carbon atoms, and the examples thereof include a carbamoylamino group, an N,N-dimethylaminocarbonylamino group, an N,N-diethylaminocarbonylamino group, and a morpholinocarbonylamino group.

The alkoxycarbonylamino group is preferably a substituted or unsubstituted alkoxycarbonylamino group containing from 2 to 30 carbon atoms, and the examples thereof include a methoxycarbonylamino group, an ethoxycarbonylamino group, a t-butoxycarbonylamino group, a n-octadecyloxycarbonylamino group, and an N-methyl-methoxycarbonylamino group.

The aryloxycarbonylamino group is preferably a substituted or unsubstituted aryloxycarbonylamino group containing from 7 to 30 carbon atoms, and the examples thereof include a phenoxycarbonylamino group, a p-chlorophenoxycarbonylamino group, and a m-n-octyloxyphenoxycarbonylamino group.

The sulfamoylamino group is preferably a substituted or unsubstituted sulfamoylamino group containing from 0 to 30 carbon atoms, and the examples thereof include a sulfamoylamino group, an N,N-dimethylaminosulfonylamino group, and an N-n-octylaminosulfonylamino group.

The alkyl- or aryl-sulfonylamino group is preferably a substituted or unsubstituted alkylsulfonylamino group containing from 1 to 30 carbon atoms, or a substituted or unsubstituted arylsulfonylamino group containing from 6 to 30 carbon atoms, and the examples thereof include a methylsulfonylamino group, a butylsulfonylamino group, a phenylsulfonylamino group, a 2,3,5-richlorophenylsulfonylamino group, and a p-methylphenylsulfonylamino group.

The alkylthio group is preferably a substituted or unsubstituted alkylthio group containing from 1 to 30 carbon atoms, and the examples thereof include a methylthio group, an ethylthio group, and a n-hexadecylthio group.

The arylthio group is preferably a substituted or unsubstituted arylthio group containing from 6 to 30 carbon atoms, and the examples thereof include a phenylthio group, a p-chlorophenylthio group, and an m-methoxyphenylthio group.

The heterocyclic thio group is preferably a substituted or unsubstituted heterocyclic thio group containing from 2 to 30 carbon atoms, and the examples thereof include a 2-benzothiazolylthio group and a 1-phenyltetrazol-5-ylthio group.

The sulfamoyl group is preferably a substituted or unsubstituted sulfamoyl group containing from 0 to 30 carbon atoms, and the examples thereof include an N-ethylsulfamoyl group, an N-(3-dodecyloxypropyl)sulfamoyl group, an N,N-dimethylsulfamoyl group, an N-acetylsulfamoyl group, an N-benzoylsulfamoyl group, and an N—(N'-phenylcarbamoyl)sulfamoyl group.

The alkyl- or aryl-sulfinyl group is preferably a substituted or unsubstituted alkylsulfinyl group containing from 1 to 30 carbon atoms, or a substituted or unsubstituted arylsulfinyl group containing from 6 to 30 carbon atoms, and the examples thereof include a methylsulfinyl group, an ethylsulfinyl group, a phenylsulfinyl group, and a p-methylphenylsulfinyl group.

The alkyl- or aryl-sulfonyl group is preferably a substituted or unsubstituted alkylsulfonyl group containing from 1 to 30 carbon atoms, or a substituted or unsubstituted arylsulfonyl group containing from 6 to 30 carbon atoms, and the examples thereof include a methylsulfonyl group, an ethylsulfonyl group, a phenylsulfonyl group, and a p-methylphenylsulfonyl group.

The acyl group is preferably a formyl group, a substituted or unsubstituted alkylcarbonyl group containing from 2 to 30 carbon atoms, a substituted or unsubstituted arylcarbonyl group containing from 7 to 30 carbon atoms, or a substituted or unsubstituted heterocyclic carbonyl group containing from 2 to 30 carbon atoms wherein the heterocyclic ring is connected to the carbonyl group via a carbon atom. Examples thereof include an acetyl group, a pivaloyl group, a 2-chloroacetyl group, a stearoyl group, a benzoylamino group, a p-n-octyloxyphenylcarbonyl group, a 2-pyridylcarbonyl group, and a 2-furylcarbonyl group.

The aryloxycarbonyl group is preferably a substituted or unsubstituted aryloxycarbonyl group containing from 7 to 30 carbon atoms, and the examples thereof include a phenoxycarbonyl group, an o-chlorophenoxycarbonyl group, a m-nitrophenoxycarbonyl group, and a p-t-butylphenoxycarbonyl group.

The alkoxycarbonyl group is preferably a substituted or unsubstituted alkoxycarbonyl group containing from 2 to 30 carbon atoms, and the examples thereof include a methoxycarbonyl group, an ethoxycarbonyl group, a t-butoxycarbonyl group, and a n-octadecyloxycarbonyl group.

The carbamoyl group is preferably a substituted or unsubstituted carbamoyl group containing from 1 to 30 carbon atoms, and the examples thereof include a carbamoyl group, an N-methylcarbamoyl group, an N,N-dimethylcarbamoyl group, an N,N-di-n-octylcarbamoyl group, and an N-(methylsulfonyl)carbamoyl group.

The aryl or heterocyclic azo group is preferably a substituted or unsubstituted aryl azo group containing from 6 to 30 carbon atoms, or a substituted or unsubstituted heterocyclic azo group containing from 3 to 30 carbon atoms, and the examples thereof include phenylazo, p-chlorophenylazo, and 5-ethylthio-1,3,4-thiadiazol-2-ylazo.

The imido group is preferably an N-succinimido group or an N-phthalimido group.

The phosphino group is preferably a substituted or unsubstituted phosphino group containing from 0 to 30 carbon atoms, and the examples thereof include a dimethylphosphino group, a diphenylphosphino group, and a methylphenoxyphosphino group.

The phosphinyl group is preferably a substituted or unsubstituted phosphinyl group containing from 0 to 30 carbon atoms, and the examples thereof include a phosphinyl group, a dioctyloxyphosphinyl group, and a diethoxyphosphinyl group.

The phosphinyloxy group is preferably a substituted or unsubstituted phosphinyloxy group containing from 0 to 30 carbon atoms, and the examples thereof include a diphenoxyphosphinyloxy group and a dioctyloxyphosphinyloxy group.

The phosphinylamino group is preferably a substituted or unsubstituted phosphinylamino group containing from 0 to 30 carbon atoms, and the examples thereof include a dimethoxyphosphinylamino group and a dimethylaminophosphinylamino group.

The silyl group is preferably a substituted or unsubstituted silyl group containing from 0 to 30 carbon atoms, and the examples thereof include a trimethylsilyl group, a t-butyldimethylsilyl group, and a phenyldimethylsilyl group.

Of the above-described substituents, with those which have a hydrogen atom, the hydrogen atom may be substituted by the above-described substituent. Examples of such substituents include an alkylcarbonylaminosulfonyl group, an arylcarbonylaminosulfonyl group, an alkylsulfonylaminocarbonyl group, and an arylsulfonylaminocarbonyl group. Specific examples thereof include a methylsulfonylaminocarbonyl group, a p-methylphenylsulfonylaminocarbonyl group, an acetylaminosulfonyl group, and a benzoylaminosulfonyl group.

With respect to a preferred combination of the substituents in the pigment of the invention represented by the general formula (1), those compounds are preferred wherein at least one of the various substituents is the preferred group having been described hereinbefore, those compounds are more preferred wherein more of the various substituents are the preferred groups having been described hereinbefore, and those compounds are most preferred wherein all of the substituents are the preferred groups having been described hereinbefore.

Particularly preferred combinations of the groups in the azo pigments of the invention represented by the general formula (1) contain the following (a) to (1).

(a) $X_1$ and $X_2$ each independently represents preferably a hydrogen, an alkyl group (e.g., a methyl group, an ethyl group, a n-propyl group, an isopropyl group, a t-butyl group, or a cyclopropyl group), an acyl group (e.g., a formyl group, an acetyl group, a pivaloyl group, or a benzoyl group), an alkylsulfonyl group (e.g., a methylsulfonyl group or an ethylsulfonyl group), or an arylsulfonyl group (e.g., a phenylsulfonyl group), more preferably a hydrogen, an acetyl group, or a methylsulfonyl group, particularly preferably a hydrogen, with $X_1$ and $X_2$ both most preferably representing a hydrogen.

(b) W preferably represents an alkoxy group (e.g., a methoxy group, an ethoxy group, an isopropoxy group, or a t-butoxy group), an amino group (e.g., a —$NH_2$ group, a methylamino group, a dimethylamino group, or an aniline group), an alkyl group (e.g., a methyl group, an ethyl group, a n-propyl group, an isopropyl group, a t-butyl group, or a cyclopropyl group), or an aryl group (e.g., a phenyl group, a p-tolyl group, or a naphthyl group), more preferably represents an alkoxy group, an amino group, or an alkyl group, still more preferably an alkoxy group or an amino group, yet more preferably an alkoxy group containing a total of 5 or less carbon atoms, an amino group (—$NH_2$ group), or an alkylamino group containing a total of 5 or less carbon atoms, particularly preferably an alkoxy group containing a total of 3 or less carbon atoms, an amino group (—$NH_2$ group), or an alkylamino group containing a total of 3 or less carbon atoms, with a methoxy group (—$OCH_3$ group) being most preferred.

(c) $R_1$ represents a hydrogen or a substituent (for example, a substituted or unsubstituted acylamino group containing a total of from 1 to 8 carbon atoms, a substituted or unsubstituted alkyl group containing a total of from 1 to 12 carbon atoms, a substituted or unsubstituted aryl group containing a total of from 6 to 18 carbon atoms, or a substituted or unsubstituted heterocyclic group containing a total of from 4 to 8 carbon atoms), more preferably a straight or branched alkyl group containing from 1 to 8 carbon atoms, still more preferably a methyl group, an i-propyl group, or a t-butyl group, particularly preferably an i-propyl group or a t-butyl group, with a t-butyl group being most preferred.

(d) $R_2$ represents a heterocyclic group which may further be condensed with other ring, preferably represents a 5- to 8-membered heterocyclic group, more preferably represents a 5- or 6-membered, substituted or unsubstituted heterocyclic group, particularly preferably represents a 6-membered nitrogen-containing heterocyclic ring containing from 3 to 10 carbon atoms. Examples of more preferred heterocyclic ring include a pyridine ring, a pyrimidine ring, an s-triazine ring, a pyridazine ring, a pyrazine ring, a 1,2,4-thiadiazole ring, a 1,3,4-thiadiazole ring, and an imidazole ring, still more preferred examples thereof include e a pyridine ring, a pyrimidine ring, an s-triazine ring, a pyridazine ring, and a pyrazine ring, and particularly preferred examples thereof include a pyrimidine ring and an s-triazine ring, with a pyrimidine ring being most preferred.

(e) Q represents the non-metallic atoms necessary to complete a 5- to 7-membered heterocyclic group, with the heterocyclic ring being optionally condensed with an aliphatic ring, an aromatic ring or other heterocyclic ring. Examples of the 5- to 7-membered heterocyclic group which Q completes together with the carbon atoms include a thienyl group, a furyl group, a pyrrolyl group, an indolyl group, an imidazolyl group, a pyrazolyl group, a thiazolyl group, an isothiazolyl group, an oxazolyl group, an isoxazolyl group, a triazinyl group, a pyridyl group, a pyrazinyl group, and a pyridazinyl group. Each heterocyclic group may further contain a substituent. In particular, the 5- to 7-membered heterocyclic ring which Q completes together with the carbon atoms is preferably a 5-membered nitrogen-containing heterocyclic ring, and is most preferably a heterocyclic ring represented by the following general formulae (a) to (i). Of these, (a), (b), (c), (e), and (i) are still more preferred, (a), (c), and (i) are particularly preferred, with (a) being most preferred.

(a)
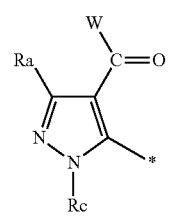

(b)
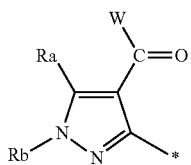

(c)
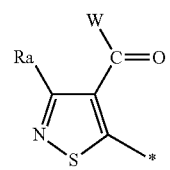

(d)
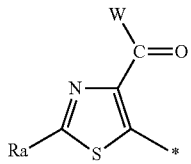

(e)
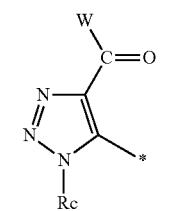

(f)
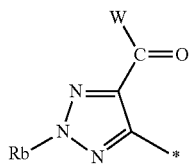

(g)
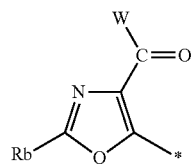

(h)
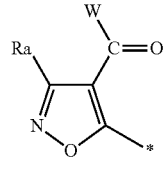

(i)
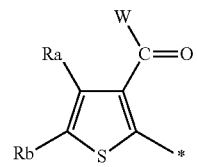

In the general formulae (a) to (i), Ra represents a hydrogen or a substituent, Rb and Rc each independently represents a hydrogen, an alkyl group, a cycloalkyl group, an aralkyl group, an alkenyl group, an alkynyl group, an aryl group, or a heterocyclic group. W is the same as W in the general formula (1), and preferred examples are also the same as described there. * shows the point of the attachment to the azo linkage in the general formula (1).

Ra preferably represents a hydrogen, a substituted or unsubstituted alkyl group containing a total of from 1 to 12 carbon atoms, a substituted or unsubstituted aryl group containing a total of from 6 to 18 carbon atoms, or a substituted or unsubstituted heterocyclic group containing a total of from 4 to 12 carbon atoms, more preferably represents a hydrogen or a straight or branched alkyl group containing a total of from 1 to 8 carbon atoms, still more preferably represents a hydrogen or a straight alkyl group containing a total of from 1 to 4 carbon atoms, particularly preferably represents a hydrogen or a methyl group, with a hydrogen being most preferred.

Rb and Rc each preferably represents a hydrogen, a substituted or unsubstituted alkyl group, a substituted or unsubstituted cycloalkyl group, a substituted or unsubstituted alkenyl group, a substituted or unsubstituted alkynyl group, a substituted or unsubstituted aralkyl group, a substituted or unsubstituted aryl group, a substituted or unsubstituted heterocyclic group, more preferably represents a substituted or unsubstituted alkyl group, a substituted or unsubstituted aryl group, or a substituted or unsubstituted heterocyclic group. In particular, an alkyl group containing a total of 3 or less carbon atoms is preferred, with a methyl group being most preferred.

Further, as the 5-membered heterocyclic ring which Q completes together with carbon atoms, those represented by the above general formulae (a), (b), and (c) are particularly preferred, with those represented by the general formula (a) being most preferred.

(f) n preferably represents an integer of from 1 to 3, more preferably 1 or 2, particularly preferably 2.

The azo pigments represented by the general formula (1) are preferably azo pigments represented by the following general formula (2).

Hereinafter, azo pigments represented by the general formula (2), tautomers of the azo pigments, and salts or hydrates thereof will be described in detail.

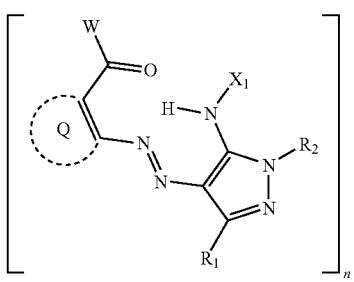

General formula (2)

wherein

Q, W, $X_1$, $R_1$, $R_2$, and n are the same as defined for Q, W, $X_1$, $R_1$, $R_2$, and n in the general formula (1) and, when n=2, the general formula (2) represents a dimer formed through Q, W, $X_1$, $R_1$, or $R_2$, when n=3, the general formula (2) represents a trimer formed through Q, W, $X_1$, $R_1$, or $R_2$, and when n=4, the general formula (2) represents a tetramer formed through Q, W, $X_1$, $R_1$, or $R_2$.

Q, W, $X_1$, $R_1$, $R_2$ and n will be described in detail below.

Examples of Q are the same as examples for Q in the above general formula (1), and preferred examples thereof are also the same as described there.

Examples of W are the same as examples for W in the above general formula (1), and preferred examples thereof are also the same as described there.

Examples of $X_1$ are the same as examples for $X_1$ in the above general formula (1), and preferred examples thereof are also the same as described there.

Examples of $R_1$ and $R_2$ are each independently the same as examples for $R_1$ and $R_2$ in the above general formula (1), and preferred examples thereof are also the same as described there.

Examples of n are the same as examples for n in the above general formula (1), and preferred examples thereof are also the same as described there.

With respect to a preferred combination of the substituents in the pigment of the invention represented by the general formula (2), those compounds are preferred wherein at least one of the various substituents is the preferred group having been described hereinbefore, those compounds are more preferred wherein more of the various substituents are the preferred groups having been described hereinbefore, and those compounds are most preferred wherein all of the substituents are the preferred groups having been described hereinbefore.

Particularly preferred combinations of the groups in the azo pigments of the invention represented by the general formula (2) contain the following (a) to (f).

(a) $X_1$ preferably represents a hydrogen, an alkyl group (e.g., a methyl group, an ethyl group, a n-propyl group, an isopropyl group, a t-butyl group, or a cyclopropyl group), an acyl group (e.g., a formyl group, an acetyl group, a pivaloyl group, or a benzoyl group), an alkylsulfonyl group (e.g., a methylsulfonyl group or an ethylsulfonyl group), or an arylsulfonyl group (e.g., a phenylsulfonyl group), more preferably a hydrogen, an acetyl group, or a methylsulfonyl group, particularly preferably a hydrogen.

(b) W preferably represents an alkoxy group (e.g., a methoxy group, an ethoxy group, an isopropoxy group, or a t-butoxy group), an amino group (e.g., a —$NH_2$ group, a methylamino group, a dimethylamino group, or an aniline group), an alkyl group (e.g., a methyl group, an ethyl group, a n-propyl group, an isopropyl group, a t-butyl group, or a cyclopropyl group), or an aryl group (e.g., a phenyl group, a p-tolyl group, or a naphthyl group), more preferably represents an alkoxy group, an amino group, or an alkyl group, still more preferably an alkoxy group or an amino group, yet more preferably an alkoxy group containing a total of 5 or less carbon atoms, an amino group (—$NH_2$ group), or an alkylamino group containing a total of 5 or less carbon atoms, particularly preferably an alkoxy group containing a total of 3 or less carbon atoms, an amino group (—$NH_2$ group), or an alkylamino group containing a total of 3 or less carbon atoms, with a methoxy group (—$OCH_3$ group) being most preferred.

(c) $R_1$ preferably represents a hydrogen or a substituent (for example, a substituted or unsubstituted acylamino group containing a total of from 1 to 8 carbon atoms, a substituted or unsubstituted alkyl group containing a total of from 1 to 12 carbon atoms, a substituted or unsubstituted aryl group containing a total of from 6 to 18 carbon atoms, or a substituted or unsubstituted heterocyclic group containing a total of from 4 to 12 carbon atoms), more preferably a straight or branched alkyl group containing from 1 to 8 carbon atoms, still more preferably a methyl group, an i-propyl group, or a t-butyl group, particularly preferably an i-propyl group or a t-butyl group, with a t-butyl group being most preferred.

(d) $R_2$ represents a heterocyclic group which may further be condensed with other ring, preferably represents a 5- to 8-membered heterocyclic group, more preferably represents a 5- or 6-membered, substituted or unsubstituted heterocyclic group, particularly preferably represents a 6-membered nitrogen-containing heterocyclic ring containing from 3 to 10 carbon atoms. Examples of more preferred heterocyclic ring include a pyridine ring, a pyrimidine ring, an s-triazine ring, a pyridazine ring, a pyrazine ring, a 1,2,4-thiadiazole ring, a 1,3,4-thiadiazole ring, and an imidazole ring, still more preferred examples thereof include a pyridine ring, a pyrimidine ring, an s-triazine ring, a pyridazine ring, and a pyrazine ring, and particularly preferred examples thereof include a pyrimidine ring and an s-triazine ring, with a pyrimidine ring being most preferred.

(e) Q represents the non-metallic atoms necessary to complete a 5- to 7-membered heterocyclic group, with the heterocyclic ring being optionally condensed with an aliphatic ring, an aromatic ring or other heterocyclic ring. Particularly preferred examples of the 5- to 7-membered heterocyclic group which Q completes together with the carbon atoms include a thienyl group, a furyl group, a pyrrolyl group, an indolyl group, an imidazolyl group, a pyrazolyl group, a thiazolyl group, an isothiazolyl group, an oxazolyl group, an isoxazolyl group, a triazinyl group, a pyridyl group, a pyrazinyl group, and a pyridazinyl group. Each heterocyclic group may further contain a substituent. In particular, the 5- to 7-membered heterocyclic ring which Q completes together with the carbon atoms is preferably a 5-membered nitrogen-containing heterocyclic ring, and is most preferably a heterocyclic ring represented by the following general formulae (a) to (i). Of these, (a), (b), (c), (e), and (i) are still more preferred, (a), (c), and (i) are particularly preferred, with (a) being most preferred.

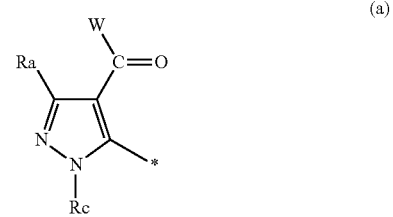

(a)

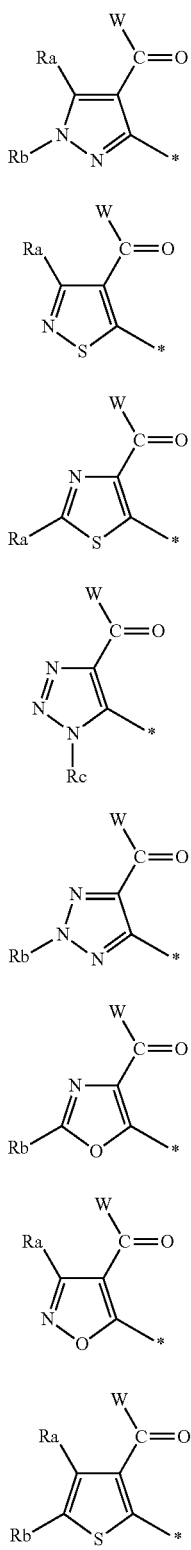

In the general formulae (a) to (i), Ra represents a hydrogen or a substituent, Rb and Rc each independently represents a hydrogen, an alkyl group, a cycloalkyl group, an aralkyl group, an alkenyl group, an alkynyl group, an aryl group, or a heterocyclic group. W is the same as W in the general formula (1), and preferred examples are also the same as described there. * shows the point of the attachment to the azo linkage in the general formula (2).

Ra preferably represents a hydrogen, a substituted or unsubstituted alkyl group containing a total of from 1 to 12 carbon atoms, a substituted or unsubstituted aryl group containing a total of from 6 to 18 carbon atoms, or a substituted or unsubstituted heterocyclic group containing a total of from 4 to 12 carbon atoms, more preferably represents a hydrogen or a straight or branched alkyl group containing a total of from 1 to 8 carbon atoms, still more preferably represents a hydrogen or a straight alkyl group containing a total of from 1 to 4 carbon atoms, particularly preferably represents a hydrogen or a methyl group, with a hydrogen being most preferred.

Rb and Rc each preferably represents a hydrogen, a substituted or unsubstituted alkyl group, a substituted or unsubstituted cycloalkyl group, a substituted or unsubstituted alkenyl group, a substituted or unsubstituted alkynyl group, a substituted or unsubstituted aralkyl group, a substituted or unsubstituted aryl group, a substituted or unsubstituted heterocyclic group, more preferably represents a substituted or unsubstituted alkyl group, a substituted or unsubstituted aryl group, or a substituted or unsubstituted heterocyclic group. In particular, an alkyl group containing a total of 3 or less carbon atoms is preferred, with a methyl group being most preferred.

Further, as the 5-membered heterocyclic ring which Q completes together with carbon atoms, those represented by the above general formulae (a), (b), and (c) are particularly preferred, with those represented by the general formula (a) being most preferred.

(f) n preferably represents an integer of from 1 to 3, more preferably 1 or 2, particularly preferably 2.

The invention also includes in its scope tautomers of the azo pigments represented by the general formulae (1) and (2). Although the general formulae (1) and (2) are shown in the form of limiting structure among several tautomer forms which are possible in view of chemical structure, the azo pigments may be tautomers of other structure than the shown one, and may be used as a mixture containing plural tautomers.

For example, with the pigment represented by the general formula (2), azo-hydrazone tautomers represented by the following general formulae (2') can be considered.

The invention also includes in its scope tautomers of the azo pigments represented by the general formula (2').

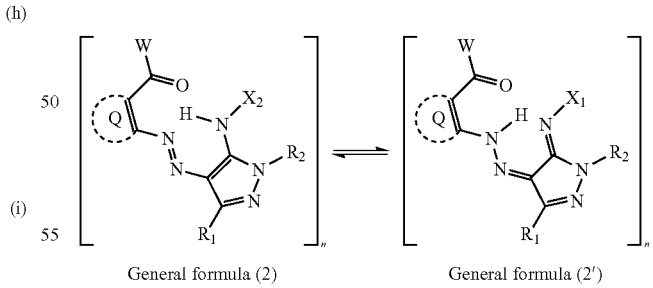

General formula (2)   General formula (2')

wherein
$R_1$, $R_2$, Q, W, $X_1$, and n are the same as defined for $R_1$, $R_2$, Q, W, $X_1$, and n in the general formula (2).

The azo pigments represented by the general formula (1) are preferably azo pigments which are represented by the following general formula (3).

Azo pigments represented by the general formula (3), the tautomers of the azo pigments, and the salts or hydrates thereof will be described below.

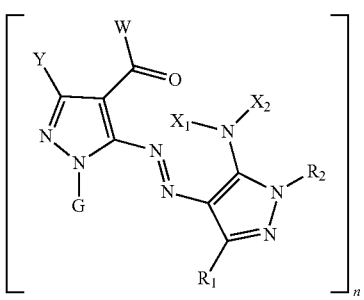

General formula (3)

wherein

Y represents a hydrogen or a substituent,

G represents a hydrogen, an alkyl group, a cycloalkyl group, an aralkyl group, an alkenyl group, an alkynyl group, an aryl group, or a heterocyclic group, W, $X_1$, $X_2$, $R_1$, $R_2$, and n are the same as defined for W, $X_1$, $X_2$, $R_1$, $R_2$, and n in the general formula (1) and, when n=2, the general formula (2) represents a dimer formed through G, Y, W, $X_1$, $X_2$, $R_1$, or $R_2$, when n=3, the general formula (2) represents a trimer formed through G, Y, W, $X_1$, $X_2$, $R_1$, or $R_2$, and when n=4, the general formula (2) represents a tetramer formed through G, Y, W, $X_1$, $X_2$, $R_1$, or $R_2$.

W, $X_1$, $X_2$, $R_1$, $R_2$, G, Y, and n will be described in detail below.

Examples of W are the same as examples for W in the above general formula (1), and preferred examples thereof are also the same as described there.

Examples of $X_1$ and $X_2$ are each independently the same as examples for $X_1$ and $X_2$ in the above general formula (1), and preferred examples thereof are also the same as described there.

Examples of $R_1$ and $R_2$ are each independently the same as examples for $R_1$ and $R_2$ in the above general formula (1), and preferred examples thereof are also the same as described there.

Examples of n are the same as examples for n in the above general formula (1), and preferred examples thereof are also the same as described there.

G is illustrated by a hydrogen, an alkyl group, a cycloalkyl group, an aralkyl group, an alkenyl group, an alkynyl group, an aryl group, or a heterocyclic group, particularly preferably represents a hydrogen, a methyl group, an ethyl group, a n-propyl group, an isopropyl group, a t-butyl group, a cyclopropyl group, a benzyl group, a 2-phenethyl group, a vinyl group, an allyl group, an ethynyl group, a propargyl group, a phenyl group, a p-tolyl group, a naphthyl group, a pyridyl group, a pyrimidinyl group, or a pyrazinyl group, more preferably represents a hydrogen, a methyl group, a phenyl group, a pyridyl group, a pyrimidinyl group, or a pyrazinyl group, still more preferably represents a methyl group, a 2-pyridyl group, a 2,6-pyrimidinyl group, or a 2,5-pyrazinyl group, preferably represents an alkyl group containing a total of 3 or less carbon atoms, with a methyl group being most preferred.

When Y represents a substituent, examples thereof include a halogen atom, an alkyl group, an aralkyl group, an alkenyl group, an alkynyl group, an aryl group, a heterocyclic group, a cyano group, a hydroxyl group, a nitro group, an alkoxy group, an aryloxy group, a silyloxy group, a heterocyclic oxy group, an acyloxy group, a carbamoyloxy group, an alkoxycarbonyloxy group, an aryloxycarbonyloxy group, an amino group, an acylamino group, an aminocarbonylamino group, an alkoxycarbonylamino group, an aryloxycarbonylamino group, a sulfamoylamino group, an alkyl- or aryl-sulfonylamino group, a mercapto group, an alkylthio group, an arylthio group, a heterocyclic thio group, a sulfamoyl group, an alkyl- or aryl-sulfinyl group, an alkyl- or aryl-sulfonyl group, an acyl group, an aryloxycarbonyl group, an alkoxycarbonyl group, a carbamoyl group, an aryl or heterocyclic azo group, an imido group, a phosphino group, a phosphinyl group, a phosphinyloxy group, a phosphinylamino group, and a silyl group. Particularly preferred examples of Y include a hydrogen, an alkyl group (e.g., a methyl group), an aryl group (e.g., a phenyl group), a heterocyclic group (e.g., a 2-pyridyl group), and an alkylthio group (e.g., a methylthio group), more preferred examples thereof include a hydrogen, a methyl group, a phenyl group, and a methylthio group, with a hydrogen being most preferred.

With respect to a preferred combination of the substituents in the pigment of the invention represented by the general formula (3), those compounds are preferred wherein at least one of the various substituents is the preferred group having been described hereinbefore, those compounds are more preferred wherein more of the various substituents are the preferred groups having been described hereinbefore, and those compounds are most preferred wherein all of the substituents are the preferred groups having been described hereinbefore.

Particularly preferred combinations of the groups in the azo pigments of the invention represented by the general formula (3) contain the following (a) to (g).

(a) $X_1$ and $X_2$ each independently represents preferably a hydrogen, an alkyl group (e.g., a methyl group, an ethyl group, a n-propyl group, an isopropyl group, a t-butyl group, or a cyclopropyl group), an acyl group (e.g., a formyl group, an acetyl group, a pivaloyl group, or a benzoyl group), an alkylsulfonyl group (e.g., a methylsulfonyl group or an ethylsulfonyl group), or an arylsulfonyl group (e.g., a phenylsulfonyl group), more preferably a hydrogen, an acetyl group, or a methylsulfonyl group, particularly preferably a hydrogen. Particularly, at least one of $X_1$ and $X_2$ preferably represents a hydrogen, with both $X_1$ and $X_2$ most preferably representing a hydrogen. In the case where at least one of $X_1$ and $X_2$ represents a hydrogen, the colorant molecules are liable to produce strong intramolecular and intermolecular mutual action as well as intermolecular mutual action, and hence they can easily constitute a pigment having a more stable molecular alignment, thus being preferred in the points of good hue and high fastness (to light, gas, heat, water, and chemicals).

(b) W preferably represents an alkoxy group (e.g., a methoxy group, an ethoxy group, an isopropoxy group, or a t-butoxy group), an amino group (e.g., a —$NH_2$ group, a methylamino group, a dimethylamino group, or an aniline group), an alkyl group (e.g., a methyl group, an ethyl group, a n-propyl group, an isopropyl group, a t-butyl group, or a cyclopropyl group), or an aryl group (e.g., a phenyl group, a p-tolyl group, or a naphthyl group), more preferably represents an alkoxy group, an amino group, or an alkyl group, still more preferably an alkoxy group or an amino group, yet more preferably an alkoxy group containing a total of 5 or less carbon atoms, an amino group (—$NH_2$ group), or an alkylamino group containing a total of 5 or less carbon atoms, particularly preferably an alkoxy group containing a total of 3 or less carbon atoms, an amino group (—$NH_2$ group), or an alkylamino group containing a total of 3 or less carbon atoms, with a methoxy group (—$OCH_3$ group) being most preferred.

(c) $R_1$ preferably represents a hydrogen or a substituent (for example, a substituted or unsubstituted acylamino group containing a total of from 1 to 8 carbon atoms, a substituted or unsubstituted alkyl group containing a total of from 1 to 12 carbon atoms, a substituted or unsubstituted aryl group containing a total of from 6 to 18 carbon atoms, or a substituted or unsubstituted heterocyclic group containing a total of from 4 to 12 carbon atoms), more preferably a straight or branched alkyl group containing from 1 to 8 carbon atoms, still more preferably a methyl group, an i-propyl group, or a t-butyl group, particularly preferably an i-propyl group or a t-butyl group, with a t-butyl group being most preferred.

(d) $R_2$ represents a heterocyclic group which may further be condensed with other ring, preferably represents a 5- to 8-membered heterocyclic group, more preferably represents a 5- or 6-membered, substituted or unsubstituted heterocyclic group, particularly preferably represents a 6-membered nitrogen-containing heterocyclic ring containing from 3 to 10 carbon atoms. Examples of more preferred heterocyclic ring include a pyridine ring, a pyrimidine ring, an s-triazine ring, a pyridazine ring, a pyrazine ring, a 1,2,4-thiadiazole ring, a 1,3,4-thiadiazole ring, and an imidazole ring, still more preferred examples thereof include a pyridine ring, a pyrimidine ring, an s-triazine ring, a pyridazine ring, and a pyrazine ring, particularly preferred examples thereof include a pyrimidine ring and an s-triazine ring, and still more preferred examples thereof include a pyrimidine ring having a substituent at 4- and 6-positions and an s-triazine ring having an alkoxy group having from 1 to 4 carbon atoms at 2-position of the ring, with a pyrimidine ring having a substituent at 4- and 6-positions being most preferred.

(e) G represents a hydrogen, an alkyl group, a cycloalkyl group, an aralkyl group, an alkenyl group, an alkynyl group, an aryl group, or a heterocyclic group, particularly preferably represents a hydrogen, a methyl group, an ethyl group, a n-propyl group, an isopropyl group, a t-butyl group, a cyclopropyl group, a benzyl group, a 2-phenethyl group, a vinyl group, an allyl group, an ethynyl group, a propargyl group, a phenyl group, a p-tolyl group, a naphthyl group, a pyridyl group, a pyrimidinyl group, or a pyrazinyl group, more preferably represents a hydrogen, a methyl group, a phenyl group, a pyridyl group, a pyrimidinyl group, or a pyrazinyl group, still more preferably represents a methyl group, a 2-pyridyl group, a 2,6-pyrimidinyl group, or a 2,5-pyrazinyl group, and preferably represents an alkyl group containing a total of 3 or less carbon atoms, with a methyl group being most preferred.

(f) Y represents a hydrogen, an alkyl group (e.g., a methyl group), an aryl group (e.g., a phenyl group), a heterocyclic group (e.g., a 2-pyridyl group), or an alkylthio group (e.g., a methylthio group), preferably a hydrogen, a methyl group, a phenyl group, and a methylthio group, with a hydrogen being most preferred.

(g) n preferably represents an integer of from 1 to 3, more preferably 1 or 2, most preferably 2.

In the general formulae (1), (2), and (3), n preferably represents 2 or 3, particularly preferably represents 2. When n represents 2, the pigment shows high tinctorial strength, excellent resistance to light, and improved resistance to chemicals.

When n in the general formulae (1), (2), and (3) represents 2, the azo pigments, tautomers of the azo pigments, and salts or hydrates thereof are dimers formed through Q, W, $X_1$, $X_2$, $R_1$, or $R_2$.

In the case where the azo pigments, tautomers of the azo pigments, and salts or hydrates thereof are dimers, examples of the linking manner include those represented by the following general formulae (4), (5), (6), (7), (8), and (9).

General formula (4):

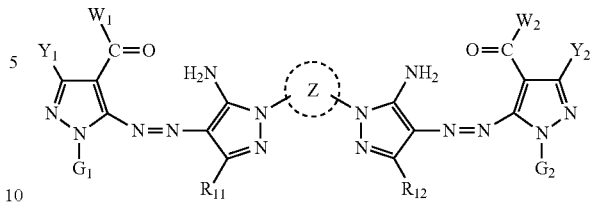

In the general formula (4),
$G_1$ and $G_2$ each independently are the same as G in the general formula (3),
$R_{11}$ and $R_{12}$ each independently are the same as $R_1$ in the general formula (3),
$W_1$ and $W_2$ each independently are the same as W in the general formula (3),
$Y_1$ and $Y_2$ each independently are the same as Y in the general formula (3), and
Z is the same as in the case where $R_2$ in the general formula (3) represents a 5- to 8-membered nitrogen-containing heterocyclic ring.

General formula (5):

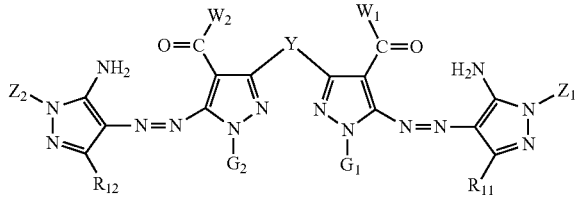

In the general formula (5),
$G_1$ and $G_2$ each independently are the same as G in the general formula (3),
$R_{11}$ and $R_{12}$ each independently are the same as $R_1$ in the general formula (3),
$W_1$ and $W_2$ each independently are the same as W in the general formula (3),
$Z_1$ and $Z_2$ each independently are the same as $R_2$ in the general formula (3), and
Y is the same as in the case where Y in the general formula (3) represents a divalent substituent.

General formula (6):

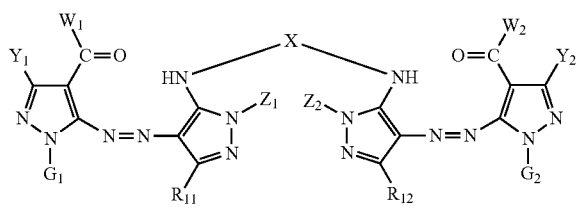

In the general formula (6),
$G_1$ and $G_2$ each independently are the same as G in the general formula (3),
$R_{11}$ and $R_{12}$ each independently are the same as $R_1$ in the general formula (3),
$W_1$ and $W_2$ each independently are the same as W in the general formula (3), $Y_1$ and $Y_2$ each independently are the same as Y in the general formula (3), $Z_1$ and $Z_2$ each independently are the same as $R_2$ in the general formula (3), and X is the same as in the case where $X_1$ or $X_2$ in the general formula (3) represents a divalent substituent.

General formula (7):

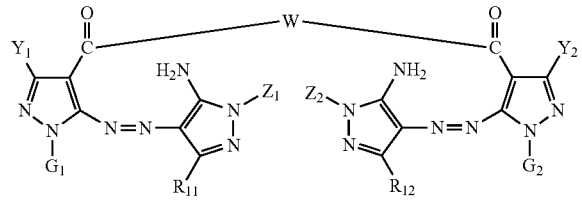

In the general formula (7), $G_1$ and $G_2$ each independently are the same as G in the general formula (3), $R_{11}$ and $R_{12}$ each independently are the same as $R_1$ in the general formula (3), $Y_1$ and $Y_2$ each independently are the same as Y in the general formula (3), $Z_1$ and $Z_2$ each independently are the same as $R_2$ in the general formula (3), and W is the same as in the case where W in the general formula (3) represents a divalent substituent.

General formula (8):

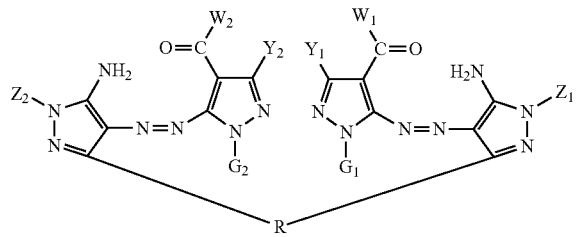

In the general formula (8), $G_1$ and $G_2$ each independently are the same as G in the general formula (3), $W_1$ and $W_2$ each independently are the same as W in the general formula (3), $Y_1$ and $Y_2$ each independently are the same as Y in the general formula (3), $Z_1$ and $Z_2$ each independently are the same as $R_1$ in the general formula (3), and R is the same as in the case where $R_1$ in the general formula (3) represents a divalent substituent.

General formula (9):

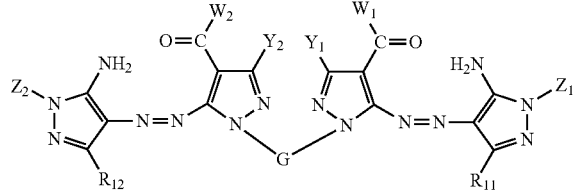

In the general formula (9), $R_{11}$ and $R_{12}$ each independently are the same as $R_1$ in the general formula (3), $W_1$ and $W_2$ each independently are the same as W in the general formula (3), $Y_1$ and $Y_2$ each independently are the same as Y in the general formula (3), $Z_1$ and $Z_2$ each independently are the same as $R_1$ in the general formula (3), and G is the same as in the case where G in the general formula (3) represents a divalent substituent.

In the invention, the azo pigments represented by the general formula (3) are preferably azo pigments represented by the general formulae (4), (5), (7), (8), and (9), more preferably azo pigments represented by the general formulae (4), (5), (7), and (9). Of them, azo pigments represented by the general formula (4) are most preferred in view of flatness and intermolecular and intramolecular mutual action of the pigment molecules.

Azo pigments represented by the general formula (4), the tautomers of the azo pigments, and the salts or hydrates thereof will be described below.

General formula (4)

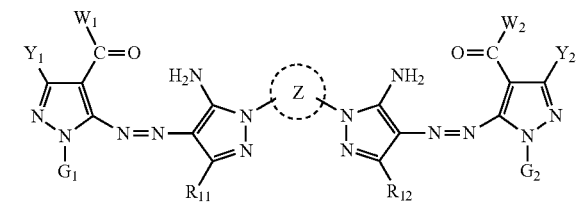

wherein

Z represents the atoms necessary to complete a 5- to 8-membered heterocyclic ring, $Y_1$, $Y_2$, $R_{11}$, and $R_{12}$ each independently represents a hydrogen or a substituent, $G_1$ and $G_2$ each independently represents a hydrogen, an alkyl group, a cycloalkyl group, an aralkyl group, an alkenyl group, an alkynyl group, an aryl group, or a heterocyclic group, and $W_1$ and $W_2$ each independently represents an alkoxy group, an amino group, an alkyl group, or an aryl group.

In the general formula (4), Z represents the atoms necessary to complete a 5- to 8-membered heterocyclic ring and, to illustrate preferred examples of the heterocyclic group without restricting the substitution positions, there are illustrated a pyrrole ring, a pyrazole ring, a triazole ring, an imidazole ring, a thiazole ring, an isothiazole ring, an oxazole ring, an isoxazole ring, a thiadiazole ring, a thiophene ring, a furan ring, a pyridine ring, a pyrimidine ring, a triazine ring, a pyridazine ring, and a pyrazine ring. More preferred are 6-membered nitrogen-containing heterocyclic rings, such as a pyridine ring, a pyrimidine ring, and an s-triazine ring. In the case where Z represents a 6-membered nitrogen-containing heterocyclic ring, the intramolecular and intermolecular action of the pigment molecules are more easily improved in view of hydrogen bond-forming ability and flatness of the molecule, thus such ring being preferred.

In particular, in view of hue, tinctorial strength, and image fastness, a pyrimidine ring and an s-triazine ring are preferred. Further, a pyrimidine ring having substituents at 4- and 6-positions and an s-triazine ring having an alkoxy group containing from 1 to 4 carbon atoms at 2-position are preferred. Of them, a pyrimidine ring having substituents at 4- and 6-positions are most preferred in the point of good hue and improved light fastness.

In the general formula (4), $Y_1$ and $Y_2$ are the same as Y in the general formula (2), and preferred examples thereof are also the same as described there.

In the general formula (4), $G_1$ and $G_2$ are the same as G in the general formula (2), and preferred examples thereof are also the same as described there.

In the general formula (4), $R_{11}$ and $R_{12}$ are the same as $R_1$ in the general formula (1), and preferred examples thereof are also the same as described there.

In the general formula (4), $W_1$ and $W_2$ are the same as W in the general formula (1), and preferred examples thereof are also the same as described there.

The invention also includes in its scope tautomers of the azo pigments represented by the general formula (1).

Although the general formula (1) is shown in the form of limiting structure among several tautomer forms which are possible in view of chemical structure, the azo pigments may be tautomers of other structure than the shown one, and may be used as a mixture containing plural tautomers.

For example, with the pigment represented by the general formula (4), azo-hydrazone tautomers represented by the following general formulae (4') can be considered.

The invention also includes in its scope tautomers of the azo pigments represented by the general formula (4'):

group, yet more preferably an alkoxy group containing a total of 5 or less carbon atoms, an amino group ($-NH_2$ group), or an alkylamino group containing a total of 5 or less carbon atoms, particularly preferably an alkoxy group containing a total of 3 or less carbon atoms, an amino group ($-NH_2$ group), or an alkylamino group containing a total of 3 or less carbon atoms, still more preferably a methoxy group ($-OCH_3$ group), an ethoxy group ($-OC2H5$ group), or an amino group ($-NH_2$ group), with a methoxy group ($-OCH_3$ group) being most preferred.

(b) $R_{11}$ and $R_{12}$ each independently represents preferably a hydrogen or a substituent (for example, a substituted or unsubstituted acylamino group containing a total of from 1 to 8 carbon atoms, a substituted or unsubstituted alkyl group containing a total of from 1 to 12 carbon atoms, a substituted or unsubstituted aryl group containing a total of from 6 to 18 carbon atoms, or a substituted or unsubstituted heterocyclic group containing a total of from 4 to 12 carbon atoms), more preferably a straight or branched alkyl group containing from 1 to 8 carbon atoms, still more preferably a methyl group, an i-propyl group, or a t-butyl group, particularly preferably an i-propyl group or a t-butyl group, with a t-butyl group being most preferred.

(c) Z represents a divalent heterocyclic group which may further be condensed with a ring. Z represents preferably a 5- to 8-membered heterocyclic ring, more preferably a 5- or 6-membered, substituted or unsubstituted heterocyclic ring.

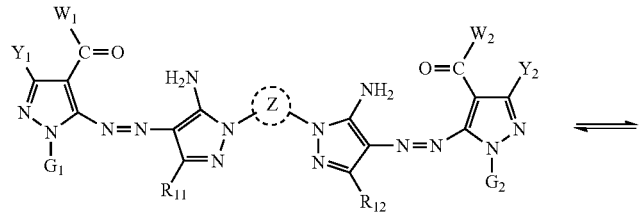

General formula (4)

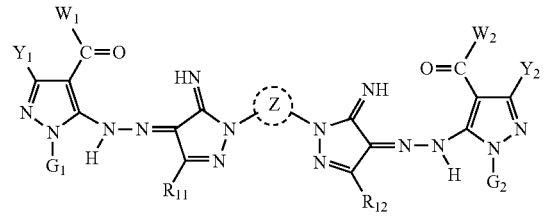

General formula (4')

wherein $R_{11}$, $R_{12}$, $W_1$, $W_2$, $Y_1$, $Y_2$, $G_1$, $G_2$, and Z are the same as defined for $R_{11}$, $R_{12}$, $W_1$, $W_2$, $Y_1$, $Y_2$, $G_1$, $G_2$, and Z in the general formula (4).

Additionally, with respect to a preferred combination of the substituents in the pigment of the invention represented by the general formula (4), those compounds are preferred wherein at least one of the various substituents is the preferred group having been described hereinbefore, those compounds are more preferred wherein more of the various substituents are the preferred groups having been described hereinbefore, and those compounds are most preferred wherein all of the substituents are the preferred groups having been described hereinbefore.

Particularly preferred combinations of the groups in the azo pigments of the invention represented by the general formula (4) contain the following (a) to (e).

(a) $W_1$ and $W_2$ each independently represents preferably an alkoxy group (e.g., a methoxy group, an ethoxy group, an isopropoxy group, or a t-butoxy group), an amino group (e.g., a $-NH_2$ group, a methylamino group, a dimethylamino group, or an aniline group), an alkyl group (e.g., a methyl group, an ethyl group, a n-propyl group, an isopropyl group, a t-butyl group, or a cyclopropyl group), or an aryl group (e.g., a phenyl group, a p-tolyl group, or a naphthyl group), more preferably represents an alkoxy group, an amino group, or an alkyl group, still more preferably an alkoxy group or an amino For example, a pyrrole ring, a pyrazole ring, a triazole ring, an imidazole ring, a thiazole ring, an isothiazole ring, an oxazole ring, an isoxazole ring, a thiadiazole ring, a thiophene ring, a furan ring, a pyridine ring, a pyrimidine ring, a triazine ring, a pyridazine ring, and a pyrazine ring are preferred. Particularly preferred are 6-membered nitrogen-containing heterocyclic rings containing from 3 to 10 carbon atoms. Still more preferred examples of the heterocyclic ring include a pyridine ring, a pyrimidine ring, an s-triazine ring, a pyridazine ring, and a pyrazine ring. Still more preferred examples thereof include a pyridine ring, a pyrimidine ring, an s-triazine ring, a pyridazine ring, and a pyrazine ring. Yet more preferred are a pyrimidine ring and an s-triazine ring. Further, a pyrimidine ring having substituents at 4- and 6-positions and an s-triazine ring having an alkoxy group containing from 1 to 4 carbon atoms at 2-position are still more preferred. Of them, a pyrimidine ring having substituents at 4- and 6-positions is most preferred.

(d) $G_1$ and $G_2$ each independently represents a hydrogen, an alkyl group, a cycloalkyl group, an aralkyl group, an alkenyl group, an alkynyl group, an aryl group, or a heterocyclic group, particularly preferably represents a hydrogen, a methyl group, an ethyl group, a n-propyl group, an isopropyl group, a t-butyl group, a cyclopropyl group, a benzyl group, a 2-phenethyl group, a vinyl group, an allyl group, an ethynyl group, a propargyl group, a phenyl group, a p-tolyl group, a naphthyl group, a pyridyl group, a pyrimidinyl group, or a pyrazinyl group, more preferably represents a hydrogen, a methyl group, a phenyl group, a pyridyl group, a pyrimidinyl group, or a pyrazinyl group, still more preferably represents a methyl group, a 2-pyridyl group, a 2,6-pyrimidinyl group, or a 2,5-pyrazinyl group, with a methyl group being most preferred.

(e) $Y_1$ and $Y_2$ each independently represents a hydrogen, an alkyl group (e.g., a methyl group), an aryl group (e.g., a phenyl group), a heterocyclic group (e.g., a 2-pyridyl group), or an alkylthio group (e.g., a methylthio group), preferably a hydrogen, a methyl group, a phenyl group, or a methylthio group, with a hydrogen being most preferred.

In the general formulae (1), (2), and (3), n preferably represents 2 or 3, particularly preferably represents 2. When n represents 2, the pigment shows high tinctorial strength, excellent resistance to light, and improved resistance to chemicals.

Of the azo pigments of the invention represented by the general formulae (1), (2), (3), and (4), azo pigments represented by the following general formulae (10) to (13) are preferred.

General formula (10)

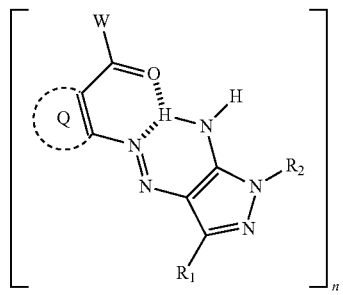

General formula (11)

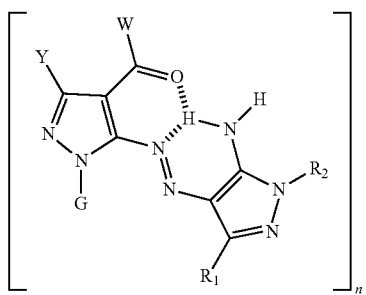

$R_1$, $R_2$, W, and Q in the general formula (10) are the same as $R_1$, $R_2$, W, and Q in the general formula (2).

G, $R_1$, $R_2$, W, and Y in the general formula (11) are the same as G, $R_1$, $R_2$, W, and Y in the general formula (3).

General formula (12)

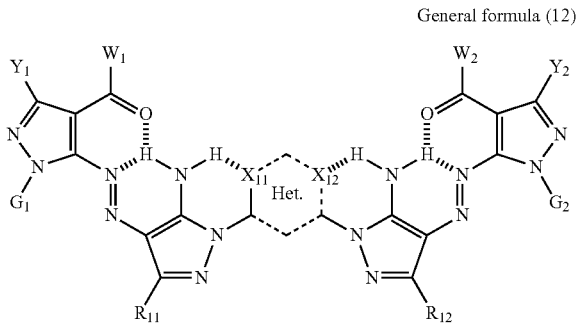

$G_1$, $G_2$, $R_{11}$, $R_{12}$, $W_1$, $W_2$, $Y_1$, and $Y_2$ in the general formula (12) are the same as $G_1$, $G_2$, $R_{11}$, $R_{12}$, $W_1$, $W_2$, $Y_1$, and $Y_2$ in the general formula (4).

$X_{11}$ and $X_{12}$ each independently represents a heterocyclic ring which is constituted by Z in the general formula (4), and each independently represents a hetero atom in the heterocyclic ring constituted by Het.

General formula (13)

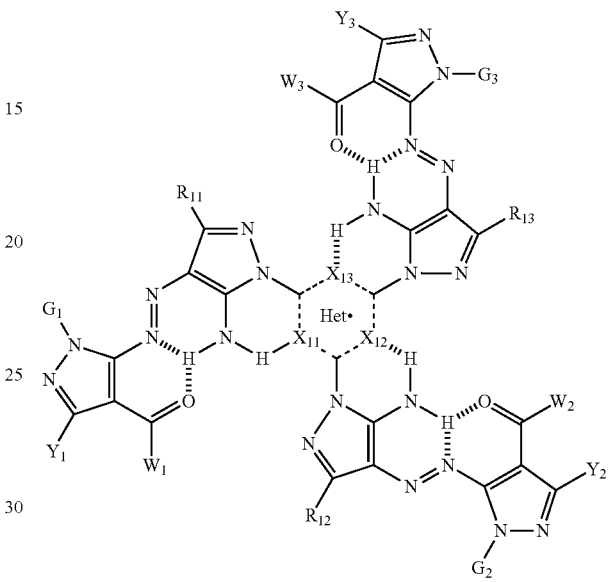

In the general formula (13), $G_1$, $G_2$, and $G_3$ each independently is the same as G in the general formula (3), $W_1$, $W_2$, and $W_3$ each independently is the same as W in the general formula (3), $Y_1$, $Y_2$, and $Y_3$ each independently is the same as Y in the general formula (3), $R_{11}$, $R_{12}$, and $R_{13}$ each independently is the same as $R_1$ in the general formula (3), and $X_{11}$, $X_{12}$, and $X_{13}$ each independently is the same as in the case where $R_2$ in the general formula (3) represents a trivalent heterocyclic ring, and each independently represents a hetero atom in the heterocyclic ring constituted by Het.

Many tautomers can be considered for the azo pigments represented by the general formulae (1), (2), (3), and (4).

Also, in the invention, the azo pigments represented by the general formula (1) preferably have a substituent capable of forming an intramolecular hydrogen bond or an intramolecular crosslinking hydrogen bond. The pigments preferably have at least one intramolecular crosslinking hydrogen bond, more preferably have at least 3 intramolecular hydrogen bonds, and particularly preferably have a substituent capable of forming at least 3 intramolecular hydrogen bonds, with at least two of the hydrogen bonds forming an intramolecular crosslinking hydrogen bond.

Of the azo pigments represented by the general formulae (1), (2), (3), and (4), azo pigments represented by the general formulae (10) to (13) can be illustrated as particularly preferred azo pigments as has been said hereinbefore.

The reason that the structure is preferred is that, as is shown by the general formulae (10) to (13), the nitrogen atom(s) constituting the heterocyclic ring contained in the azo pigment structure, hydrogen atom(s), and hetero atom(s) (nitrogen atoms of the azo group or its tautomer of the hydrazone group, and the oxygen atom of the carbonyl group, or the nitrogen atom of the amino group) readily form at least one intramolecular crosslinking hydrogen bond (intramolecular hydrogen bond).

The reason that the structure is preferred is that, as is shown by the general formulae (10) and (11), the nitrogen atom(s) constituting the heterocyclic ring contained in the azo pigment structure, hydrogen atom(s) of the amino group, and hetero atom(s) (nitrogen atoms of the azo group or its tautomer of the hydrazone group, and the oxygen atom of the carbonyl group, or the nitrogen atom of the amino group) readily form at least one intramolecular crosslinking hydrogen bond.

More preferably, as is shown by the general formulae (12) and (13), the nitrogen atom(s) constituting the heterocyclic ring contained in the azo pigment structure, hydrogen atom(s) of the amino group, and hetero atom(s) (nitrogen atoms of the azo group or its tautomer of the hydrazone group, and the oxygen atom of the carbonyl group, or the nitrogen atom of the amino group) readily form at least four intramolecular hydrogen bonds, with at least two of them being intramolecular crosslinking hydrogen bonds.

As a result, flatness of the molecule is enhanced, the intramolecular and intermolecular mutual action is improved, crystallinity of the azo pigment represented by, for example, the general formula (12) is enhanced (higher structure of the pigment becoming liable to be formed), and hence performances required as pigments, i.e., light fastness, heat stability, moist heat stability, water resistance, gas resistance, and/or solvent resistance, can markedly be improved, thus such pigments being most preferred.

Also, in the invention, the compounds represented by the general formulae (1) to (13) may contain isotopes (e.g., 2H, 3H, 13C, and 15N).

Specific examples of the azo pigments represented by the general formulae (1) to (13) will be shown below which, however, do not limit azo pigments to be used in the invention. Also, each of the following structures of the specific examples is shown in the limiting structural formula selected from among several tautomers possible in view of chemical structure. However, needless to say, the pigments may be in other tautomer structures than the descried ones.

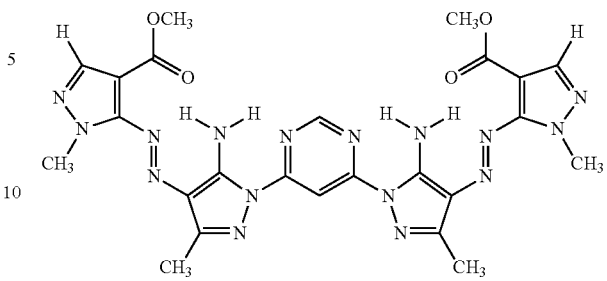

Pig.-3

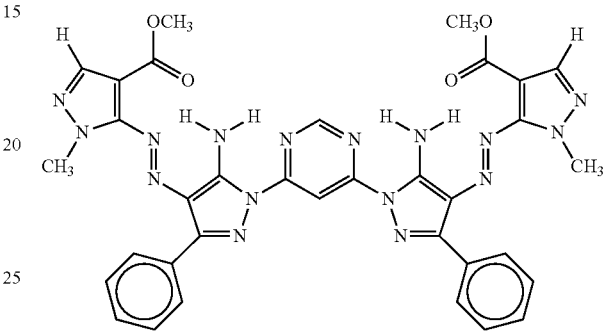

Pig.-4

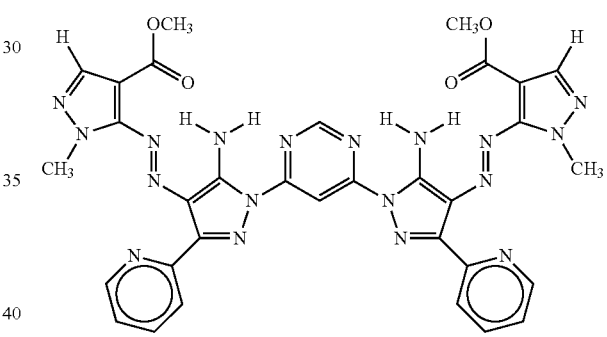

Pig.-5

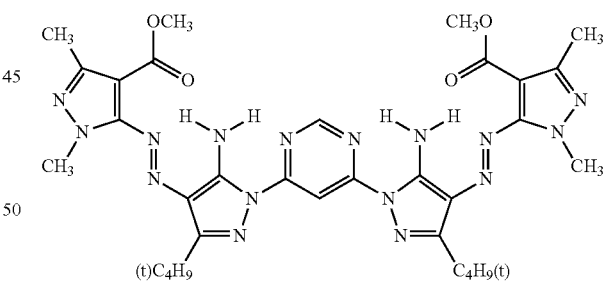

Pig.-6

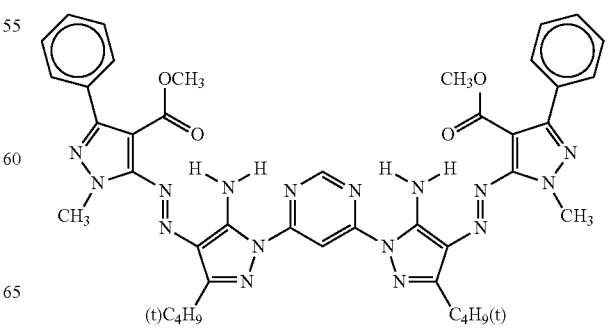

Pig.-7

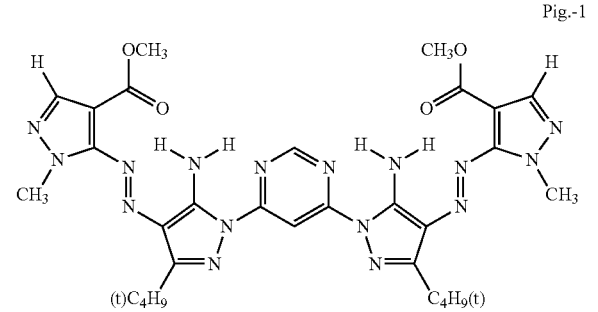

Pig.-1

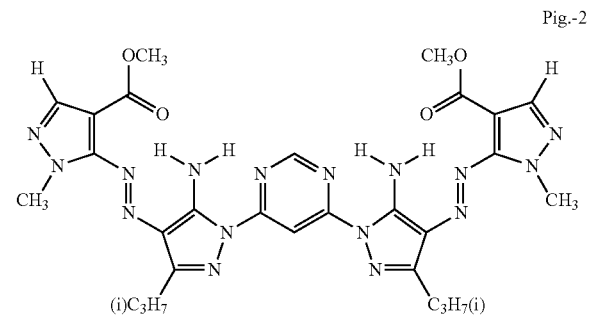

Pig.-2

Pig.-8
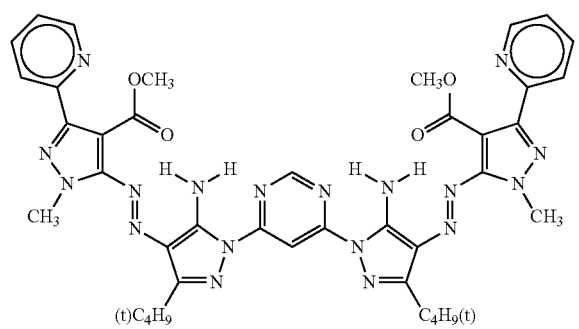
Pig.-9
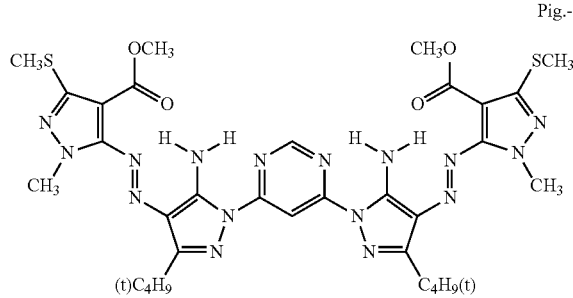
Pig.-10
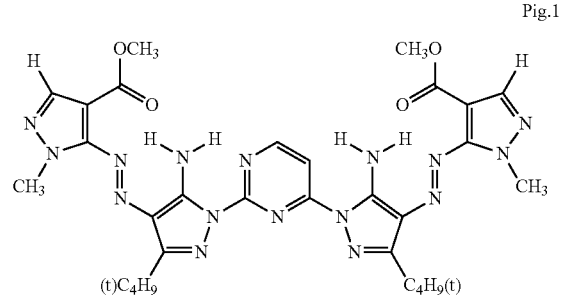
Pig.-11
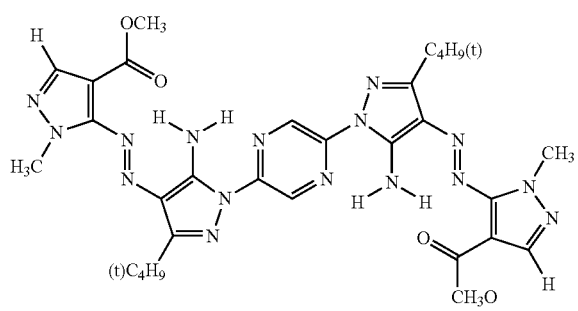
Pig.-12
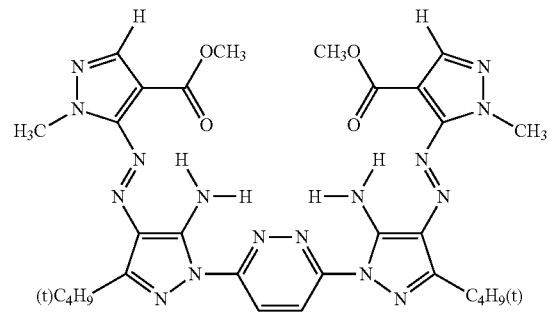
Pig.-13
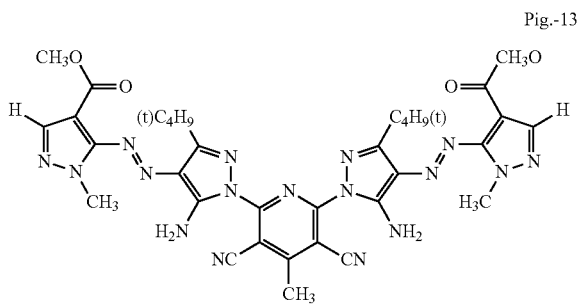
Pig.-14
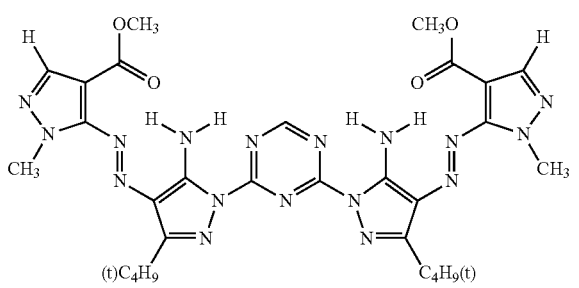
Pig.-15
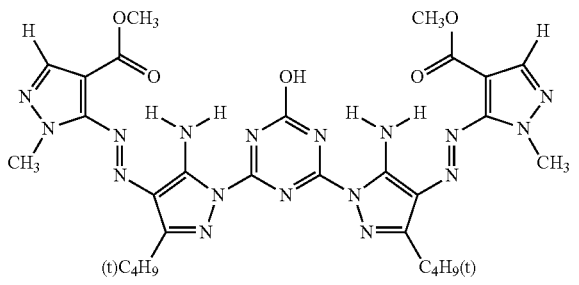
Pig.-16
Pig.-17
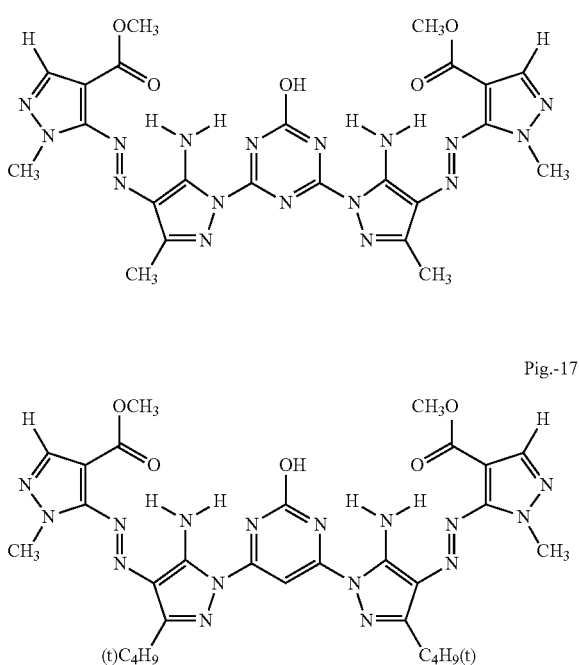

Pig.-55

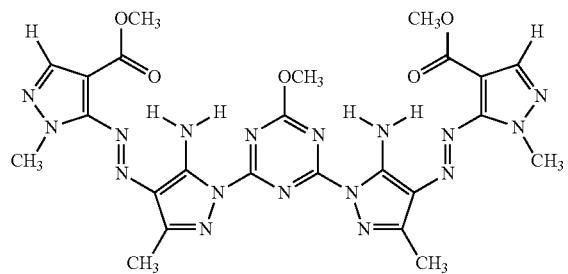

Pig.-56

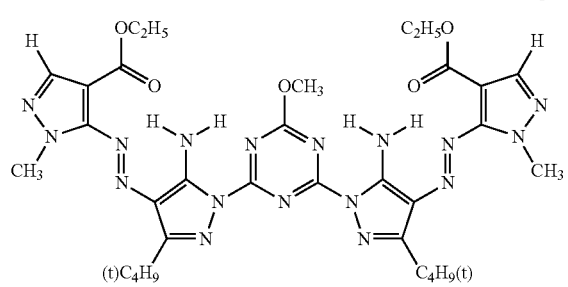

Pig.-57

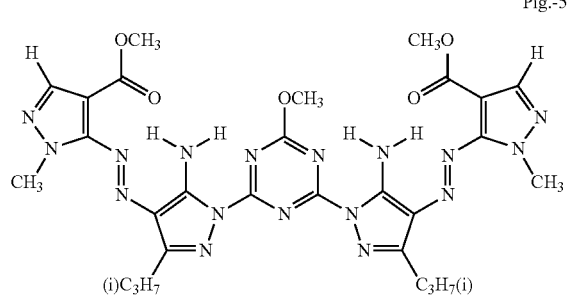

Pig.-58

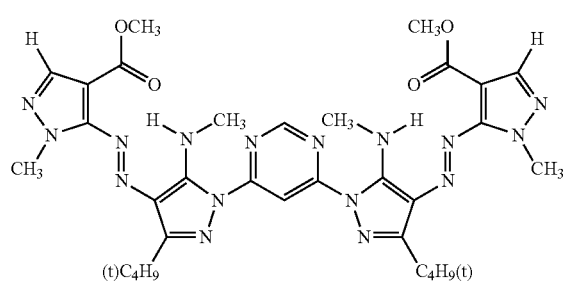

Pig.-59

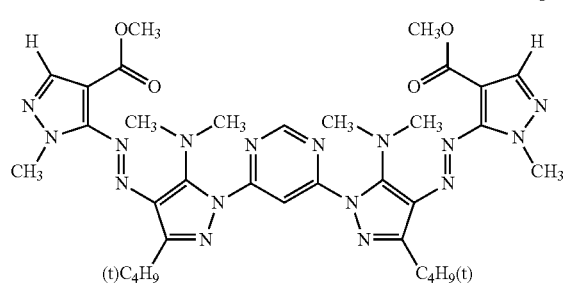

Pig.-60

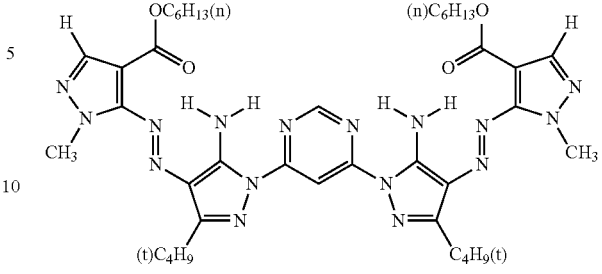

In the invention, even when tautomers exist due to the structures of the compounds, they are described in one typical form thereof. However, tautomers of different structures than those described in the invention are also included in the azo pigments of the invention. Further, salts and hydrates of the azo pigments of the invention are also included in the azo pigments of the invention.

The pigments of the invention represented by the general formula (1) may have a chemical structure represented by the general formula (1) or may be the tautomers thereof, and may be of any crystal form called polymorphic form.

Polymorphism means that crystals having the same chemical composition can be different from each other in the conformation of building block (molecules or ions) in the crystal. Chemical and physical properties of the pigments are decided by the crystal structure, and polymorphic forms of the same pigment can be discriminated from each other by rheology, color, and other color characteristics. Also, different polymorphic forms can be confirmed by X-Ray Diffraction (results of powder X-ray diffractiometry) or by X-Ray Analysis (results of X-ray analysis of crystal structure).

In the case where the pigments of the invention represented by the general formulae (1) to (4) exhibit polymorphism, they may be in any polymorphic forms and may be a mixture of two or more polymorphic forms. However, pigments wherein a single crystal form is predominant are preferred. That is, pigments not contaminated with polymorphic form crystals are preferred. The content of the azo pigment having a single crystal form is from 70% to 100%, preferably from 80% to 100%, more preferably from 90% to 100%, still more preferably from 95% to 100%, particularly preferably 100%, based on the entire azo pigment. When the azo pigment contains a single crystal form azo pigment as a major component, regularity of alignment of the pigment molecules is improved, and the intramolecular and intermolecular mutual action is enhanced, thus a high-level three-dimensional network being easily formed. As a result, performances required for pigments, such as hue, light fastness, humidity fastness, fastness to an oxidative gas, and solvent resistance, are improved, thus the above-described content being preferred.

The mixing ratio of polymorphic forms in the azo pigment can be confirmed from values obtained by physicochemical measurement such as X-ray crystal structure analysis of single crystal, powder X-ray diffractiometry (XRD), microscopic photography of the crystals (TEM), or IR (KBr method).

With those which have acid groups among the azo pigments of the invention represented by the general formula (1), part or all of the acid groups may be in a salt form, or the pigment may be a mixture of a salt type pigment and a free acid type pigment. Examples of the salt type include salts of an alkali metal such as Na, Li, or K, salts of an alkaline earth metal such as Mg, Ca, or Ba, salts of ammonium optionally substituted by an alkyl group or a hydroxyalkyl group, and salts of an organic amine. Examples of the organic amine include a lower alkyl amine, a hydroxyl-substituted lower alkyl amine, a carboxy-substituted lower alkyl amine, and a polyamine having from 2 to 10 alkyleneimine units containing from 2 to 4 carbon atoms. With these salt type pigments, they are not necessarily limited to one as to kind, but may be in a mixture of two or more thereof.

Further, as to the structure of the pigment to be used in the invention, in the case where plural acid groups exist in one molecule, the plural acid groups may be of a salt type or an acid type, and may be different from each other.

The azo pigments represented by the general formula (1) may be hydrates which contain water molecules within the crystal.

Next, one example of a process for producing the azo pigment represented by the general formula (1) will be described below. For example, a heterocyclic amine represented by the following general formula (A) is diazotized under acidic condition, then subjected to a coupling reaction with a compound represented by the following general formula (B), and subjected to an after-treatment in a conventional manner to thereby produce the azo pigment represented by the general formula (1).

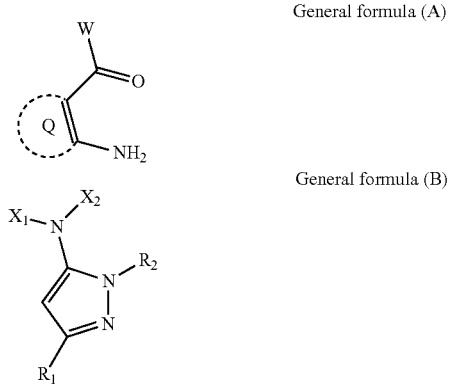

General formula (A)

General formula (B)

In the general formulae (A) and (B), W, Q, $R_1$, $R_2$, $X_1$, and $X_2$ are the same as those defined with respect to the general formula (1).

The heterocyclic amines represented by the general formula (A) can generally be produced by a known conventional process, for example, a process described in *Helv. Chim. Acta.* 41, 1958, 1052-1056 or in *Helv. Chim. Acta.* 42, 1959, 349-352, or a similar process.

The compounds represented by the general formula (B) can generally be produced by a process described in WO 06/082669 or in JP-A-2006-57076, or a similar process.

The diazotization reaction of the heterocyclic amine represented by the general formula (A) can be conducted, for example, by reacting it with a reagent such as sodium nitrite, nitrosylsulfonic acid, or isoamyl nitrite in an acidic solvent such as sulfuric acid, phosphoric acid, acetic acid, hydrochloric acid, or methanesulfonic acid at a temperature of 15° C. or less for about 10 minutes to about 6 hours.

The coupling reaction is preferably conducted by reacting the diazonium salt obtained by the above-mentioned process with the compound represented by the general formula (B) at 40° C. or less, preferably 25° C. or less, for about 10 minutes to about 12 hours.

The reaction product may form precipitated crystals but, in general, water or an alcoholic solvent is added to the reaction solution to thereby precipitate crystals, and the precipitated crystals can be collected by filtration. The crystals thus collected by filtration. Also, an alcoholic solvent or water may be added to the reaction solution to thereby precipitate crystals, and the precipitated crystals can be collected by filtration. The crystals thus collected by filtration are washed and dried, as needed, to obtain the azo pigment represented by the general formula (1).

The compounds represented by the general formula (1) are obtained as a crude azo pigment (crude) by the above-described production process. In the case of using them as the pigments of the invention, they are preferably subjected to after-treatment. As methods of the after-treatment, there are illustrated, for example, a pigment particle-controlling step such as milling treatment (e.g., solvent-salt milling, salt milling, dry milling, solvent milling or acid pasting) or solvent heating treatment; and a surface-treating step using, for example, a resin, a surfactant or a dispersing agent.

The compounds of the invention represented by the general formula (1) are preferably subjected to the solvent heating treatment and/or the solvent-salt milling as the after-treatment.

As a solvent to be used in the solvent heating treatment, there are illustrated, for example, water, aromatic hydrocarbon series solvents such as toluene and xylene; halogenated hydrocarbon series solvents such as chlorobenzene and o-dichlorobenzene; alcoholic solvents such as isopropanol and isobutanol; polar aprotic organic solvents such as N,N-dimethylformamide, N,N-dimethylacetamide, and N-methyl-2-pyrrolidone; glacial acetic acid; pyridine; and a mixture thereof. An inorganic or organic acid or base may further be added to the above-described solvents. The temperature of the solvent heating treatment varies depending upon the desired primary particle size of the pigment, but is preferably from 40 to 150° C., more preferably from 60 to 100° C. The treating time is preferably from 30 minutes to 24 hours.

As the solvent-salt milling, there is illustrated, for example, the procedure wherein a crude azo pigment, an inorganic salt, and an organic solvent which does not dissolve them are placed in a kneader, and knead-milling of the mixture is conducted therein. As the inorganic salt, water-soluble inorganic salts can preferably be used. For example, inorganic salts such as sodium chloride, potassium chloride, and sodium sulfate are preferably used. Also, it is more preferred to use inorganic salts having an average particle size of from 0.5 to 50 μm. The amount of the inorganic salt to be used is preferably a 3- to 20-fold amount by weight, more preferably a 5- to 15-fold amount by weight, based on the crude pigment. As the organic solvent, water-soluble organic solvents can preferably be used and, since the solvent becomes easily vaporizable due to an increase in temperature upon kneading, high-boiling solvents are preferred in view of safety. Examples of such organic solvents include diethylene glycol, glycerin, ethylene glycol, propylene glycol, liquid polyethylene glycol, liquid polypropylene glycol, 2-(methoxymethoxy)ethanol, 2-butoxyethanol, 2-(isopentyloxy) ethanol, 2-(hexyloxy)ethanol, diethylene glycol monomethyl ether, diethylene glycol monoethyl ether, diethylene glycol monobutyl ether, triethylene glycol, triethylene glycol monomethyl ether, 1-methoxy-2-propanol, 1-ethoxy-2-propanol, dipropylene glycol, dipropylene glycol monomethyl ether, dipropylene glycol monomethyl ether, dipropylene glycol, and a mixture thereof. The amount of the water-soluble organic solvent to be used is preferably a 0.1- to 5-fold amount based on the crude azo pigment. The kneading temperature is preferably from 20 to 130° C., particularly preferably from 40 to 110° C. As a kneader, there can be used, for example, a kneader and a mix muller.

[Pigment Dispersion]

The pigment dispersion of the invention is characterized in that it contains at least one of the azo pigments represented by the general formula (1), the tautomers of the azo pigments, and the salts or hydrates thereof. Thus, there can be obtained a pigment dispersion having excellent coloring characteristics, durability, and dispersion stability.

The pigment dispersion of the invention may be aqueous or non-aqueous, but is preferably an aqueous pigment dispersion. As the aqueous liquid for dispersing the pigment in the aqueous pigment dispersion of the invention, a mixture containing water as a major component and, as needed, a hydrophilic organic solvent can be used.

Examples of the hydrophilic organic solvent include alcohols such as methanol, ethanol, propanol, isopropanol, butanol, isobutanol, sec-butanol, t-butanol, pentanol, hexanol, cyclohexanol, and benzyl alcohol; polyhydric alcohols such as ethylene glycol, diethylene glycol, triethylene glycol, polyethylene glycol, propylene glycol, dipropylene glycol, polypropylene glycol, butylenes glycol, hexanediol, pentanediol, glycerin, hexanetriol, and thiodiglycol; glycol derivatives such as ethylene glycol monomethyl ether, ethylene glycol monoethyl ether, ethylene glycol monobutyl ether, diethylene glycol monomethyl ether, diethylene glycol monobutyl ether, propylene glycol monomethyl ether, propylene glycol monobutyl ether, dipropylene glycol monomethyl ether, triethylene glycol monomethyl ether, ethylene glycol diacetate, ethylene glycol monomethyl ether acetate, triethylene glycol monomethyl ether, and ethylene glycol monophenyl ether; amines such as ethanolamine, diethanolamine, triethanolamine, N-methyldiethanolamine, N-ethyl diethanolamine, morpholine, N-ethylmorpholine, ethylenediamine, diethylenetriamine, tri ethylenetetramine, polyethyleneimine, and tetramethylpropylenediamine; formamide; N,N-dimethylformamide; N,N-dimethylacetamide; dimethylsulfoxide; sulfolane; 2-pyrrolidone; N-methyl-2-pyrrolidone; N-vinyl-2-pyrolidone; 2-oxazolidone; 1,3-dimethyl-2-imidazolidinone; acetonitrile; and acetone.

Further, the aqueous pigment dispersion of the invention may contain an aqueous resin. As the aqueous resin, there are illustrated water-soluble resins which dissolve in water, water-dispersible resins which can be dispersed in water, colloidal dispersion resins, and a mixture thereof. Specific examples of the aqueous resins include acryl series resins, styrene-acryl series resins, polyester resins, polyamide resins, polyurethane resins, and fluorine-containing resins.

In the case where the aqueous pigment dispersion in the invention contains the aqueous resin, the content is not particularly limited. For example, the content may be from 0 to 100% by weight.

Further, in order to improve dispersibility of the pigment and quality of image, a surfactant and a dispersing agent may be used. As the surfactant, there are illustrated anionic, nonionic, cationic, and amphoteric surfactants, and any of them may be used. However, anionic or nonionic surfactants are preferred to use.

In the case where the aqueous pigment dispersion in the invention contains the surfactant, the content is not particularly limited. For example, the content may be from 0 to 100% by weight.

Examples of the anionic surfactants include aliphatic acid salts, alkyl sulfate salts, alkylbenzene sulfonate salts, alkylnaphthalene sulfonate salts, dialkyl sulfosuccinate salts, alkyldiaryl ether disulfonate salts, alkyl phosphate salts, polyoxyethylene alkyl ether sulfate salts, polyoxyethylene alkylaryl ether sulfate salts, naphthalenesulfonic acid-formalin condensates, polyoxyethylene alkyl phosphate salts, glycerol borate fatty acid esters, and polyoxyethylene glycerol fatty acid esters.

Examples of the nonionic surfactants include polyoxyethylene alkyl ethers, polyoxyethylene alkylaryl ethers, polyoxyethylene-oxypropylene block copolymers, sorbitan fatty acid esters, polyoxyethylene sorbitan fatty acid esters, polyoxyethylene sorbitol fatty acid esters, glycerin fatty acid esters, polyoxyethylene fatty acid esters, polyoxyethylene alkylamines, fluorine-containing surfactants, and silicon-containing surfactants.

The non-aqueous pigment dispersion of the invention comprises the pigment represented by the general formula (1) dispersed in a non-aqueous vehicle. Examples of resin to be used as the vehicle include petroleum resin, casein, shellac, rosin-modified maleic acid resin, rosin-modified phenol resin, nitrocellulose, cellulose acetate butyrate, cyclized rubber, chlorinated rubber, oxidized rubber, rubber hydrochloride, phenol resin, alkyd resin, polyester resin, unsaturated polyester resin, amino resin, epoxy resin, vinyl resin, vinyl chloride, vinyl chloride-vinyl acetate copolymer, acryl resin, methacryl resin, polyurethane resin, silicone resin, fluorine-containing resin, drying oil, synthetic drying oil, styrene/maleic acid resin, styrene/acryl resin, polyamide resin, polyimide resin, benzoguanamine resin, melamine resin, urea resin, chlorinated polypropylene, butyral resin, and vinylidene chloride resin. It is also possible to use a photocurable resin as the non-aqueous vehicle.

Examples of the solvents to be used in the non-aqueous vehicles include aromatic solvents such as toluene, xylene, and methoxybenzene; acetate series solvents such as ethyl acetate, butyl acetate, propylene glycol monomethyl ether acetate, and propylene glycol monoethyl ether acetate; propionate series solvents such as ethoxyethyl propionate; alcoholic solvents such as methanol and ethanol; ether series solvents such as butyl cellosolve, propylene glycol monomethyl ether, diethylene glycol ethyl ether, and diethylene glycol dimethyl ether; ketone series solvents such as methyl ethyl ketone, methyl isobutyl ketone, and cyclohexanone; aliphatic hydrocarbon series solvents such as hexane; nitrogen-containing compound series solvents such as N,N-dimethylformamide, γ-butyrolactam, N-methyl-2-pyrrolidone, aniline, and pyridine; lactone series solvents such as γ-butyrolactone; and carbamic acid esters such as a 48:52 mixture of methyl carbamate and ethyl carbamate.

In the invention, the volume-average particle diameter of the pigment is preferably from 10 nm to 250 nm. Additionally, the term "volume-average particle diameter of the pigment" means the particle diameter of the pigment itself or, in the case where an additive such as a dispersing agent is adhered to the pigment particles, means the diameter of the particle with the additive being adhered thereto. In the invention, as an apparatus for measuring the volume-average particle diameter of the pigment, a particle size analyzer of Nanotrac UPA (UPA-EX150; manufactured by Nikkiso Co., Ltd.) is used. The measurement is conducted according to a predetermined measuring method placing 3 ml of a pigment dispersion in a measuring cell. Additionally, with respect to parameters to be inputted upon measurement, an ink viscosity is used as a viscosity, and a pigment density is used as a density of the pigment.

The volume-average particle diameter of the pigment is more preferably from 20 nm to 250 nm, still more preferably from 25 nm to 230 nm, most preferably from 30 nm to 150 nm. In case when the volume-average particle diameter of the particles in the pigment dispersion is less than 20 nm, storage stability might not be ensured in some cases whereas, in case when the volume-average particle diameter of the particles in the pigment dispersion exceeds 250 nm, the optical density might be reduced in some cases.

The content of the pigment contained in the pigment dispersion of the invention is preferably in the range of from 1 to 35% by weight, more preferably in the range of from 2 to 25% by weight. In case when the content is less than 1% by weight, a sufficient image density might not be obtained in some cases by using the pigment dispersion independently as an ink composition. In case when the content exceeds 35% by weight, the dispersion stability might be reduced in some cases.

The pigment dispersion of the invention is obtained by dispersing the azo pigment and the aqueous or non-aqueous medium using a dispersing apparatus. As the dispersing apparatus, there can be used a simple stirrer, an impeller-stirring system, an in-line stirring system, a mill system (for example, colloid mill, ball mill, sand mill, beads mill, attritor, roll mill, jet mill, paint shaker, or agitator mill), a ultrasonic wave system, a high-pressure emulsion dispersion system (high-pressure homogenizer; specific commercially available apparatuses being Gaulin homogenizer, a microfluidizer, and DeBEE2000).

As uses of the azo pigments of the invention, there are illustrated image recording materials for forming images, particularly color images. Specifically, there are illustrated inkjet system recording materials to be described in detail below, heat-sensitive recording materials, pressure-sensitive recording materials, recording materials for the electro-photographic system, transfer system silver halide light-sensitive materials, printing inks, and recording pens, preferably inkjet system recording materials, heat-sensitive recording materials, and recording materials for the electro-photographic system, more preferably inkjet system recording materials.

In addition, the pigments can find application to color filters for recording and reproducing color images to be used in solid state imaging devices such as CCDs and in displays such as LCD and PDP and to a pigmenting solution for pigmenting various fibers.

The bisazo pigments of the invention are used by adjusting physical properties such as solvent resistance, dispersibility, and heat conductivity through selection of the substituents so as to be adapted for the particular use. Also, the bisazo pigments of the invention may be used in an emulsion dispersion state or in a solid dispersion state according to the system wherein they are used.

[Coloring Composition]

The coloring composition of the invention means a coloring composition containing at least one kind of the azo pigments of the invention. The coloring composition of the invention can contain a medium and, in the case where a solvent is used as the medium, the composition is particularly appropriate as an ink composition for inkjet recording. The coloring composition of the invention can be prepared by using an oleophilic medium or an aqueous medium as the medium and dispersing the azo pigment of the invention in the medium. Preferably, the aqueous medium is used. The coloring composition of the invention includes an ink composition excluding the medium. The coloring composition of the invention may contain, as needed, other additives within the range of not spoiling the advantages of the invention. Examples of the other additives include known additives (described in JP-A-2003-306623) such as a drying-preventing agent (a wetting agent), an antifading agent, an emulsion stabilizer, a penetration accelerator, an ultraviolet ray absorbent, an antiseptic, an antifungal agent, a pH-adjusting agent, a surface tension-adjusting agent, an anti-foaming agent, a viscosity-adjusting agent, a dispersing agent, a dispersion stabilizer, a rust inhibitor, and a chelating agent. In the case of water-soluble ink compositions, these various additives are added directly to the ink solution. In the case of oil-soluble ink compositions, it is general to add to a dispersion after preparing the azo pigment dispersion, but they may be added to an oil phase or an aqueous phase upon preparation.

[Ink Composition for Inkjet Recording]

Next, the ink composition of the invention for inkjet recording will be described below. The ink composition of the invention for inkjet recording (hereinafter also referred to as "ink composition") contains the pigment dispersion described above and is preferably prepared by mixing with a water-soluble solvent or water. However, in the case where no particular problems are involved, the pigment dispersion of the invention described above may be used as such.

In view of hue, color density, saturation, and transparency of an image formed on a recording medium, the content of the pigment dispersion in the ink composition of the invention is in the range of preferably from 1 to 100% by weight, particularly preferably from 3 to 20% by weight, most preferably from 3 to 10% by weight.

The pigment of the invention is contained in an amount of from 0.1 part by weight to 20 parts by weight, more preferably from 0.2 part by weight to 10 parts by weight, still more preferably from 1 to 10 parts by weight, in 100 parts by weight of the ink composition of the invention. The ink composition of the invention may further contain other pigment in combination with the pigment of the invention. In the case of using two or more kinds of pigments, the total amount of the pigments is preferably within the above-described range.

The ink composition of the invention can be used for forming a full-color image as well as a mono-color image. In order to form the full-color image, magenta tone ink, a cyan tone ink, and a yellow tone ink can be used and, further, a black tone ink can be used for adjusting tone.

Further, in the ink composition of the invention may be used other pigments in addition to the azo pigment of the invention. As yellow pigments to be applied, there are illustrated, for example, C.I. P.Y.-74, C.I. P.Y.-120, C.I. P.Y.-128, C.I.P.Y.-138, C.I.P.Y.-139, C.I.P.Y.150, C.I. P.Y.-155, C.I.P.Y.-180, C.I.P.Y.-185, and C.I. P.Y.-213. As magenta pigments to be applied, there are illustrated C.I. P.V.-19 and C.I. P.R-122. As cyan pigments to be applied, there are illustrated C.I. P.B-15:3 and C.I. P.B-15:4. Apart from these pigments, any pigment may be used as each pigment. As a black color material, there can be illustrated a dispersion of carbon black (C.I.P.B.-7) as well as disazo, trisazo, and tetraazo pigments.

As the water-soluble solvents to be used in the ink composition of the invention, polyhydric alcohols, polyhydric alcohol derivatives, nitrogen-containing solvents, alcohols, and sulfur-containing solvents are used. Specific examples of the polyhydric alcohols include ethylene glycol, diethylene glycol, propylene glycol, butylenes glycol, triethylene glycol, 1,5-pentanediol, 1,2,6-hexanetriol, and glycerin.

Examples of the polyhydric alcohol derivatives include ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, propylene glycol monobutyl ether, dipropylene glycol monobutyl ether, and an ethylene oxide adduct of diglycerin.

Also, examples of the nitrogen-containing solvents include pyrrolidone, N-methyl-2-pyrrolidone, cyclohexylpyrrolidone, and triethanolamine, examples of the alcohols include ethanol, isopropyl alcohol, butyl alcohol, and benzyl alcohol, and examples of the sulfur-containing solvents include thiodiethanol, thiodiglycerol, sulfolane, and dimethylsulfoxide. Besides, propylene carbonate and ethylene carbonate may also be used.

The water-soluble solvents to be used in the invention may be used alone or as a mixture of two or more thereof. As to the content of the water-soluble solvent, the solvent is used in an amount of from 1% by weight to 60% by weight, preferably from 5% by weight to 40% by weight, based on the total weight of the ink composition. In case when the content of the water-soluble solvent in the entire ink composition is less than 1% by weight, there might result an insufficient optical density in some cases whereas, in case when the content exceeds 60% by weight, there might result unstable jet properties of the ink liquid in some cases due to the large viscosity of the liquid.

The preferred physical properties of the ink composition of the invention are as follows. The surface tension of the ink is preferably from 20 mN/m to 60 mN/m, more preferably from 20 mN/m to 45 mN/m, still more preferably from 25 mN/m to 35 mN/m. In case when the surface tension is less than 20 mN/m, the liquid might, in some cases, overflow onto the nozzle surface of the recording head, thus normal printing not being performed. On the other hand, in case when the surface tension exceeds 60 mN/m, the ink composition might, in some cases, slowly penetrate into the recording medium, thus the drying time becoming longer.

Additionally, the surface tension is measured under the environment of 23° C. and 55% RH by using a Wilhelmy surface tension balance as is the same described above.

The viscosity of the ink composition is preferably from 1.2 mPa·s to 8.0 mPa·s, more preferably from 1.5 mPa·s to 6.0 mPa·s, still more preferably from 1.8 mPa·s to 4.5 mPa·s. In case when the viscosity is more than 8.0 mPa·s, ink ejection properties might, in some cases, be deteriorated. On the other hand, in case when the viscosity is less than 1.2 mPa·s, the long-term ejection properties might be deteriorated in some cases.

Additionally, the viscosity (including that to be described hereinafter) is measured by using a rotational viscometer Rheomat 115 (manufactured by Contraves Co.) at 23° C. and a shear rate of $1{,}400 \text{ s}^{-1}$.

In addition to the above-mentioned individual components, water is added to the ink composition within an amount of providing the preferred surface tension and viscosity described above. The addition amount of water is not particularly limited, but is in the range of preferably from 10% by weight to 99% by weight, more preferably from 30% by weight to 80% by weight, based on the total weight of the ink composition.

Further, for the purpose of controlling characteristic properties such as improvement of ejection properties, there can be used, as needed, polyethyleneimine, polyamines, polyvinylpyrolidone, polyethylene glycol, cellulose derivatives such as ethyl cellulose and carboxymethyl cellulose, polysaccharides and derivatives thereof, water-soluble polymers, polymer emulsions such as an acrylic polymer emulsion, a polyurethane series emulsion, and a hydrophilic latex, hydrophilic polymer gels, cyclodextrin, macrocyclic amines, dendrimers, crown ethers, urea and derivatives thereof, acetamide, silicone surfactants, and fluorine-containing surfactants.

Also, in order to adjust electrical conductivity and pH, there can be used compounds of alkali metals such as potassium hydroxide, sodium hydroxide, and lithium hydroxide; nitrogen-containing compounds such as ammonium hydroxide, triethanolamine, diethanolamine, ethanolamine, and 2-amino-2-methyl-1-propanol; compounds of alkaline earth metals such as calcium hydroxide; acids such as sulfuric acid, hydrochloric acid, and nitric acid; and salts between a strong acid and a weak alkali, such as ammonium sulfate. Besides, pH buffers, antioxidants, antifungal agents, viscosity-adjusting agents, electrically conductive agents, and ultraviolet ray absorbents may also be added as needed.

EXAMPLES

The invention will be described in more detail by reference to Examples which, however, are not to be construed as limiting the invention. Additionally, in Examples, "parts" are by weight.

The azo pigments of the invention can be synthesized according to the synthesizing process for synthesizing Pig.-1 to be described in the following Example 1.

Example 1

Synthesis of Illustrative Compound (Pig-1)

A synthesis scheme for the illustrative compound (Pig.-1) is shown below.

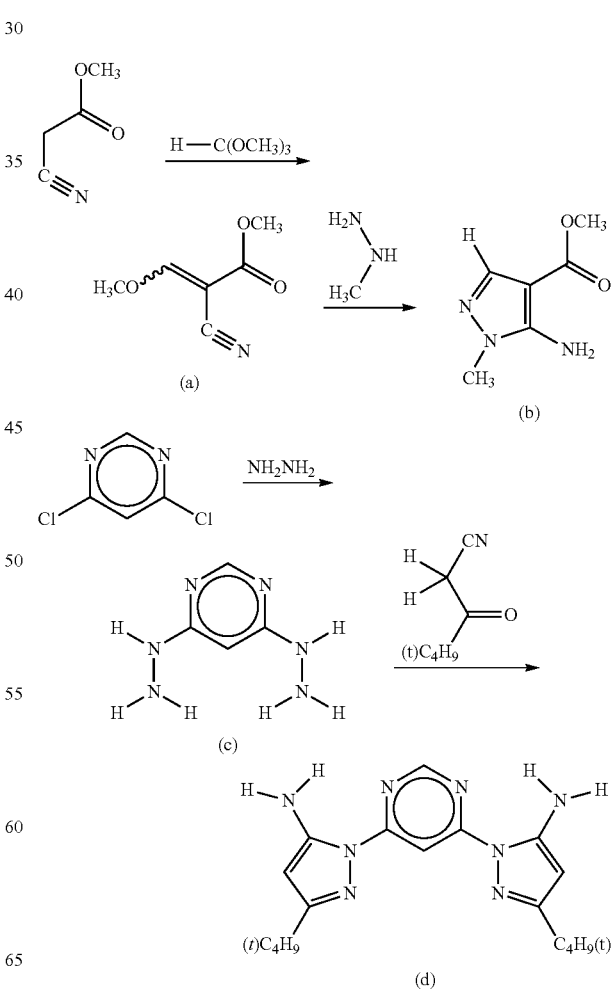

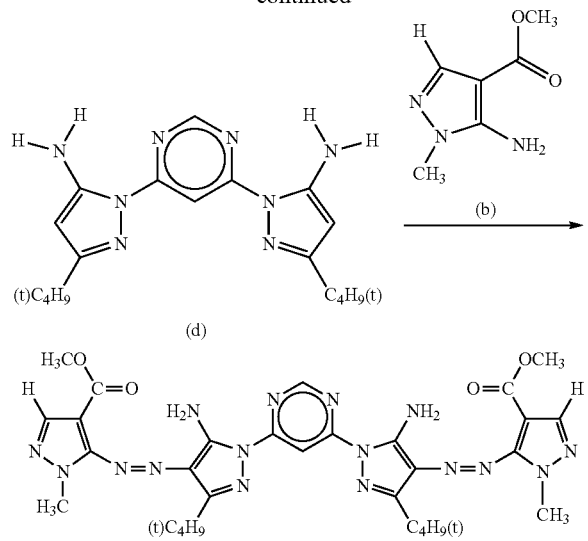

Pig.-1

(1) Synthesis of Intermediate (a)

42.4 g (0.4 mol) of trimethyl orthoformate, 20.4 g (0.2 mol) of acetic anhydride, and 0.5 g of p-toluenesulfonic acid are added to 29.7 g (0.3 mol) of methyl cyanoacetate, and the resulting mixture is heated to 110° C. (external temperature), followed by stirring for 20 hours with distilling off a low-boiling point component produced from the reaction system. After concentrating this reaction solution under reduced pressure, the concentrate is purified using a silica gel column to obtain 14.1 g (yellow powder; yield: 30%) of the intermediate (a). Results of NMR measurement of the thus-obtained intermediate (a) are as follows.

$^1$H-NMR (300 MHz, CDCl$_3$): 7.96 (s, 1H), 4.15 (s, 3H), 3.81 (s, 3H)

(2) Synthesis of Intermediate (b)

150 mL of isopropanol is added to 7.4 mL (141 mmol) of methylhydrazine, and the resulting mixture is cooled to 15° C. (internal temperature). To the resulting mixture is gradually added 7.0 g (49.6 mmol) of the intermediate (a), followed by stirring for 1 hour and 40 minutes under heating to 50° C. After concentrating this reaction solution under reduced pressure, the concentrate is purified using a silica gel column to obtain 10.5 g (white powder; yield: 50%) of the intermediate (b). Results of NMR measurement of the thus-obtained intermediate (b) are as follows.

$^1$H-NMR (300 MHz, CDCl$_3$): 7.60 (s, 1H), 4.95 (brs, 2H), 3.80 (s, 3H), 3.60 (s, 3H)

(3) Synthesis of Intermediate (c)

100 mL of methanol is added to 130 mL of hydrazine monohydrate, and the resulting mixture is cooled to 10° C. (internal temperature). To the resulting mixture is gradually added 50.0 g (336 mmol) of 4,6-dichloropyrimidine (internal temperature: 20° C. or less), followed by stirring for 4 hours and 30 minutes under heating to 50° C. Crystals precipitated from the reaction solution are collected by filtration, washed by applying isopropanol, and dried to thereby obtain 43.1 g (white powder; yield: 92%) of the intermediate (c). Results of NMR measurement of the thus-obtained intermediate (c) are as follows.

$^1$H-NMR (300 MHz, d-DMSO): 7.82 (s, 1H), 7.55 (s, 2H), 5.96 (s, 1H), 4.12 (s, 4H)

(4) Synthesis of Intermediate (d)

900 mL of water is added to 35.0 g (0.25 mol) of the intermediate (c) and 68.8 g (0.55 mol) of pivaloylacetonitrile 1, followed by stirring at room temperature. To the resulting suspension is added 1M hydrochloric acid aqueous solution to adjust the pH of the suspension to 3, followed by stirring for 8 hours under heating to 50° C. A potassium hydroxide aqueous solution is dropwise added to this reaction solution to adjust the pH to 8 and, further, 1M hydrochloric acid aqueous solution is dropwise added thereto to adjust the pH to 6. Crystals precipitated from the reaction solution are collected by filtration, washed by applying isopropanol, and dried to thereby obtain 83.0 g (white powder; yield: 94%) of the intermediate (d). Results of NMR measurement of the thus-obtained intermediate (d) are as follows.

$^1$H-NMR (300 MHz, d-DMSO): 8.73 (s, 1H), 7.97 (s, 1H), 6.88 (s, 4H), 5.35 (s, 2H), 1.22 (s, 18H)

(5) Synthesis of Illustrative Compound (Pig.-1)

18.5 mL of acetic acid is added to 4.1 mL of concentrated sulfuric acid and, while stirring under cooling with ice, 3.85 g (12.1 mmol) of 40% nitrosylsulfuric acid is dropwise added thereto. To the resulting mixture is gradually added 1.71 g (11.0 mmol) of the intermediate (b) (internal temperature: 0° C. or less), followed by stirring for 2 hours at 0° C. 150 mg of urea is added to this reaction solution, followed by stirring for further 15 minutes at 0° C. to thereby prepare a diazo solution A.

50 mL of methanol is added to the intermediate (d), and the resulting solution is heated to dissolve. The aforesaid diazo solution A is gradually added to the mixed solution under cooling with ice (internal temperature: 10° C. or less). This reaction solution is stirred for 2 hours at room temperature, and precipitated crystals are collected by filtration, and washed by applying methanol to thereby obtain crude crystals of the illustrative compound (Pig.-1). Further, water is added to the crude crystals, and the mixture is stirred. Then, the pH of this suspension is adjusted to 7 with a sodium hydroxide aqueous solution, and 20 mL of dimethylacetamide is added thereto, followed by stirring for 2 hours at 80° C. Precipitated crystals are collected by filtration and washed by suspension washing with methanol, and the resulting crystals are collected by filtration and dried to thereby obtain 2.0 g (yellow powder; yield: 79%) of the illustrative compound (Pig.-1). Results of measuring IR spectrum (KBr method) of the thus-obtained illustrative compound (Pig.-1) are shown in FIG. 1.

Example 2

Azo pigments shown in Table 1 are synthesized by employing the synthesizing process similar to that shown in Example 1 for the illustrative compound (Pig.-1).

IR spectra of the obtained azo pigments are shown in FIGS. 1 to 22.

TABLE 1

Figure 2:
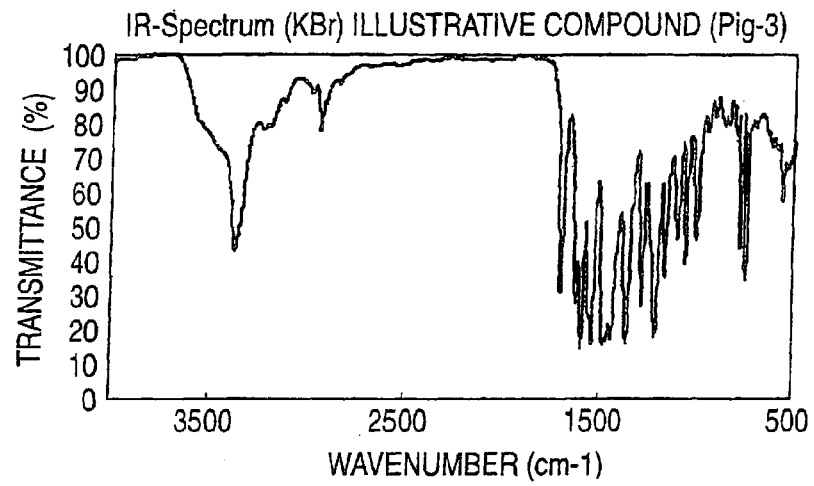
FIG. 2 is an infrared absorption spectrum of an illustrative compound (Pig.-3) of the azo pigment of the present invention.
Figure 3:
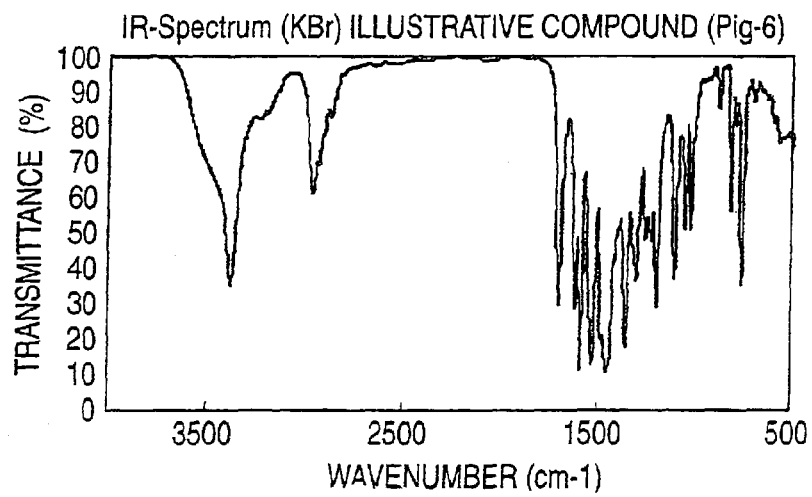
FIG. 3 is an infrared absorption spectrum of an illustrative compound (Pig.-6) of the azo pigment of the present invention.
Figure 4:
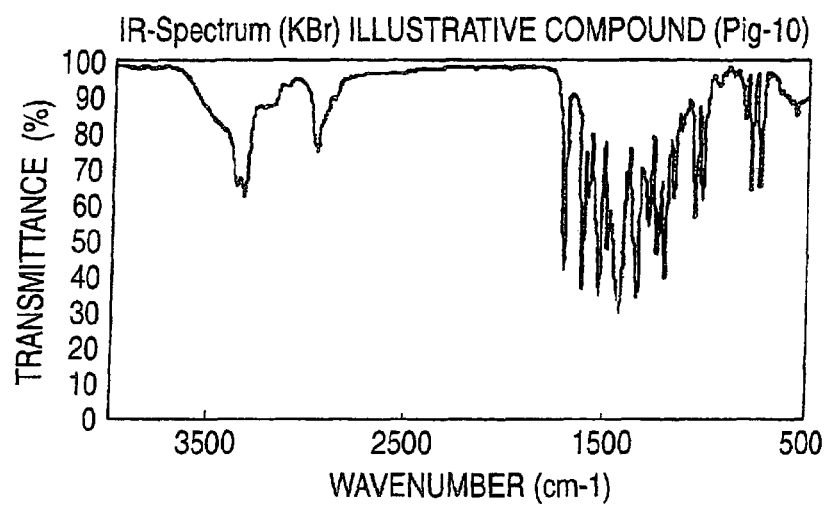
FIG. 4 is an infrared absorption spectrum of an illustrative compound (Pig.-10) of the azo pigment of the present invention.
Figure 5:
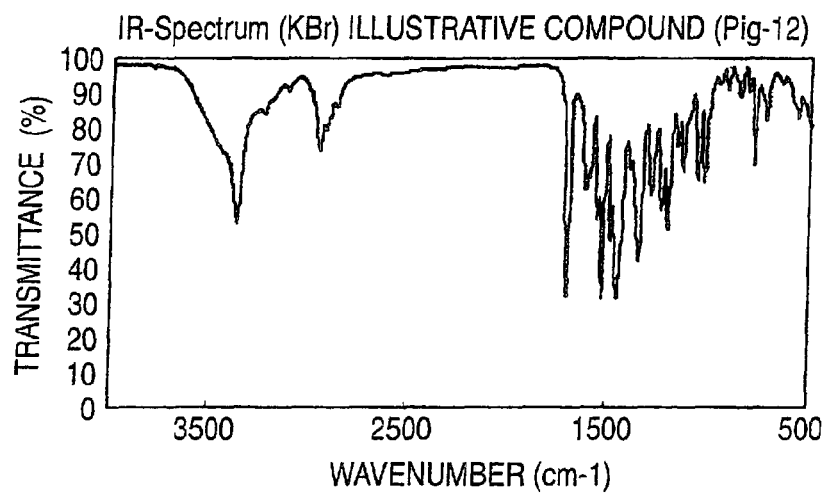
FIG. 5 is an infrared absorption spectrum of an illustrative compound (Pig.-12) of the azo pigment of the present invention.
Figure 6:
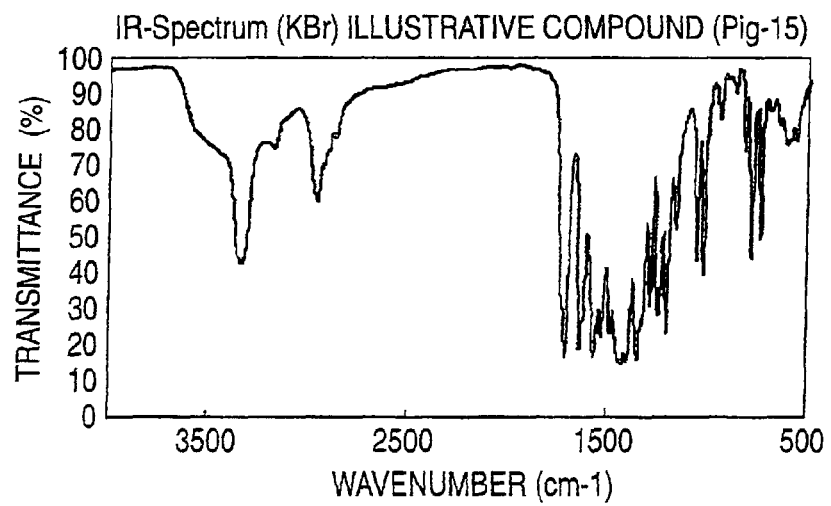
FIG. 6 is an infrared absorption spectrum of an illustrative compound (Pig.-15) of the azo pigment of the present invention.
Figure 7:
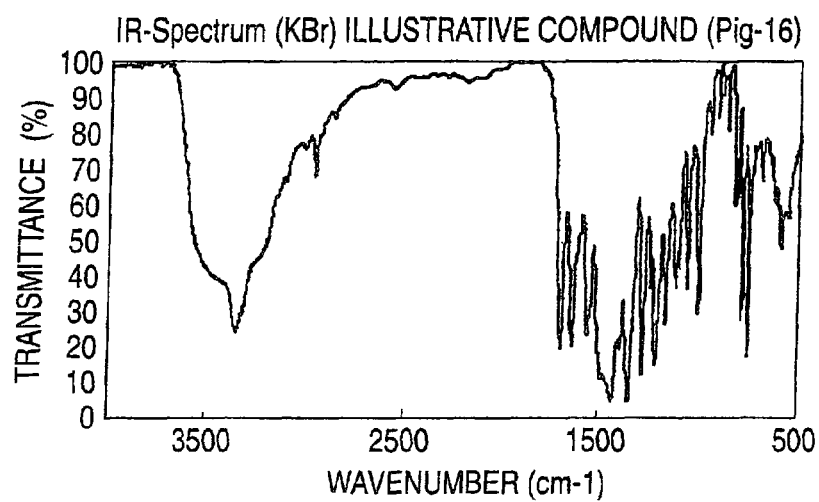
FIG. 7 is an infrared absorption spectrum of an illustrative compound (Pig.-16) of the azo pigment of the present invention.
Figure 8:
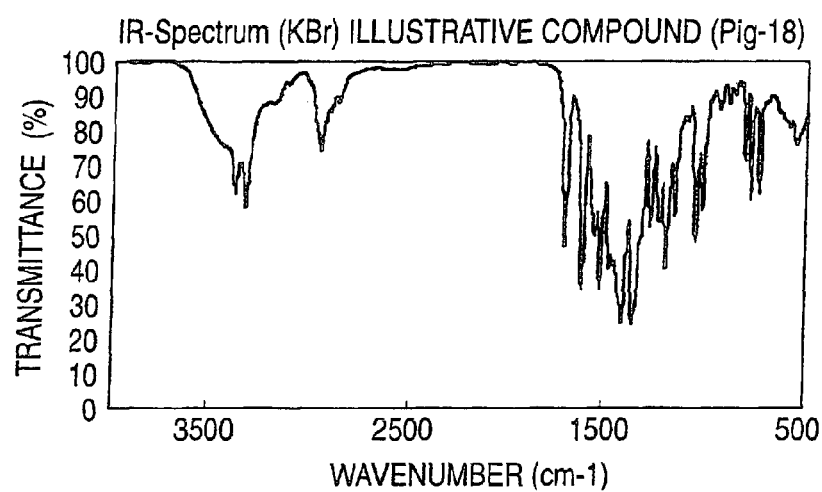
FIG. 8 is an infrared absorption spectrum of an illustrative compound (Pig.-18) of the azo pigment of the present invention.
Figure 9:
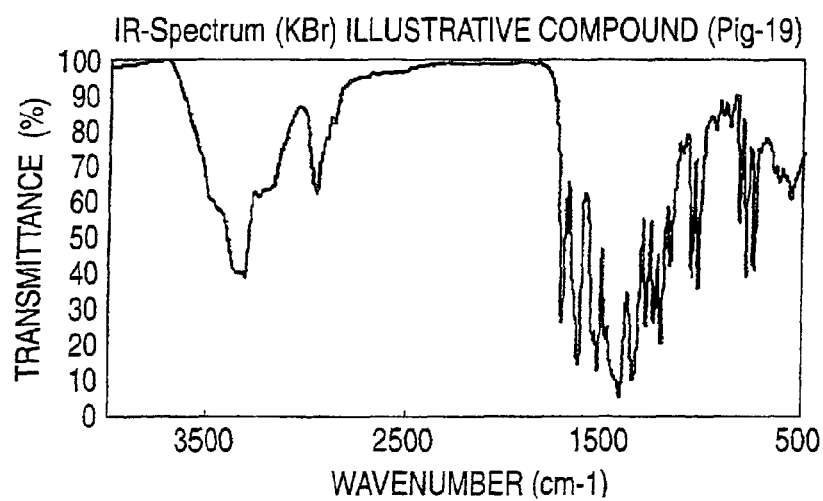
FIG. 9 is an infrared absorption spectrum of an illustrative compound (Pig.-19) of the azo pigment of the present invention.
Figure 13:
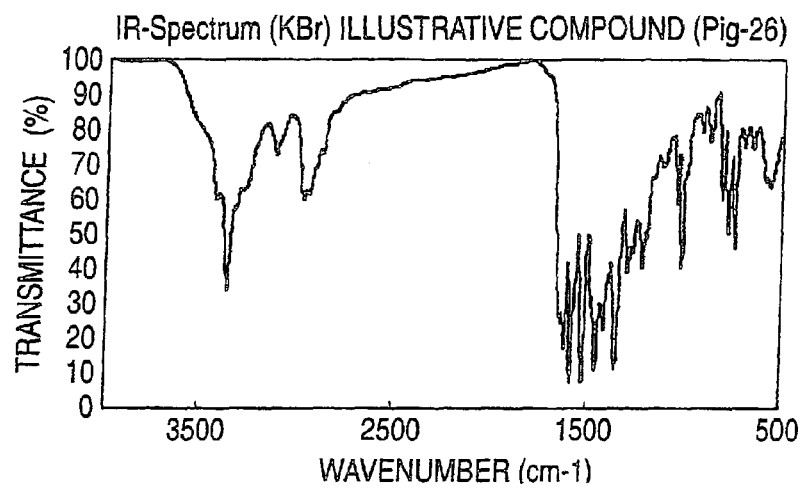
FIG. 13 is an infrared absorption spectrum of an illustrative compound (Pig.-26) of the azo pigment of the present invention.
Figure 14:
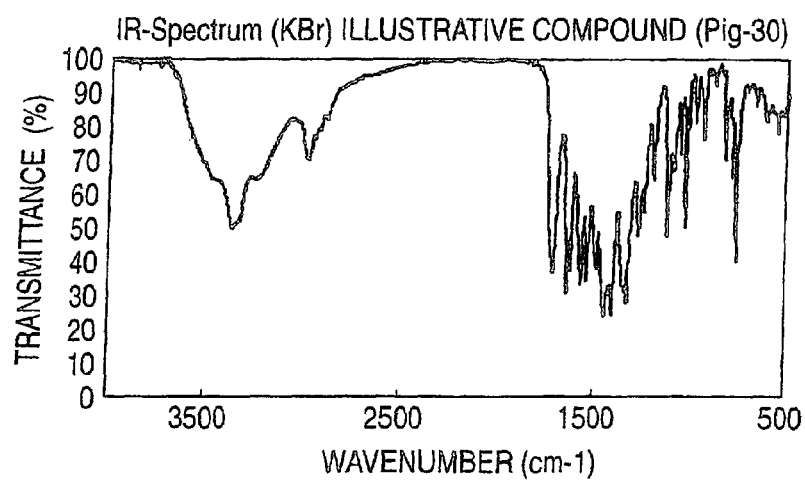
FIG. 14 is an infrared absorption spectrum of an illustrative compound (Pig.-30) of the azo pigment of the present invention.
Figure 15:
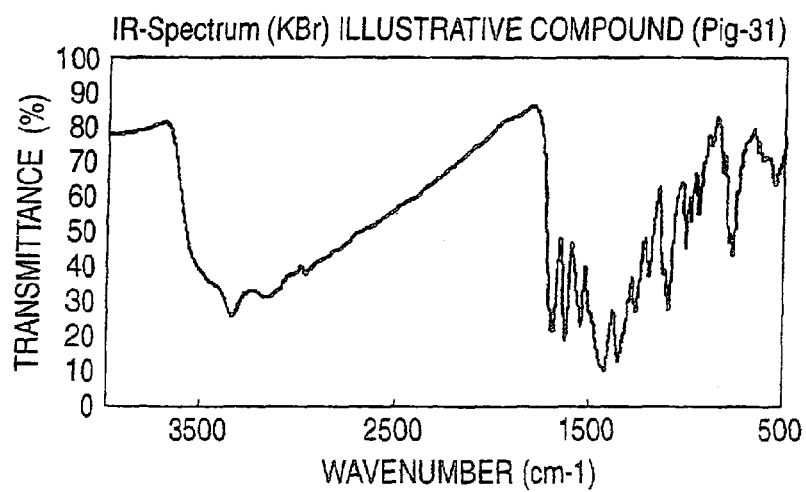
FIG. 15 is an infrared absorption spectrum of an illustrative compound (Pig.-31) of the azo pigment of the present invention.

| Azo Pigment of the Invention | IR Absorption Spectrum (KBr Method) |
|---|---|
| Pig.-1 | FIG. 1 |
| Pig.-3 | FIG. 2 |
| Pig.-6 | FIG. 3 |
| Pig.-10 | FIG. 4 |
| Pig.-12 | FIG. 5 |
| Pig.-15 | FIG. 6 |
| Pig.-16 | FIG. 7 |
| Pig.-18 | FIG. 8 |
| Pig.-19 | FIG. 9 |
| Pig.-21 | FIG. 10 |
| Pig. 24 | FIG. 11 |
| Pig.-25 | FIG. 12 |
| Pig.-26 | FIG. 13 |
| Pig.-30 | FIG. 14 |
| Pig.-31 | FIG. 15 |

TABLE 1-continued

Figure 16:
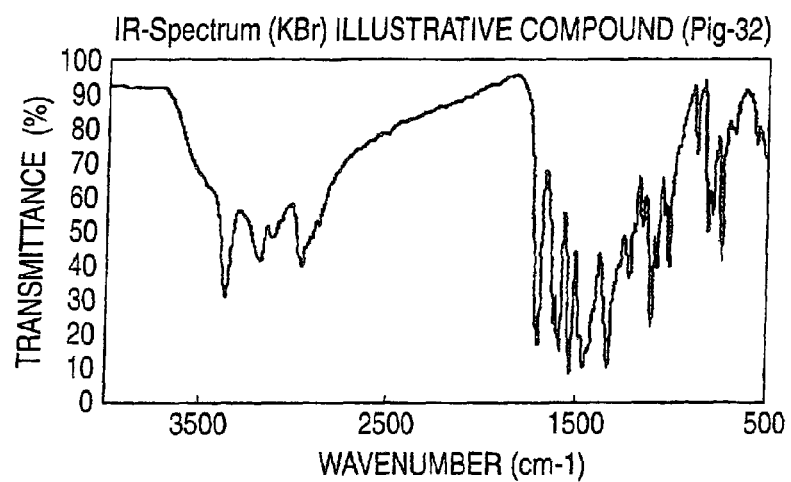
FIG. 16 is an infrared absorption spectrum of an illustrative compound (Pig.-32) of the azo pigment of the present invention.
Figure 17:
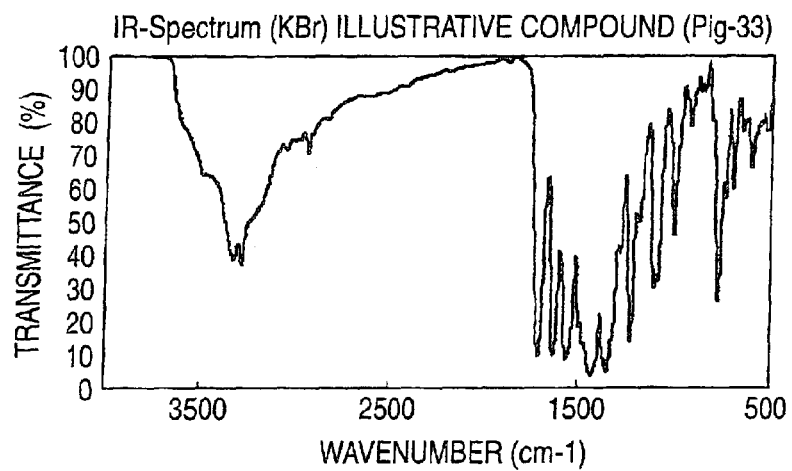
FIG. 17 is an infrared absorption spectrum of an illustrative compound (Pig.-33) of the azo pigment of the present invention.
Figure 18:
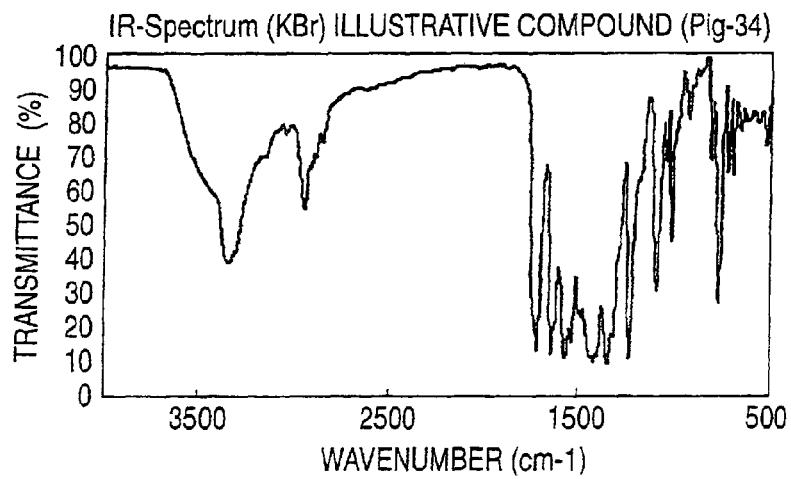
FIG. 18 is an infrared absorption spectrum of an illustrative compound (Pig.-34) of the azo pigment of the present invention.
Figure 19:
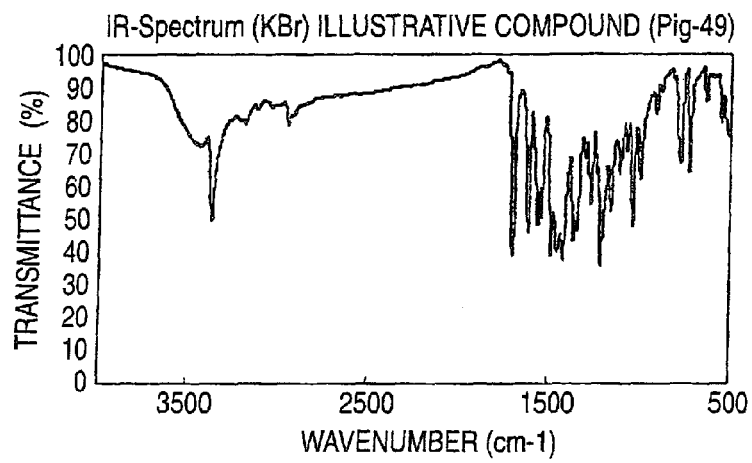
FIG. 19 is an infrared absorption spectrum of an illustrative compound (Pig.-49) of the azo pigment of the present invention.
Figure 20:
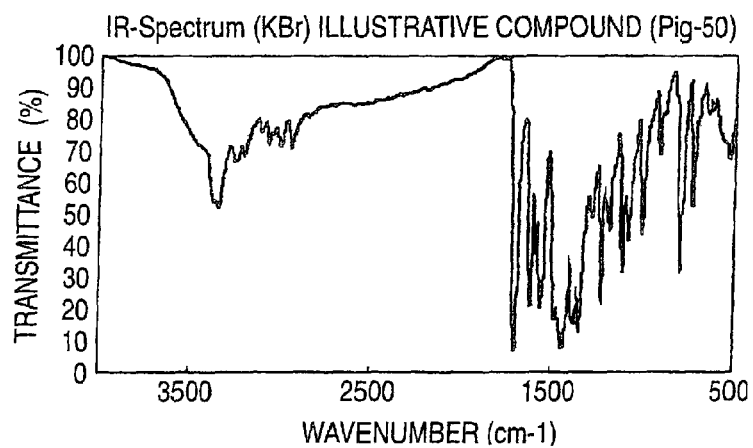
FIG. 20 is an infrared absorption spectrum of an illustrative compound (Pig.-50) of the azo pigment of the present invention.
Figure 21:
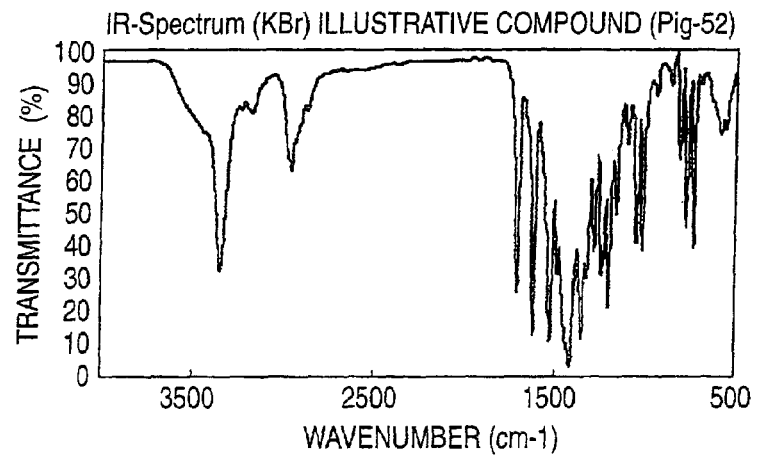
FIG. 21 is an infrared absorption spectrum of an illustrative compound (Pig.-52) of the azo pigment of the present invention.
Figure 22:
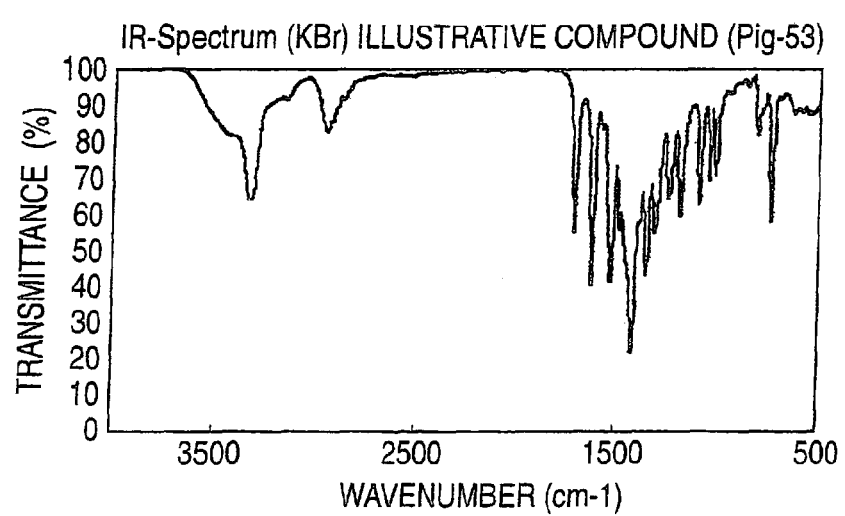
FIG. 22 is an infrared absorption spectrum of an illustrative compound (Pig.-53) of the azo pigment of the present invention.
Figure 18:
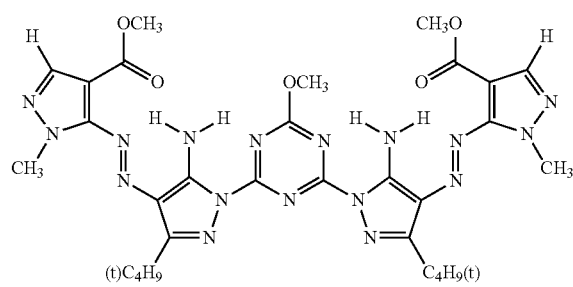
Figure 19:
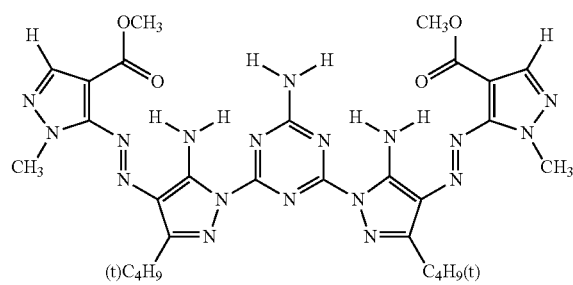
Figure 20:
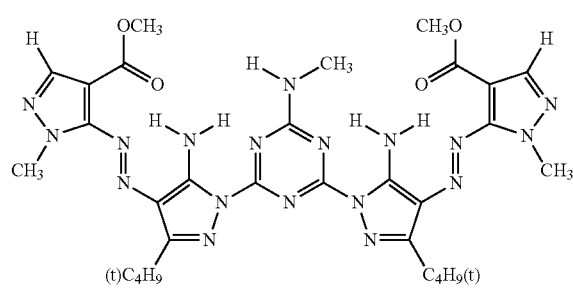
Figure 21:
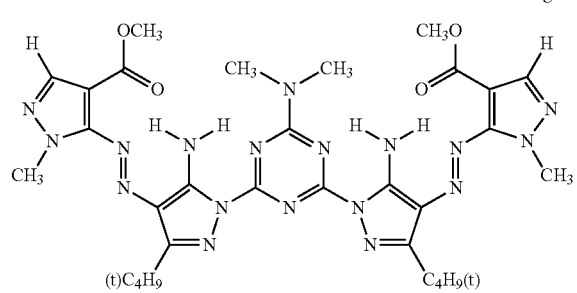
Figure 22:
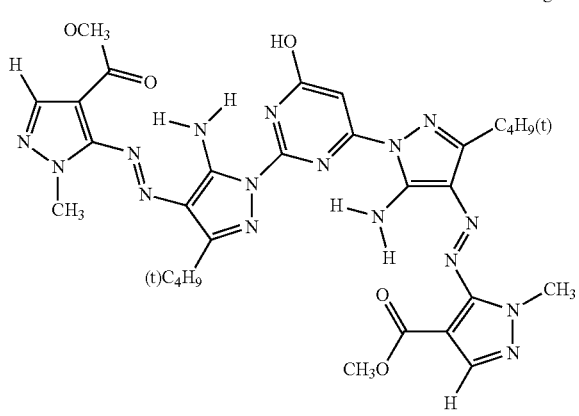
Figure 23:
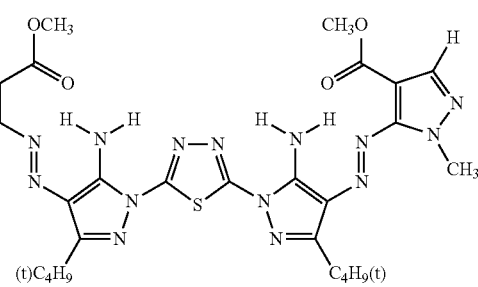
Figure 24:
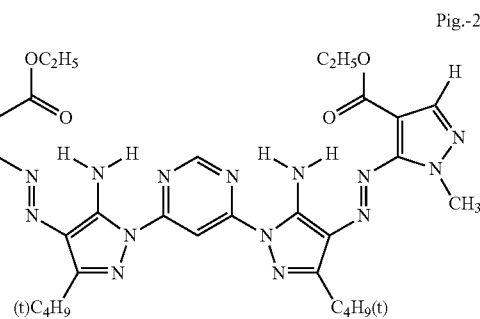
Figure 25:
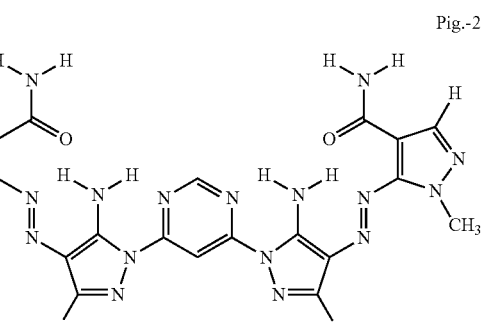
Figure 26:
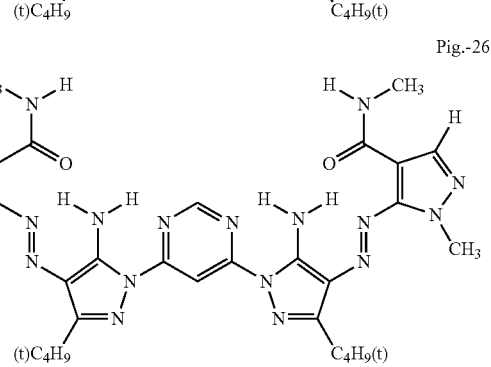
Figure 27:
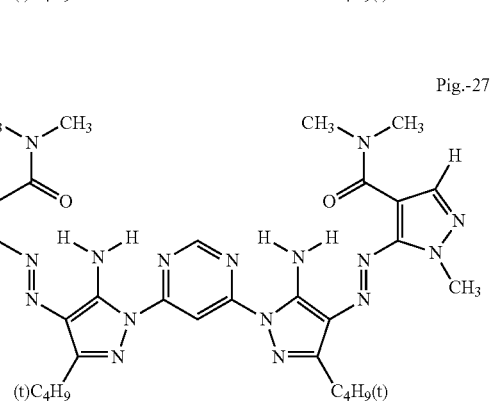
Figure 28:
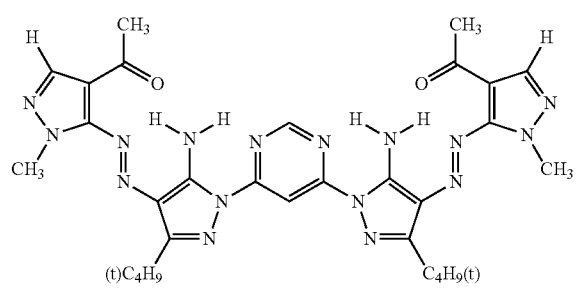
Figure 29:
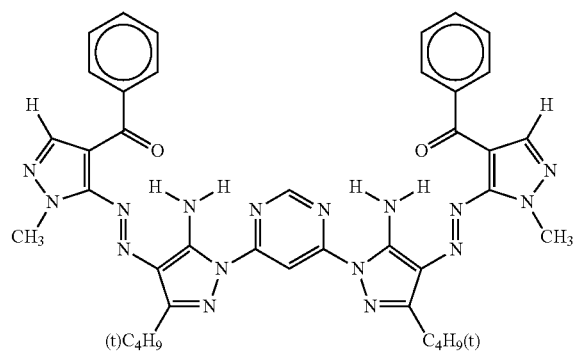
Figure 30:
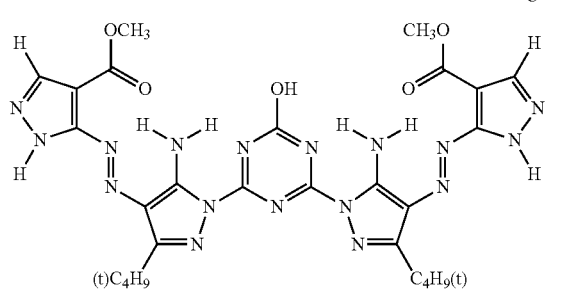
Figure 31:
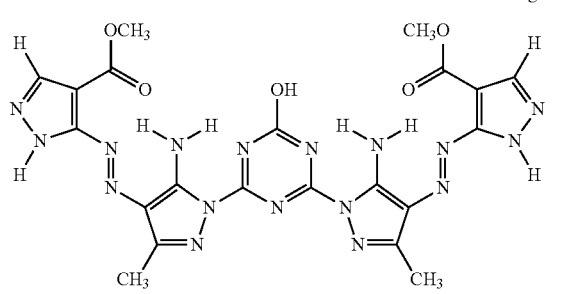
Figure 32:
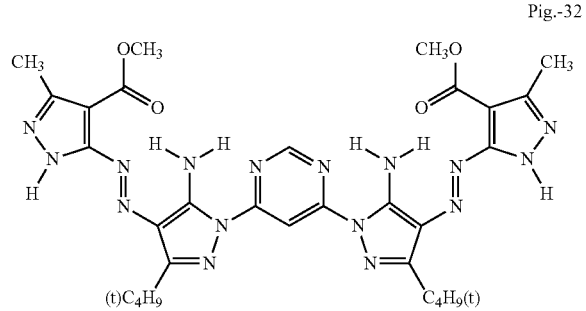
Figure 33:
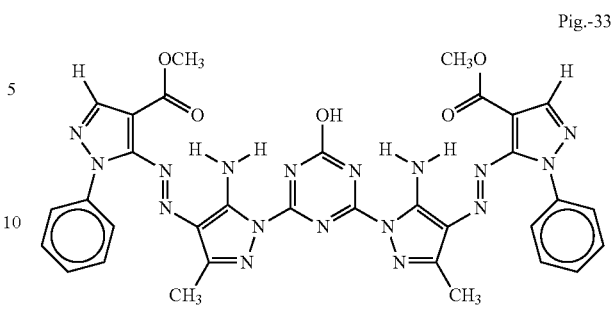
Figure 34:
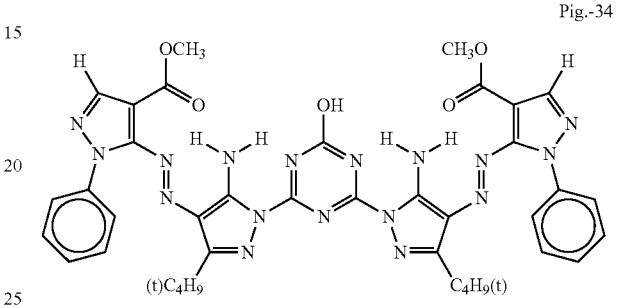
Figure 35:
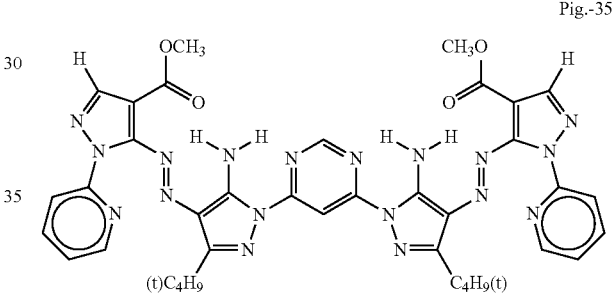
Figure 36:
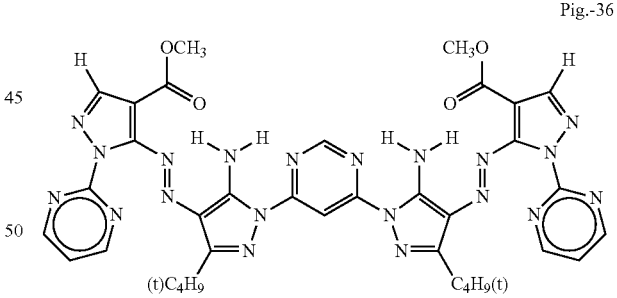
Figure 37:
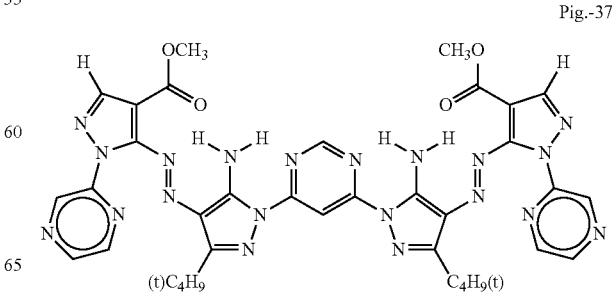
Figure 38:
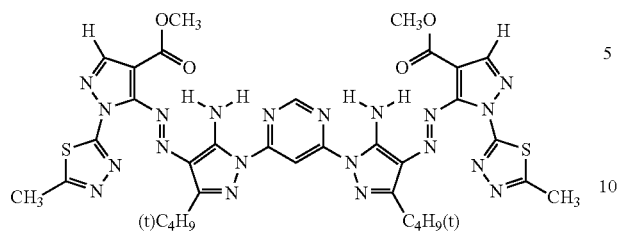
Figure 39:
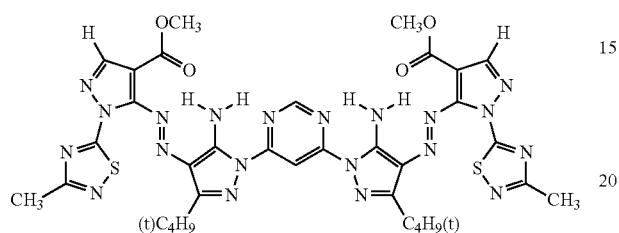
Figure 40:
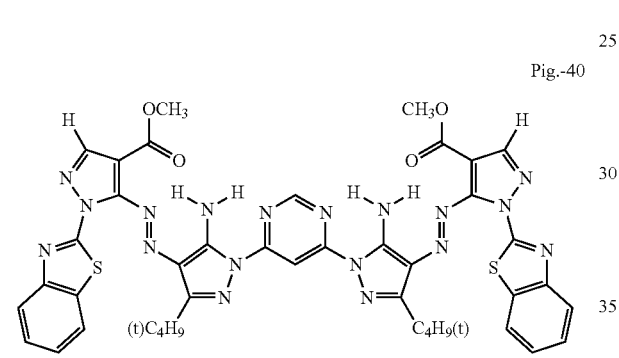
Figure 41:
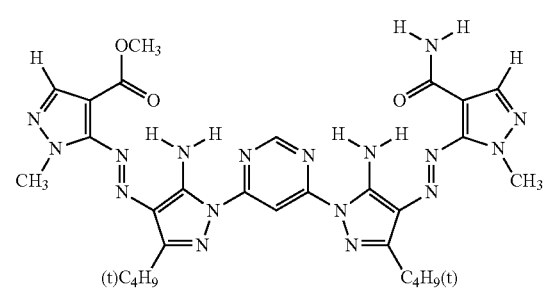
Figure 42:
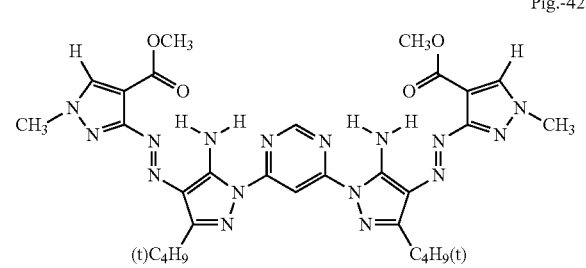
Figure 43:
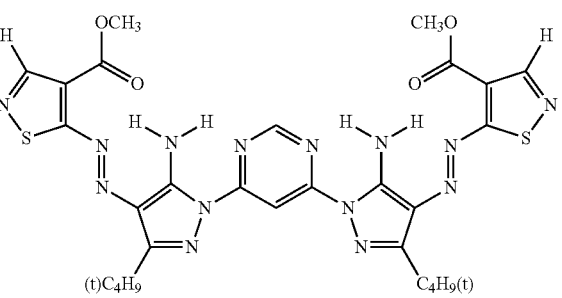
Figure 44:
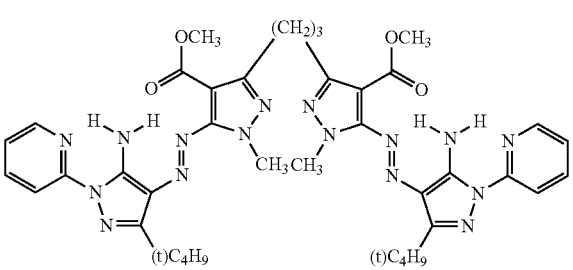
Figure 45:
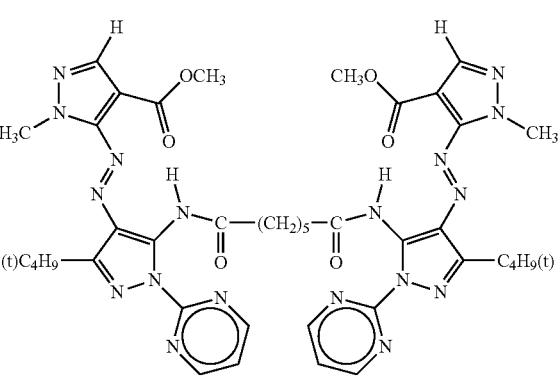
Figure 46:
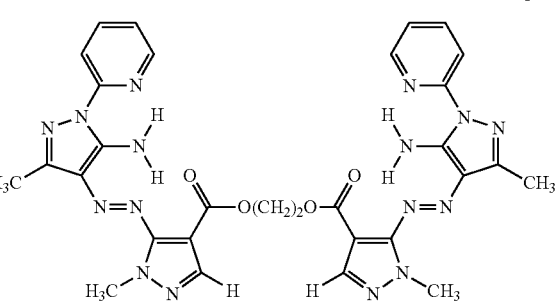
Figure 47:
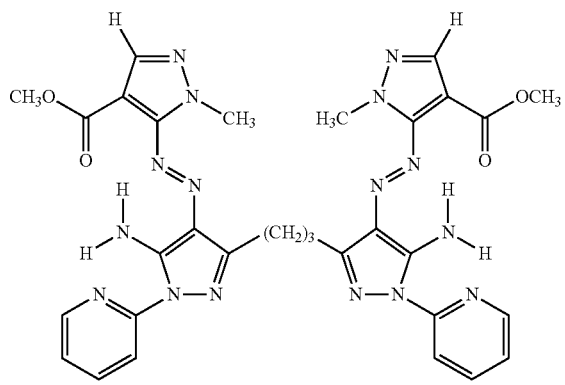
Figure 48:
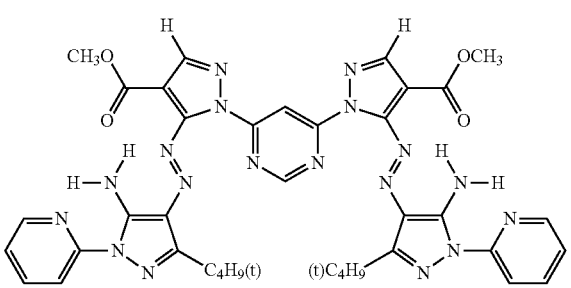
Figure 49:
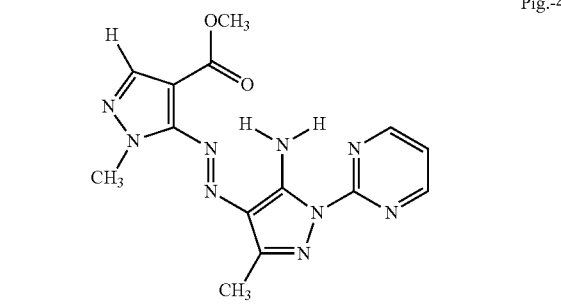
Figure 50:
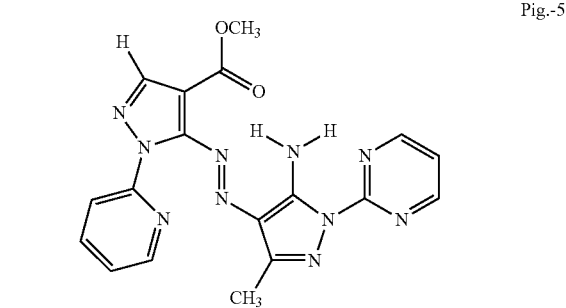
Figure 51:
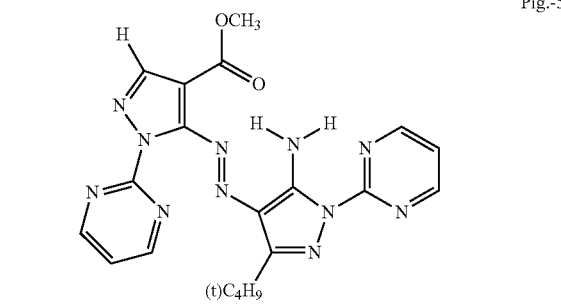
Figure 52:
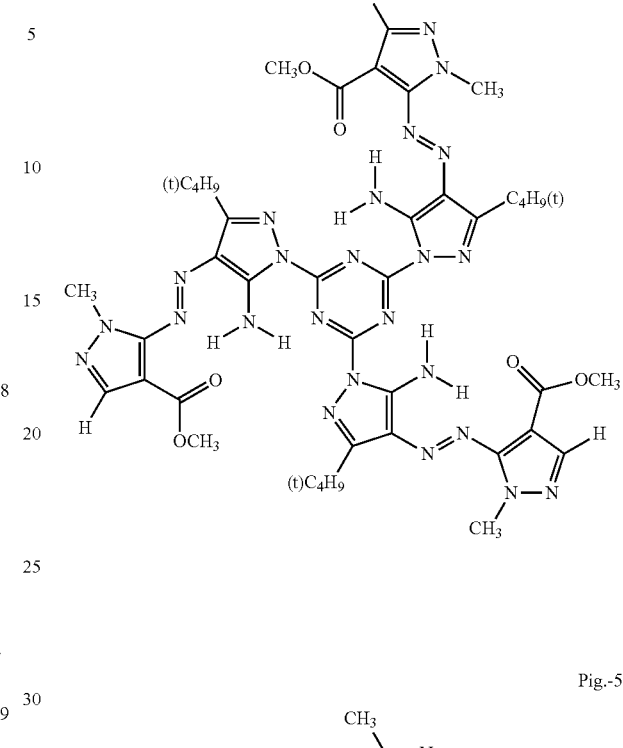
Figure 53:
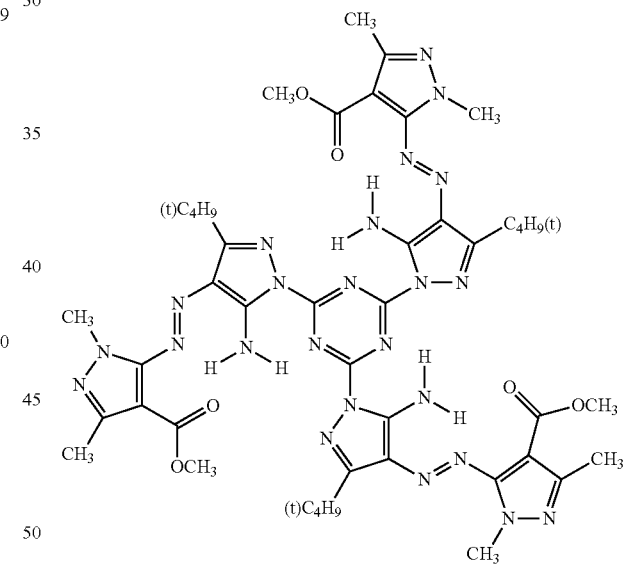
Figure 54:
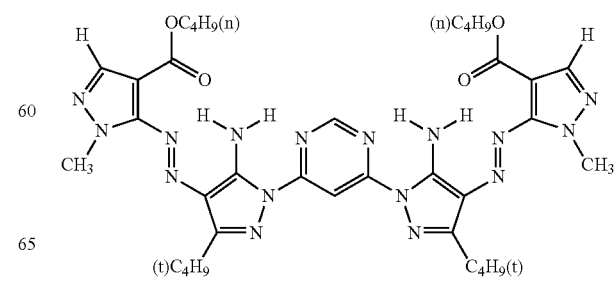

| Azo Pigment of the Invention | IR Absorption Spectrum (KBr Method) |
| --- | --- |
| Pig.-32 | FIG. 16 |
| Pig.-33 | FIG. 17 |
| Pig.-34 | FIG. 18 |
| Pig.-49 | FIG. 19 |
| Pig.-50 | FIG. 20 |
| Pig.-52 | FIG. 21 |
| Pig.-53 | FIG. 22 |

Example 3

2.5 parts of the illustrative compound (Pig.-1) synthesized according to the synthesis example for synthesizing (Pig.-1), 0.5 part of sodium oleate, 5 parts of glycerin, and 42 parts of water are mixed, and the resulting mixture is subjected to dispersing procedure together with 100 parts of 0.1-mm diameter zirconia beads for 3 hours at 300 rpm in a planetary ball mill (P-7; manufactured by Fritsch). After completion of dispersing the zirconia beads are separated to obtain a yellow pigment dispersion 1.

Example 4

A yellow pigment dispersion is prepared by using Pig.-10 in place of the azo pigment (Pig.-1) used in Example 3, and the diameter of the pigment particle is measured using Nanotrac 150 (UPA-EY150) manufactured by Nikkiso Co., Ltd. Subsequently, the dispersion is subjected to dispersing procedure at 300 rpm in the planetary ball mill till the particle size diameter My of the pigment dispersion becomes less than 100 nm to thereby obtain a yellow pigment dispersion 2.

Example 5

A yellow pigment dispersion 3 is obtained by the same procedure as in Example 4 except for using (Pig.-18) in place of the azo pigment (Pig.-10) used in Example 4.

Example 6

A yellow pigment dispersion 4 is obtained by the same procedure as in Example 4 except for using (Pig.-24) in place of the azo pigment (Pig.-10) used in Example 4.

Example 7

A yellow pigment dispersion 5 is obtained by the same procedure as in Example 4 except for using (Pig.-54) in place of the azo pigment (Pig.-10) used in Example 4.

Example 8

A yellow pigment dispersion 6 is obtained by the same procedure as in Example 4 except for using (Pig.-25) in place of the azo pigment (Pig.-10) used in Example 4.

Example 9

A yellow pigment dispersion 7 is obtained by the same procedure as in Example 4 except for using (Pig.-58) in place of the azo pigment (Pig.-10) used in Example 4.

Example 10

A yellow pigment dispersion 8 is obtained by the same procedure as in Example 4 except for using (Pig.-59) in place of the azo pigment (Pig.-10) used in Example 3.

Example 11

A yellow pigment dispersion 9 is obtained by the same procedure as in Example 4 except for using (Pig.-49) in place of the azo pigment (Pig.-10) used in Example 4.

Example 12

A yellow pigment dispersion 10 is obtained by the same procedure as in Example 4 except for using (Pig.-52) in place of the azo pigment (Pig.-10) used in Example 4.

Example 13

A yellow pigment dispersion 11 is obtained by the same procedure as in Example 4 except for using (Pig.-60) in place of the azo pigment (Pig.-10) used in Example 4.

Comparative Example 1

A corresponding yellow pigment dispersion is prepared by using C.I. Pigment Yellow 74 (Iralite YELLOW GO; manufactured by CIBA Specialty Chemicals) in place of the azo pigment (Pig.-1) used in Example 3, and the diameter of the pigment particle is measured using Nanotrac 150 (UPA-EY150) manufactured by Nikkiso Co., Ltd. Subsequently, the dispersion is subjected to dispersing procedure at 300 rpm in the planetary ball mill till the particle size diameter Mv of the pigment dispersion becomes less than 100 nm to thereby obtain a yellow comparative pigment dispersion 1.

Comparative Example 2

A yellow comparative dispersion 2 is obtained in the same manner as in Comparative Example 1 except for using C.I. Pigment Yellow 155 (INKJET YELLOW 4G VP2532; manufactured by Clariant Co.) in place of the azo pigment (Pig.-1) used in Example 3.

Comparative Example 3

A yellow comparative dispersion 3 is obtained in the same manner as in Comparative Example 1 except for using C.I. Pigment Yellow 128 (CROMOPHTAL YELLOW 8GN; manufactured by CIBA Specialty Chemicals) in place of the azo pigment (Pig.-1) used in Example 3.

Comparative Example 4

A yellow comparative dispersion 4 is obtained in the same manner as in Comparative Example 1 except for using a comparative compound 1 of the following structure in place of the azo pigment (Pig.-1) used in Example 3.

Comparative compound 1

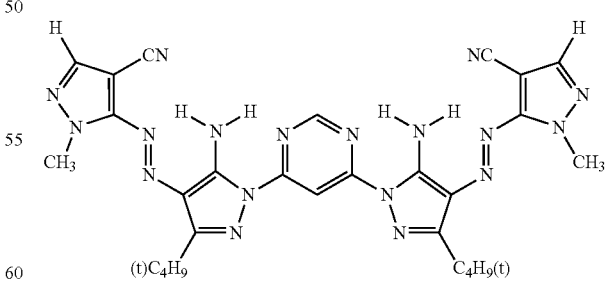

Comparative Example 5

A yellow comparative dispersion 5 is obtained in the same manner as in Comparative Example 1 except for using a comparative compound 2 of the following structure in place of the azo pigment (Pig.-1) used in Example 3.

Comparative compound 2

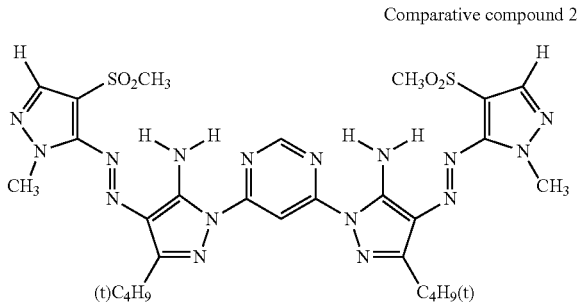

Comparative Example 6

Preparation of a yellow comparative pigment dispersion 6 is tried in the same manner as in Comparative Example 1 except for using a comparative compound 3 of the following structure in place of the pigment (Pig.-1) used in Example 3, but the pigment is dissolved in the solvent to form a colorant solution, thus a fine particle dispersion not being obtained.

Comparative compound 3

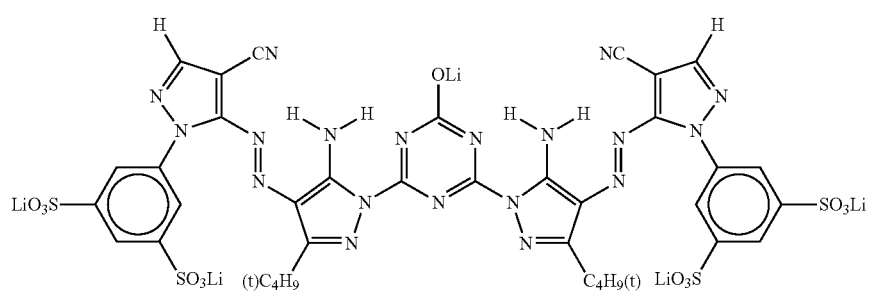

Comparative Example 7

Preparation of a yellow comparative pigment dispersion 7 is tried in the same manner as in Comparative Example 1 except for using a comparative compound 4 of the following structure in place of the pigment (Pig.-1) used in Example 3, but the pigment is dissolved in the solvent to form a colorant solution, thus a fine particle dispersion not being obtained.

Comparative compound 4

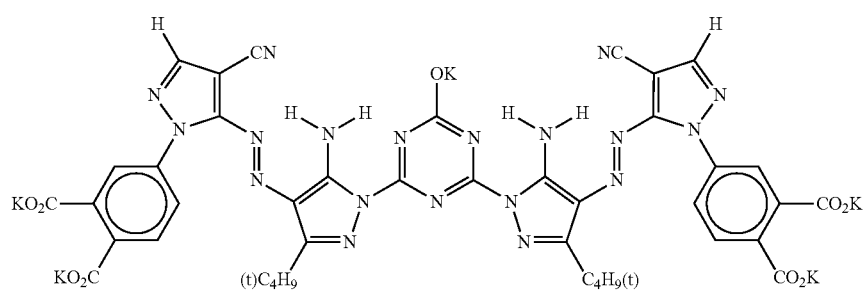

<Evaluation of Tinctorial Strength>

Each of the pigment dispersions obtained in Examples 3 to 13 and Comparative Examples 1 to 7 is coated on a photo mat paper manufactured by Seiko Epson Corporation by using a No. 3 bar coater. Image density of each of the thus-obtained coated products is measured by means of a reflection densitometer (X-Rite 938; manufactured by X-Rite Co.), and the results are shown in Table 2.

<Evaluation of Hue>

Hue is evaluated according to the following criteria: samples of the above-described products which are less reddish and have large vividness in terms of chromaticity when viewed with the eye are ranked A; samples which are reddish or have less vividness are ranked B; and samples which are reddish and have less vividness are ranked C (bad). The results are shown in Table 2.

<Evaluation of Light Fastness>

Each of the coated products of 1.0 in image density used in evaluation of hue is irradiated for 14 days with a xenon light (170,000 lux; in the presence of a cut filter which cuts light of 325 nm or less) and image density thereof is measured before and after irradiation with the xenon light. The pigment dispersions 1 to 11 and the comparative pigment dispersions 1 to 5 are evaluated in terms of colorant residual ratio [(density after irradiation/density before irradiation)×100%] according to the following criteria: samples with a colorant residual ratio of 90% or more are ranked A; samples with a colorant residual ratio of 80% or more and less than 90% are ranked B; samples with a colorant residual ratio of 70% or more and less than 80% are ranked C, samples with a colorant residual ratio of 60% or more and less than 70% are ranked D, and samples with a colorant residual ratio of less than 60% are ranked E. The results are shown in Table 2.

<Solvent Resistance>

Evaluation is conducted on each of the solutions prepared by adding 0.05 part of each of the compounds used in Examples and Comparative examples in 200 parts of an organic solvent and allowed to stand at room temperature for 24 hours. The evaluation is conducted according to the criteria that: a solution wherein the compound of the Example or the Comparative example is completely dissolved in the organic solvent is ranked D; a solution wherein the compound is not completely dissolved and some insolubles remain but the filtrate is colored is ranked C; a solution wherein the compound is not completely dissolved and some insolubles remain but the filtrate is slightly colored is ranked B; and a solution wherein insolubles remain and the filtrate is not colored is ranked A. Additionally, as the organic solvent, a mixed solvent of four kinds of solvents, i.e., a mixed solvent of 25 parts of methanol, 25 parts of acetone, 25 parts of ethyl acetate, and 25 parts of water is used.

TABLE 2

| | Pigment Dispersion | Volume-average Particle Diameter | Tinctorial strength | Hue | Light Resistance | Solvent Resistance |
|---|---|---|---|---|---|---|
| Example 3 | Pigment dispersion 1 of the invention | Mv = ca. 55 nm | 1.50 | A | A | A |
| Example 4 | Pigment dispersion 2 of the invention | Mv = ca. 35 nm | 1.40 | A | C | B |
| Example 5 | Pigment dispersion 3 of the invention | Mv = ca. 50 nm | 1.40 | A | A | A |
| Example 6 | Pigment dispersion 4 of the invention | Mv = ca. 60 nm | 1.48 | A | B | B |
| Example 7 | Pigment dispersion 5 of the invention | Mv = ca. 50 nm | 1.45 | A | C | B |
| Example 8 | Pigment dispersion 6 of the invention | Mv = ca. 55 nm | 1.55 | A | C | B |
| Example 9 | Pigment dispersion 7 of the invention | Mv = ca. 66 nm | 1.40 | A | C | B |
| Example 10 | Pigment dispersion 8 of the invention | Mv = ca. 63 nm | 1.35 | A | C | C |
| Example 11 | Pigment dispersion 9 of the invention | Mv = ca. 88 nm | 1.30 | A | B | C |
| Example 12 | Pigment dispersion 10 of the invention | Mv = ca. 77 nm | 1.85 | A | C | B |
| Example 13 | Pigment dispersion 11 of the invention | Mv = ca. 95 nm | 1.38 | A | C | C |
| Comparative example 1 | Comparative pigment dispersion 1 | Mv = ca. 50 nm | 1.43 | A | E | B |
| Comparative example 2 | Comparative pigment dispersion 2 | Mv = ca. 45 nm | 1.09 | C | C | A |
| Comparative example 3 | Comparative pigment dispersion 3 | Mv = ca. 50 nm | 1.03 | C | B | A |
| Comparative example 4 | Comparative pigment dispersion 4 | Mv = ca. 29 nm | 1.58 | A | D | B |
| Comparative example 5 | Comparative pigment dispersion 5 | Mv = ca. 35 nm | 1.35 | A | D | B |
| Comparative example 6 | Comparative pigment dispersion 6 | No formation of a fine particle dispersion | — | — | — | D |
| Comparative example 7 | Comparative pigment dispersion 7 | No formation of a fine particle dispersion | — | — | — | D |

Example 21

1.5 parts of the illustrative compound (Pig.-1) synthesized according to the synthesis example for synthesizing (Pig.-1), 0.28 part of sodium oleate, 3 parts of glycerin, and 10.22 parts of water are mixed, and the resulting mixture is subjected to dispersing procedure together with 40 parts of 0.1-mm diameter zirconia beads for 3 hours at 300 rpm in a planetary ball mill (P-7; manufactured by Fritsch). After completion of the dispersing procedure, the zirconia beads are removed to obtain a yellow pigment dispersion 21 containing 10% by weight of slid components (particle diameter: 32 nm; measured by using Nanotrac 150 (UPA-EY150) manufactured by Nikkiso Co., Ltd.

Example 22

A mixture is prepared by adding the pigment dispersion 21 obtained in Example 21 in a solid content of 5% by weight, glycerin in a content of 10% by weight, 2-pyrrolidone in a content of 5% by weight, 1,2-hexanediol in a content of 2% by weight, triethylene glycol monobutyl ether in a content of 2% by weight, propylene glycol in a content of 0.5% by weight, SURFINOL 465 in a content of 1% by weight, and 74.5% by weight of deionized water. The resulting mixed liquid is filtered through a 20-mL volume syringe fit with a 1.2-μm filter (acetylcellulose membrane; outer diameter: 25 mm; manufactured by Fuji Photo Film Co., Ltd.) to remove coarse particles. Thus, a pigment ink liquid 1 is obtained.

Example 23

A pigment dispersion is prepared by using (Pig.-2) in place of the azo pigment (Pig.-1) used in Example 21, and the diameter of the pigment particle is measured using Nanotrac 150 (UPA-EY150) manufactured by Nikkiso Co., Ltd. Subsequently, the dispersion is subjected to dispersing procedure at 300 rpm in the planetary ball mill till the particle diameter My of the pigment dispersion becomes less than 100 nm to thereby obtain a yellow pigment dispersion 23.

Example 24

A pigment ink liquid 2 is obtained in the same procedures as in Example 22 except for using the pigment dispersion 23 in place of the pigment dispersion 21 used in Example 22.

Example 25

A pigment dispersion is prepared by using (Pig.-18) in place of the azo pigment (Pig.-1) used in Example 21, and the diameter of the pigment particle is measured using Nanotrac 150 (UPA-EY150) manufactured by Nikkiso Co., Ltd. Subsequently, the dispersion is subjected to dispersing procedure at 300 rpm in the planetary ball mill till the particle diameter Mv of the pigment dispersion becomes less than 100 nm to thereby obtain a yellow pigment dispersion 25.

Example 26

A pigment ink liquid 3 is obtained in the same procedures as in Example 22 except for using the pigment dispersion 25 in place of the pigment dispersion 21 used in Example 22.

Example 27

A pigment dispersion is prepared by using (Pig.-24) in place of the azo pigment (Pig.-1) used in Example 21, and the diameter of the pigment particle is measured using Nanotrac 150 (UPA-EY150) manufactured by Nikkiso Co., Ltd. Subsequently, the dispersion is subjected to dispersing procedure at 300 rpm in the planetary ball mill till the particle diameter Mv of the pigment dispersion becomes less than 100 nm to thereby obtain a yellow pigment dispersion 27.

Example 28

A pigment ink liquid 4 is obtained in the same procedures as in Example 22 except for using the pigment dispersion 27 in place of the pigment dispersion 21 used in Example 22.

Example 29

A pigment dispersion is prepared by using (Pig.-57) in place of the azo pigment (Pig.-1) used in Example 21, and the diameter of the pigment particle is measured using Nanotrac 150 (UPA-EY150) manufactured by Nikkiso Co., Ltd. Subsequently, the dispersion is subjected to dispersing procedure at 300 rpm in the planetary ball mill till the particle diameter Mv of the pigment dispersion becomes less than 100 nm to thereby obtain a yellow pigment dispersion 29.

Example 30

A pigment ink liquid 5 is obtained in the same procedures as in Example 22 except for using the pigment dispersion 29 in place of the pigment dispersion 21 used in Example 22.

Comparative Example 11

A pigment dispersion is prepared by using a yellow pigment C.I. Pigment Yellow 74 (PY-74; Iralite YELLOW GO manufactured by CIBA Specialty Chemicals) in place of the azo pigment (Pig.-1) used in Example 21, and the diameter of the pigment particle is measured using Nanotrac 150 (UPA-EY150) manufactured by Nikkiso Co., Ltd. Subsequently, the dispersion is subjected to dispersing procedure at 300 rpm in the planetary ball mill till the particle diameter Mv of the pigment dispersion becomes less than 100 nm to thereby obtain a comparative pigment dispersion 11.

Comparative Example 12

A comparative pigment ink liquid 1 is obtained in the same procedures as in Example 22 except for using the comparative pigment dispersion 11 in place of the pigment dispersion 21 used in Example 22.

Comparative Example 13

A comparative pigment dispersion 13 is prepared in the same manner as in Comparative Example 11 except for using a yellow pigment C.I. Pigment Yellow 155 (INKJET YELLOW 4G VP2532; manufactured by Clariant Co.) in place of the azo pigment (PY-74) used in Comparative Example 11.

Comparative Example 14

A comparative pigment ink liquid 2 is obtained in the same procedures as in Example 22 except for using the comparative pigment dispersion 13 in place of the pigment dispersion 21 used in Example 22.

Comparative Example 15

A comparative pigment dispersion 15 is prepared in the same manner as in Comparative Example 11 except for using a yellow pigment C.I. Pigment Yellow 128 (PY-128; CROMOPHTHAL YELLOW 8GN; manufactured by CIBA Specialty Chemicals) in place of the azo pigment (PY-74) used in Comparative Example 11.

Comparative Example 16

A comparative pigment ink liquid 3 is obtained in the same procedures as in Example 22 except for using the comparative pigment dispersion 15 in place of the pigment dispersion 21 used in Example 22.

Each of the yellow pigment ink liquids of Examples 22, 24, 26, 28, 30, Comparative Examples 12, 14, and 16 is filled in a yellow ink cartridge of an inkjet printer PX-V630 manufactured by Seiko Epson Corporation, and a yellow mono-color pattern with the density being stepwise changed so that the yellow OD value is changed from 0.7 to 1.8 is printed on an image-receiving sheet, i.e., photographic paper CRISPIA <Ko-kotaku> manufactured by Seiko Epson Corporation without color correction and with the printing quality of PHOTO to evaluate hue, image-printing properties, image fastness (light fastness and ozone gas resistance), and image quality.

(Hue-Testing Method)
[Evaluation of Hue]

A yellow mono-color image pattern wherein the density is changed is printed, and the reflection density of a recorded product is measured using a spectrophotometer of GRETAG SPM-50 (manufactured by GRETAG).

Measuring conditions are: D50 in light source; filter for the light source: none; white standard: absolute white; viewing angle: 2°. L* values, a* values, and b* values specified by CIE are obtained. Results thus obtained are shown in Table 3.

[Evaluation Criteria]
Rank A: When $a^*=0$, $b^*\geq 95$ and, when $b^*=95$, $a^*\leq -5$; when $-5\leq a^*\leq 0$, $b^*\leq 30$ and, when $60\leq b^*\leq 95$, $a^*\leq -10$.
Rank B: Either of the requirements for rank A is not satisfied.
Rank C: None of the requirements for rank A is satisfied.

(Evaluation of Tinctorial Strength)

Each of the yellow pigment ink liquids is filled in a yellow ink cartridge of an inkjet printer PX-V630 manufactured by Seiko Epson Corporation, and a yellow solid printing pattern is printed on an image-receiving sheet, i.e., photographic paper CRISPIA <Ko-kotaku> manufactured by Seiko Epson Corporation without color correction and with the printing quality of PHOTO. Tinctorial strength is evaluated according to the following criteria: samples which have a mono-color density of 2.0≦ODmax are ranked A; samples which have a mono-color density of 1.8≦ODmax<2 are ranked B; samples which have a mono-color density of 1.5≦ODmax<1.8 are ranked C; and samples which have a mono-color density of ODmax<1.5 are ranked D.

(Light Fastness-Testing Method)

Each image is irradiated for 14 days with xenon light (99,000 lx) by using Weathermeter (manufactured by Atlas). Mono-color (yellow) OD value of the image recorded on each printed product is measured at regular time intervals starting from initiation of the irradiation by means of a reflection densitometer (X-Rite 310TR). Additionally, the reflection density is measured at three points each having a reflection density of 0.7, 1.0, and 1.8.

The optical density residual ratio (ROD) is determined from the obtained results according to the following formula:

$$ROD(\%) = (D/D_0) \times 100$$

wherein D represents an OD value after the irradiation test, and $D_0$ represents an OD value before the irradiation test.

Further, light fastness of each color of the recorded product is ranked from A to D according to the following evaluation criteria.

[Evaluation Criteria]

Rank A: ROD 14 days after initiation of the test is 85% or more at any of the three densities.
Rank B: ROD 14 days after initiation of the test is less than 85% at one of the three densities.
Rank C: ROD 14 days after initiation of the test is less than 85% at two of the three densities.
Rank D: ROD 14 days after initiation of the test is less than 85% at all of the three densities.

In this test, recorded products suffering less reduction in ROD even after being irradiated with light for a long period of time are excellent. Results thus-obtained are shown in Table 3.

(Ozone Resistance-Testing Method)

Each of the recorded products is exposed to an ozone gas for 21 days under the condition that the ozone gas concentration is set to 5 ppm (25° C., 50%). The ozone gas concentration is set at the level by using an ozone gas monitor (Model: OZG-EM-01) manufactured by APPLICS. The OD value for each color of the recorded product is measured by using a reflection densitometer (X-Rite 310TR) at regular time intervals starting from initiation of the test. Additionally, the reflection density is measured at three points each having a reflection density of 0.7, 1.0, and 1.8.

The optical density residual ratio (ROD) is determined from the obtained results according to the following formula:

$$ROD(\%) = (D/D_0) \times 100$$

wherein D represents an OD value after the exposure test, and $D_0$ represents an OD value before the exposure test.

Further, ozone resistance of each color of the recorded product is ranked from A to D according to the following evaluation criteria.

[Evaluation Criteria]

Rank A: ROD 7 days after initiation of the test is 85% or more at any of the three densities.
Rank B: ROD 7 days after initiation of the test is less than 85% at one of the three densities.
Rank C: ROD 7 days after initiation of the test is less than 85% at two of the three densities.
Rank D: ROD 7 days after initiation of the test is less than 85% at all of the three densities.

In this test, recorded products suffering less reduction in ROD even after being exposed to ozone for a long period of time are excellent. Results thus-obtained are shown in Table 3 as ozone gas resistance.

TABLE 3

| Ink Composition | Colorant (Pigment) | Hue | Mono-color Tinctorial Strength | Light Fastness | Ozone Gas Resistance |
| --- | --- | --- | --- | --- | --- |
| Pigment ink liquid 1 | Pig.-1 | A | B | A | A |
| Pigment ink liquid 2 | Pig.-2 | A | B | A | A |
| Pigment ink liquid 3 | Pig.-18 | A | A | B | A |
| Pigment ink liquid 4 | Pig.-24 | A | B | B | A |
| Pigment ink liquid 5 | Pig.-57 | A | A | B | A |
| Comparative pigment ink liquid 1 | PY-74 | A | A | D | B |
| Comparative pigment ink liquid 2 | PY-155 | B | C | C | B |
| Comparative pigment ink liquid 3 | PY-128 | C | D | B | B |

It is seen from the results that the pigment ink liquid using the azo pigment of the invention shows excellent hue as yellow, high tinctorial strength, and excellent light fastness.

Accordingly, the pigment dispersions using the pigments of the invention can preferably be used in an ink for printing such as inkjet printing, a color toner for electrophotography, a color filter to be used for displays such as LCD and PDP, and photographing devices such as CCD, a paint, and in colored plastics.

INDUSTRIAL APPLICABILITY

According to the present invention, there are provided azo pigments having excellent coloring characteristics such as hue and having high tinctorial strength and excellent light fastness. A pigment dispersion, a coloring composition, and an ink for ink jet recording, which form dispersed particles of a small diameter and have excellent coloring characteristics, light fastness, and dispersion stability, can be obtained by dispersing the pigment of the invention in various media. The pigment dispersion can be used for an ink composition for printing such as ink jet printing, a color toner for electrophotography, a display such as LCD or PDP, a color filter to be used in photographing equipment such as CCD, a paint, a colored plastic, etc.

The entire disclosure of each and every foreign patent application from which the benefit of foreign priority has been claimed in the present application is incorporated herein by reference, as if fully set forth.

The invention claimed is:

1. An azo pigment represented by the following formula (1), a tautomer of the azo pigment, or a salt or hydrate thereof:

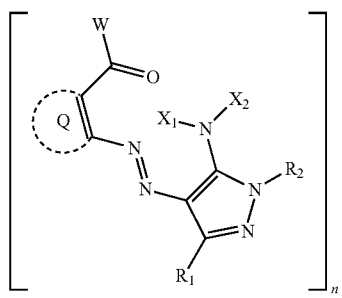

Formula (1)

wherein

Q represents the non-metallic atoms necessary to complete a 5- to 7-membered heterocyclic group, W represents an alkoxy group, an amino group, an alkyl group, or an aryl group, $X_1$ and $X_2$ each independently represents a hydrogen, an alkyl group, an acyl group, an alkylsulfonyl group, or an arylsulfonyl group, $R_1$ represents a hydrogen or a substituent, $R_2$ represents a heterocyclic group, n represents 2 and, formula (1) represents a dimer formed through Q, W, $X_1$, $X_2$, $R_1$, or $R_2$.

2. The azo pigment, the tautomer of the azo pigment, or the salt or hydrate thereof according to claim 1, wherein
the azo pigment is represented by the following formula (2):

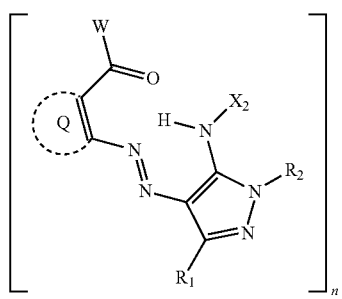

Formula (2)

wherein

Q, W, $X_1$, $X_2$, $R_1$, $R_2$, and n are the same as defined for Q, W, $X_1$, $X_2$, $R_1$, $R_2$, and n in the formula (1).

3. The azo pigment, the tautomer of the azo pigment, or the salt or hydrate thereof according to claim 1, wherein
Q forms a 5-membered nitrogen-containing heterocyclic ring together with carbon atoms.

4. The azo pigment, the tautomer of the azo pigment, or the salt or hydrate thereof according to claim 2, wherein
$X_1$ represents a hydrogen.

5. The azo pigment, the tautomer of the azo pigment, or the salt or hydrate thereof according to claim 1, wherein
the azo pigment is represented by the following formula (3):

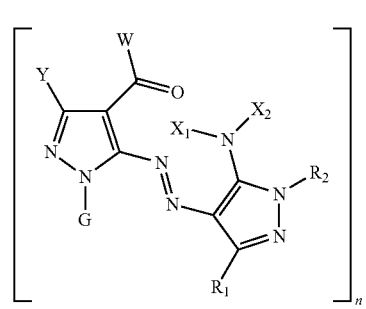

Formula (3)

wherein

Y represents a hydrogen or a substituent,

G represents a hydrogen, an alkyl group, a cycloalkyl group, an aralkyl group, an alkenyl group, an alkynyl group, an aryl group, or a heterocyclic group, and W, $X_1$, $X_2$, $R_1$, $R_2$, and n are the same as defined for W, $X_1$, $X_2$, $R_1$, $R_2$, and n in the formula (1).

6. The azo pigment, the tautomer of the azo pigment, or the salt or hydrate thereof according to claim 5, wherein
the azo pigment is represented by the following formula (4):

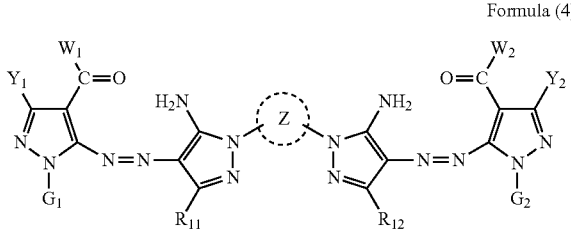

Formula (4)

wherein

Z represents atoms necessary to complete a 5- to 8-membered nitrogen-containing heterocyclic ring, $Y_1$, $Y_2$, $R_{11}$, and $R_{12}$ each independently represents a hydrogen or a substituent, $G_1$ and $G_2$ each independently represents a hydrogen, an alkyl group, an aralkyl group, an alkenyl group, an alkynyl group, an aryl group, or a heterocyclic group, and $W_1$ and $W_2$ each independently represents an alkoxy group, an amino group, an alkyl group, or an aryl group.

7. The azo pigment, the tautomer of the azo pigment, or the salt or hydrate thereof according to claim 1, wherein
W, $W_1$, and $W_2$ each independently represents an alkoxy group containing a total of 3 or less carbon atoms, an amino group, or an alkylamino group containing a total of 3 or less carbon atoms.

8. The azo pigment, the tautomer of the azo pigment, or the salt or hydrate thereof according to claim 5, wherein
G, $G_1$, and $G_2$ each independently represents an alkyl group containing a total of 3 or less carbon atoms.

9. The azo pigment, the tautomer of the azo pigment, or the salt or hydrate thereof according to claim 6, wherein
   Z represents a 6-membered nitrogen-containing heterocyclic ring.
10. A pigment dispersion comprising:
   at least one of the azo pigment, the tautomer of the azo pigment, or the salt or hydrate thereof described in claim 1.
11. A coloring composition comprising:
   at least one of the azo pigment, the tautomer of the azo pigment, or the salt or hydrate thereof described in claim 1.
12. An ink composition for inkjet recording comprising:
   the pigment dispersion described in claim 10.

* * * * *